US006999851B2

(12) United States Patent
Kato et al.

(10) Patent No.: US 6,999,851 B2
(45) Date of Patent: Feb. 14, 2006

(54) ROBOT APPARATUS AND MOTION CONTROLLING METHOD THEREFOR

(75) Inventors: Keisuke Kato, Tokyo (JP); Shinji Ishii, Kanagawa (JP)

(73) Assignee: Sony Corporation, Tokyo (JP)

( * ) Notice: Subject to any disclaimer, the term of this patent is extended or adjusted under 35 U.S.C. 154(b) by 154 days.

(21) Appl. No.: 10/650,421

(22) Filed: Aug. 28, 2003

(65) Prior Publication Data

US 2004/0133308 A1    Jul. 8, 2004

(30) Foreign Application Priority Data

Aug. 30, 2002  (JP)  ............................. 2002-255850
Aug. 7, 2003   (JP)  ............................. 2003-289096

(51) Int. Cl.
    *G06F 19/00*  (2006.01)
(52) U.S. Cl. .................. 700/245; 700/248; 700/249; 700/250; 700/251; 700/900; 318/568.1; 318/568.11; 318/568.12; 318/568.14; 318/568.15; 318/568.16; 318/568.18; 901/3; 901/4; 901/5; 901/9; 901/14; 901/15; 901/20; 901/21; 901/22
(58) Field of Classification Search ................ 700/245, 700/248–249, 259–261, 900; 318/568.1, 318/568.11, 568.12, 568.14, 568.15, 568.16, 318/568.18; 901/3–5, 9, 14–15, 20–22
See application file for complete search history.

(56) References Cited

U.S. PATENT DOCUMENTS 5,349,277 A  * 9/1994  Takahashi et al. ..... 318/568.12
5,611,417 A  * 3/1997  Stawniak et al. ........... 198/323
5,940,629 A  * 8/1999  Rikukawa et al. ............ 710/62
6,472,839 B1 * 10/2002 Ishii et al. ............. 318/568.12
6,696,809 B1 * 2/2004  Ishii et al. .................. 318/561
2002/0009204 A1 * 1/2002  Matsumura .................. 381/98
2002/0079857 A1 * 6/2002  Ishii et al. ............. 318/568.12

OTHER PUBLICATIONS

Hirai et al., The development of Honda humanoid robot, 1998, IEEE, p. 1321-1326.*

* cited by examiner

*Primary Examiner*—Thomas Black
*Assistant Examiner*—McDieunel Marc
(74) *Attorney, Agent, or Firm*—Frommer Lawrence & Haug LLP; William S. Frommer; Thomas F. Presson

(57) ABSTRACT

A robot apparatus and a motion controlling method for the robot apparatus wherein a reflex motion or the like can be performed at a high speed while decreasing the calculation amount of and the concentrated calculation load to a control apparatus. The robot has a control configuration having a hierarchical structure including a higher order central calculation section corresponding to the brain, reflex system control sections corresponding to the vertebra, and servo control systems and actuators corresponding to the muscles. From restrictions to the power consumption and so forth, there is a limitation to increase of the speed of a control cycle of the higher order central calculation section. External force acting upon the machine body is a disturbance input of a high frequency band, and a very high speed control system is required. Therefore, the reflex control systems which correspond to an intermediate hierarchy operate in a high speed cycle to respond at a high speed to the external force to absorb a deviation caused by the disturbance.

12 Claims, 33 Drawing Sheets

FIG. 8A

START OF OPERATION
↓
CALCULATION OF CONTROL INSTRUCTIONS REGARDING MOTION OF ROBOT BY CENTRAL CONTROL APPARATUS AND TRANSMISSION OF CONTROL INSTRUCTIONS TO ROUTERS — S21
↓
TRANSMISSION OF RECEIVED CONTROL INSTRUCTIONS FROM ROUTERS TO ACTUATORS — S22
↓
DRIVING OF ACTUATORS BASED ON RECEIVED CONTROL INSTRUCTIONS AND DETECTION OF DISPLACEMENTS OF ACTUATORS BY SENSORS — S23
↓
FEEDBACK OF MEASURED DISPLACEMENTS FROM ACTUATORS TO CENTRAL CONTROL APPARATUS — S24

FIG. 8B

EXTERNAL FORCE
↓
DETECTION OF DISPLACEMENTS OF ACTUATORS BY INADVERTENT EXTERNAL FORCE SUCH AS IMPACT AND FEEDBACK OF DISPLACEMENTS TO ROUTERS — S31
↓
CALCULATION OF REQUIRED CONTROL INSTRUCTIONS BASED ON DISPLACEMENTS OF ACTUATORS BY ROUTERS AND TRANSMISSION OF CONTROL INSTRUCTIONS TO ACTUATORS — S32
↓
DRIVING OF JOINT PARTS BASED ON RECEIVED REQUIRED CONTROL INSTRUCTIONS BY ACTUATORS — S33

ROBOT APPARATUS AND MOTION CONTROLLING METHOD THEREFOR

BACKGROUND OF THE INVENTION

This invention relates to a robot apparatus including a body and a plurality of movable parts connected to the body and a motion controlling method for the robot apparatus, and particularly to a robot apparatus which includes a body and at least upper limb parts, lower limb parts and a trunk part as movable parts connected to the body and a motion controlling method for the robot apparatus.

More particularly, the present invention relates to a robot apparatus and a motion controlling method therefor wherein a motion of a movable part is controlled in accordance with a predetermined target locus and also controlled adaptively in response to a variation of an external environment such as external force, and more specifically to a robot apparatus and a motion controlling method wherein a motion of a movable part is controlled in accordance with a predetermined target locus and also controlled adaptively in response to a disturbance of a high frequency band.

A mechanical apparatus which performs movements similar to motions of a human being using mechanical or magnetic actions is called "robot". It is said that the word "robot" originates from a word 'ROBOTA' (slave machine) of a Slavic language.

Here in Japan, robots began to be popularized at the end of the nineteen sixties. Most of them, however, were industrial robots such as manipulators or transport robots intended for automation and unmanning of manufacturing works in a factory. In recent years, research and development of legged mobile robots have proceeded, and expectation that they be placed into practical use is increasing. A legged mobile robot which models motions of a human being is particularly called human-like or humanoid robot.

Recently, research and development regarding legged mobile robots which copy body mechanisms and motions of animals which perform bipedal upright walking such as a human being or a monkey have proceeded, and also expectation that they be placed into practical use is increasing. Legged traveling in a bipedal upright form is disadvantageous in that the robot is unstable and difficult in posture control and walking control when compared with traveling of the crawler type or four- or six-legged traveling. However, the legged traveling in a bipedal upright form is superior in that a flexible traveling operation can be realized such that it can cope with a rough ground or a walking surface having some irregularities such as an obstacle on a traveling path or with a discontinuous walking face of a staircase or a ladder along which the robot must travel upwardly or downwardly.

A great number of proposals have been made for a technique for posture control or stable walking of a bipedal legged mobile robot. The stable "walking" here is defined as "traveling without stumbling through use of the legs". Stumbling of the machine body signifies interruption of a work being performed, and considerable labor and time are required until the robot stands up uprightly from the stumbling state and resumes the work. Further, there is the possibility that the stumbling may critically damage the robot body and also damage a substance with which the stumbling robot collides. Therefore, posture stabilization control for preventing stumbling is considered as one of the most significant subjects in development of a legged mobile robot.

An ordinary upright posture as a basic posture of a robot which performs upright walking is unstable in the first place. In many cases, a ZMP (Zero Moment Point) is used as a criterion for discrimination of the stability of walking in posture stabilization control of a legged mobile robot. The stability discrimination criterion by a ZMP is based on the "d'Alembert's principle" that the gravity and inertial force which act from a walking system to the road surface and the moment of them are balanced with the floor reaction force as a reaction from the road surface to the walking system and the floor reaction force moment. As a consequence of mechanical inference, a point at which the pitch shaft moment and the roll shaft moment are zero, that is, a ZMP, is present on or on the inner side of a side of a supporting polygon (that is, a ZMP stable region) formed by the ground contacting points of the soles and the road surface. This is disclosed, for example, in Japanese Patent Laid-Open NO. 2002-210681 (document 1).

A motion of the machine body of a robot is implemented basically by driving of a joint actuator which joins links which are regarded substantially as rigid bodies. As described hereinabove, in a legged mobile robot wherein an ordinary upright posture as a basic posture is unstable, driving of joint actuators must be controlled with a higher degree of accuracy in order to achieve posture stabilization control.

Further, in order to allow a robot to maintain the stability in posture to prevent stumbling of the machine body thereof irrespective of an uneven situation of the road surface when the robot places its leg into contact with the road surface during walking or even when the robot is contacted with or collides with a substance in the outside world during working, a technique is demanded to rapidly drive a plurality of joint parts of a complicated configuration in an interlocking cooperative relationship in response to a variation of the external force. Also when a variation of an external environment which cannot be estimated readily such as when the robot sandwiches a foreign article or when a sudden temperature rise occurs with part of the machine body of the robot due to a failure of an actuator or some other component, in order to achieve reduction of damage or assurance of posture stabilization control of the robot, it is considered necessary to control driving of joint parts in a shorter cycle than that where a planned behavior is executed similarly.

However, in order to drive various joint parts rapidly in an interlocking relationship with each other in response to a variation of an external environment, it is significant to utilize a integrated control section for performing integrated control for a motion of the entire robot to rapidly calculate control instructions in accordance with the external environment and transmit the calculated control instructions to driving systems of the joint parts simultaneously and at a high speed.

Here, rapid driving of joint parts of such a robot apparatus having a conventional configuration as shown in FIG. 31 is examined. Referring to FIG. 31, a robot 110 is shown and includes a central control apparatus 111 serving as a integrated control section for performing integrated control for a motion of the entire robot 110 and an actuator 112 provided for each of a plurality of joint parts of the robot 110. In this instance, information regarding external force applied to each of the joint parts is transmitted to the central control apparatus 111, and the central control apparatus 111 calculates control instructions based on the received information. Then, the central control apparatus 111 transmits the calculated control instructions to the actuators 112 to drive the joint parts. Where the central control apparatus 111 and the actuators 112 are connected to each other individually by signal transmission cables 113, the processing circuit for calculating control instructions inevitably has a large scale, and besides, much time is required for calculation of control instructions and also for communication of the control instructions.

FIG. 32 diagrammatically shows an example of a control configuration of the conventional robot apparatus shown in FIG. 31. Referring to FIG. 32, a central control apparatus 120 transmits a control instruction such as a rotational position information or a motor control gain for a motor disposed for each of a plurality of actuators 121 through transmission lines 122 and 123 established by a signal transmission cable connected individually to the actuators 121. Further, information which is information representative of driving states of the actuators 121 when external force is applied such as rotational shaft positions of the motors and control instructions calculated newly by the central control apparatus 120 in response to the information 113 are communicated between the central control apparatus 120 and the actuators 121.

For example, if an inadvertent impact acts upon a joint part driven by an actuator disposed for a leg part, then in order to reduce damage to the joint part by the impact or secure the stability in posture control of the robot against the impact, the joint part and another adjacent joint part are driven in an interlocking relationship with each other to attenuate the impact so that the impact may not be imparted to the body of the robot. At this time, control instructions to the joint parts are transmitted to the individual joint parts through respective signal transmission cables from the central movement controller. Thereupon, in order to moderate the impact, it is significant to drive the joint parts rapidly after the impact acts.

FIG. 33 illustrates a conventional control flow for a robot apparatus. A robot having the structure shown in FIG. 32 is controlled in accordance with the control flow of FIG. 33. Referring to FIG. 33, after operation of the robot is started, the central control apparatus first calculates control instructions regarding a motion of the robot and transmits the control instructions to the actuators (step S131). Then, each of the actuators receives the pertaining control instruction (step S132) and drives the associated joint part in accordance with the control instruction. Thereupon, a displacement of the actuator representative of the position of the joint is measured by an associated sensor (step S133). Then, such displacements of the actuators measured by the associated sensors are fed back to the central control apparatus serving as an integrated control section (step S134). Then, the central control apparatus calculates new control instructions in response to the displacements of the actuators and transmits the new control instructions to the actuators. A sequence of operations for driving control is performed in this manner (refer to, for example, document 1 mentioned hereinabove).

However, where the central control apparatus calculates all control instructions regarding a motion of the robot, a heavy load is imposed on the central control apparatus. Particularly while it is demanded to form a integrated control section from a miniaturized processing circuit, it is difficult to increase the number of parameters to be used for a calculation process to calculate control instructions at a high speed in response to various state variations of the joint parts.

Further, if it is presumed to use the control flow illustrated in FIG. 33 to control a motion of a robot which has the structure shown in FIG. 31, then it is difficult to lay signal transmission cables for transmitting control instructions to the actuators for driving the joint parts from the central control apparatus serving as a integrated control section. Further, it is difficult to use only the central processing apparatus to rapidly calculate control instructions for attenuating inadvertent external force such as an impact and transmit the newly calculated control instructions at a high speed to the actuators.

In short, it is difficult to reduce the time required for communication of various kinds of information between the central control apparatus and the driving sections. Further, it is difficult to drive, after external force is applied, the joint parts to operate rapidly in an interlocking relationship with each other to moderate the external force to secure the stability in posture control of the robot and prevent otherwise possible damage to the robot by the external force.

In the conventional robot apparatus, the joint shafts are controlled directly by the central control apparatus. Therefore, where the robot apparatus is a multi-axis robot apparatus having a high degree of freedom, a calculation imposes a heavy burden on the central control apparatus. Therefore, it is difficult for the central control apparatus to respond on the real time basis, and the central control apparatus cannot cope with a sudden variation, for example, by a collision.

In other words, a technique is demanded by which various kinds of information can be communicated at a high speed in order to allow the actuators to be driven rapidly so that the joint parts may operate in an interlocking relationship with each other in response to a variation of an external environment such as external force without imposing an excessively heavy load to the central control apparatus serving as a integrated control section.

Since the conventional robot apparatus has a single hierarchy control structure, the processing is concentrated on the central control apparatus, and therefore, where multi-axis control is intended, there is a limitation to a high speed real time response. Therefore, it is considered that the conventional robot apparatus has the following problems.

(1) Since the central control apparatus executes control of all shafts on the real time basis, high speed communication and high speed calculation processing are required, and therefore, a large circuit scale is required for the central control apparatus.

(2) Since both of reflex movement control of a terminal end and movement control of the entire robot apparatus are processed in an equal control cycle, the performance is poor.

Further, the conventional robot apparatus has no degree of freedom at the soles thereof, and each sole has a rubber member adhered to a flat face thereof to cope with an uneven road surface and secure friction to eliminate an otherwise possible slip. Further, although a structure that a degree of freedom of a toe is provided for the sole is available, the sole cannot move in response to an uneven configuration of the ground surface. Therefore, the robot apparatus has a problem that it is unstable particularly on a convex ground surface and cannot maintain its posture but may stumble. In other words, the robot apparatus has a limitation to a response thereof to a collision which occurs when the sole is brought into contact with a rough road surface upon walking, and cannot make a reflex movement of a terminal end thereof.

Conventionally, it has been attempted to introduce a concept of reflex into a control mechanism for a robot apparatus. However, most of such attempts are directed to examination only of the algorithm but not to the signal processing or the configuration of a control system. In the processing and control system configuration in this instance, a higher order processing system which takes charge of behavior planning of the robot controls movements of actuators. However, a reflex is simulated only in the higher order processing system but is different from an involuntary reflex as in the case of an animal.

Legged mobile robots are examined also in Miomir Vukobratovic, "LEGGED LOCOMOTION ROBOTS" (Ichiro Kato, "Walking Robots and Artificial Feet", (Daily Industrial Newspaper Company)).

SUMMARY OF THE INVENTION

It is an object of the present invention to provide a superior robot apparatus and a motion controlling method for the robot apparatus wherein an apparatus motion can be controlled in accordance with a predetermined target locus and can be controlled adaptively in response to a disturbance of a high frequency band.

It is another object of the present invention to provide a superior robot apparatus and a motion controlling method for the robot apparatus wherein control instructions can be calculated rapidly in response to a variation of an external environment and transmitted at a high speed to respective joint parts without an increase in scale of a processing circuit which forms integrated control means (an integrated control section) for controlling a motion of the robot apparatus.

It is a further object of the present invention to provide a superior robot apparatus and a motion controlling method for the robot apparatus wherein a reflex motion can be performed at a high speed while decreasing the calculation amount of and the concentrated calculation load to a control apparatus.

In order to attain the objects described above, according to an aspect of the present invention, there is provided a robot apparatus including a body and a plurality of movable parts connected to the body, comprising a plurality of movable part driving means for driving the movable parts, a local control loop for controlling one or more movable parts, local control means (local control section) for controlling the local control loop, a integrated control loop serving as a higher order control loop than the local control loop for controlling the local control loop, integrated control means for controlling the integrated control loop, and priority determination means for determining priority between control amounts calculated by the local control means and the integrated control means to be used to control the movable parts based on a predetermined condition.

The robot apparatus here is, for example, a legged mobile robot which includes a plurality of movable legs and performs walking or some other foot-type operation. The robot apparatus of the type further comprises detection means for detecting states of different portions of the robot apparatus such as sensors for detecting an angle, angular velocity and an angular acceleration of each joint, a posture sensor for detecting the posture of the body of the robot apparatus, a ground contact confirmation sensor for detecting whether or not the sole of each foot part contacts with the ground surface, pressure sensors or contact sensors for detecting external force and temperature sensors for detecting temperature rises at the portions of the robot apparatus. Thus, the predetermined condition described above corresponds to the fact that any of detection values of the detection means exceeds a predetermined value or an unexpected detection value is outputted from the detection means.

In the integrated control loop, principally the integrated control means executes voluntary apparatus driving based on a predetermined behavior plan. Meanwhile, in the local control loop, it is necessary to perform rapid apparatus driving in order to respond to a disturbance of a high frequency band as a reflexive motion responsive to generation of the predetermined condition.

Thus, the integrated control means performs integrated control for a motion of the entire robot apparatus in a first control cycle while the local control means controls driving of the movable part driving control means which are subject to the control of the local control means in a second control cycle shorter than the first control cycle. Consequently, adaptive control of an apparatus operation response to a disturbance of a high frequency band is realized.

In the local control loop, the local control means may issue a notification of states of the movable part driving means of the local control loop to the integrated control means, and the integrated control means may issue control instructions including target values successively corrected based on the states of the movable part driving means included in the notifications.

The priority determination means may provide higher priority to the control amounts calculated by the local control means within an initial period of time after the control is started, but provide higher priority to the control amounts calculated by the integrated control means within a set period of time. Alternatively, the priority determination means may provide higher priority to the control amounts calculated by the local control means in a high frequency control system, but provide higher priority to the control amounts calculated by the integrated control means in a low frequency control system.

In the local control loop, component ratios between the control amounts for the movable part driving means from the integrated control means and the control amounts for the movable part driving means from the local control means may be adjusted. For example, the component ratios may be adjusted in response to the strength of force acting upon the robot apparatus or some other state of the robot apparatus.

The component ratios may be transiently adjusted for the changeover from control by the local control means to control by the integrated control means in a predetermined set period of time. For example, the set time may be determined in response to an object apparatus motion by the integrated control means. Where the robot apparatus is a legged mobile robot, the set time may be determined depending upon a walking cycle using the movable legs.

The local control apparatus may include a data transmission apparatus for transmitting a control instruction to an associated one of the movable part driving means. The data transmission apparatus may be connected in a daisy chain connection to a data processing apparatus, which is connected to the associated movable part driving means, by a single transmission line.

Where an object of control is a legged mobile robot formed from mechanism groups such as the four limbs, trunk, head and so forth, each of the mechanism groups is formed from several actuators each including a servo control system and a reflex control system for controlling the actuators. It is assumed that each of the actuators includes an apparatus for communicating with another one of the actuators. Further, a central control section which corresponds to a higher order processing system performs integrated control for all of the groups. In this instance, the robot has a control configuration having a hierarchical structure including a higher order central calculation section, reflex system control sections, servo control systems and actuators. This signifies that, where it is compared with a living organism, the higher order central calculation section corresponds to the brain and the reflex system control sections correspond to the vertebra while the servo systems and the actuators correspond to the muscles.

From restrictions to the power consumption of a battery driving apparatus and so forth, there is a limitation to increase of the speed of a control cycle of the higher order central calculation section. External force acting upon the machine body is a disturbance input of a high frequency band, and a very high speed control system is required in order to cope with such external force. Therefore, the reflex control systems which correspond to an intermediate hierarchy operate in the high speed cycle to respond at a high speed to the external force to absorb a deviation caused by the disturbance. In particular, according to the present invention, a high speed response of a high frequency band can be achieved by a motion of the reflex system control section. Accordingly, different from a control system wherein a reflex model is simulated by a central calculation section, a control system which achieves high speed adaptation can be constructed.

Further, the legged mobile robot may include a sensor provided on a bottom face of each foot mechanism for detecting a load applied to a ground surface along which the robot travels and a posture sensor mounted on the body of the robot for detecting the posture of the robot body so that the robot may perform a traveling motion.

In order for the legged mobile robot to adapt to an uneven road surface, profiling control of each foot to the ground surface must be performed at a high speed. However, in order to perform posture control on such an arbitrary road surface as just mentioned, a supporting moment must be generated. Such motions sometimes act in the opposite directions. However, according to the present invention, a countermeasure for satisfying all solutions can be provided.

It is difficult to fully grasp a state of the ground surface at a moment when a toe is brought into contact with the ground surface during traveling by walking. Therefore, there is the possibility that the robot may be acted upon by inadvertent external force. In order to cope with such a situation as just described, it is one of countermeasures to lower the control gain of the actuators. In contrast, however, according to the present invention, utilizing the fact that a ground contact confirmation sensor is provided on each sole, a motion of pulling back a foot quickly at a moment when the foot is brought into contact with the ground surface is performed by reflex system control of the local control means. Since the local control means is disposed in an immediately higher hierarchy with respect to the servo systems, an initial motion upon such contacting of the foot with the ground surface can be achieved.

Thereafter, in order for the foot contacting with the ground to function as a supporting leg, it is necessary for the foot to generate sufficient supporting force. This, however, is adapted in accordance with a voluntary control instruction from the highest order central calculation section.

In this manner, on the time series, a motion by the reflex system control is initially performed dominantly, but a voluntary ordinary motion gradually becomes dominant within the predetermined set period of time. In this manner, a series of necessary motions can be achieved.

According to another aspect of the present invention, there is provided a robot apparatus including a body and a plurality of movable parts connected to the body, comprising a plurality of movable part driving means for individually driving the movable parts, integrated control means for performing integrated control for a motion of the entire robot apparatus in a first control cycle, and local control means for controlling some of the movable parts in a second control cycle shorter than the first control cycle.

According to a further aspect of the present invention, there is provided a motion controlling method for a robot apparatus including a body and a plurality of movable parts connected to the body, comprising a local control step of controlling a motion of the robot apparatus by means of a local control loop which control some of the movable parts, a integrated control step of controlling a motion of the robot apparatus by means of a integrated control loop which serves as a higher order control loop than the local control loop and controls the local control loop, and a priority determination step of determining priority between control amounts calculated by the local control step and the integrated control means to be used to control the movable parts based on a predetermined condition.

Thus, according to the present invention, a superior robot apparatus and a motion controlling method for the robot apparatus can be provided wherein an apparatus motion can be controlled in accordance with a predetermined target locus and can be controlled adaptively in response to a disturbance of a high frequency band.

Further, according to the present invention, a superior robot apparatus and a motion controlling method for the robot apparatus can be provided wherein control instructions can be calculated rapidly in response to a variation of an external environment and transmitted at a high speed to respective joint parts without an increase in scale of a processing circuit which forms integrated control means for controlling a motion of the robot apparatus.

Furthermore, according to the present invention, a superior robot apparatus and a motion controlling method for the robot apparatus can be provided wherein a reflex motion can be performed at a high speed while decreasing the calculation amount of and the concentrated calculation load to a control apparatus.

With the robot apparatus according to the present invention, since a control system for controlling a principal motion of the robot apparatus and another control system for controlling a rapid motion in response to a variation of an external environment such as inadvertent external force, rapid motion control can be performed in response to a variation of the external environment without applying a high load to the integrated control means which performs principal motion control. Further, if the apparatus configuration of the robot apparatus according to the present invention is applied to a humanoid, then the robot apparatus can perform a smooth motion proximate to a motion of a human being.

Further, with the configuration of the robot apparatus according to the present invention, control instructions can be calculated at a high speed in accordance with an external environment and transmitted to the driving sections without inviting increase of the scale of a processing circuit disposed for the central control apparatus serving as the integrated control means. Consequently, the configuration of the robot apparatus which can perform a motion proximate to a motion of a human being can be miniaturized.

Furthermore, with the robot apparatus according to the present invention, motion control of the robot apparatus can be performed rapidly in response to a variation of an external environment without complicating the control system. Further, in order to allow the robot apparatus to perform a more smooth motion, even if the number of joint parts increases, it is possible to cause a plurality of joint parts to operate in an interlocking relationship with each other to rapidly perform posture control of the robot apparatus while little difference appears between arriving timings of control instructions transmitted to the joint parts.

Further, with the robot apparatus according to the present invention, since the component ratio in control amount can be adjusted between the integrated control means and the local control means, the robot apparatus can respond at a high speed to disturbance force by controlling the structure of a tip end portion, which has a low mechanical time constant, using the local control means. Consequently, the robot apparatus can walk on an arbitrary uneven road surface and make a reflex movement to vibration or the like caused by an impact or the like, and the system can operate stably.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 8A is a flow chart illustrating a control flow of the integrated control loop which principally processes a control instruction from the central processing apparatus, and FIG. 8B is a flow chart illustrating a control flow of the local control loop which principally processes a control instruction from the router;

DESCRIPTION OF THE PREFERRED EMBODIMENT

Figure 1:
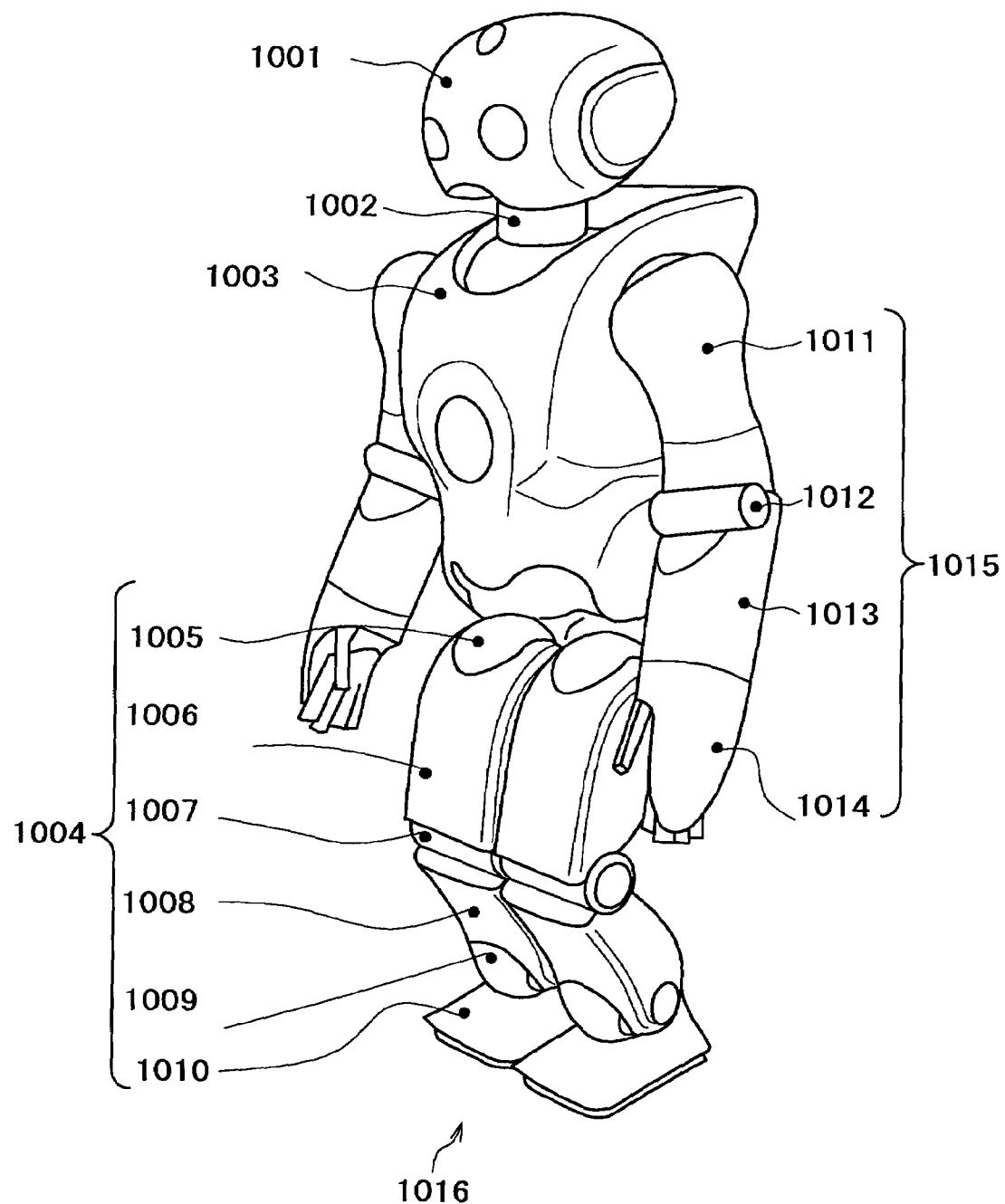
FIG. 1 is a schematic perspective view showing a legged mobile robot to which the present invention is applied when it is in an uprightly standing state as viewed from obliquely forward.
Figure 2:
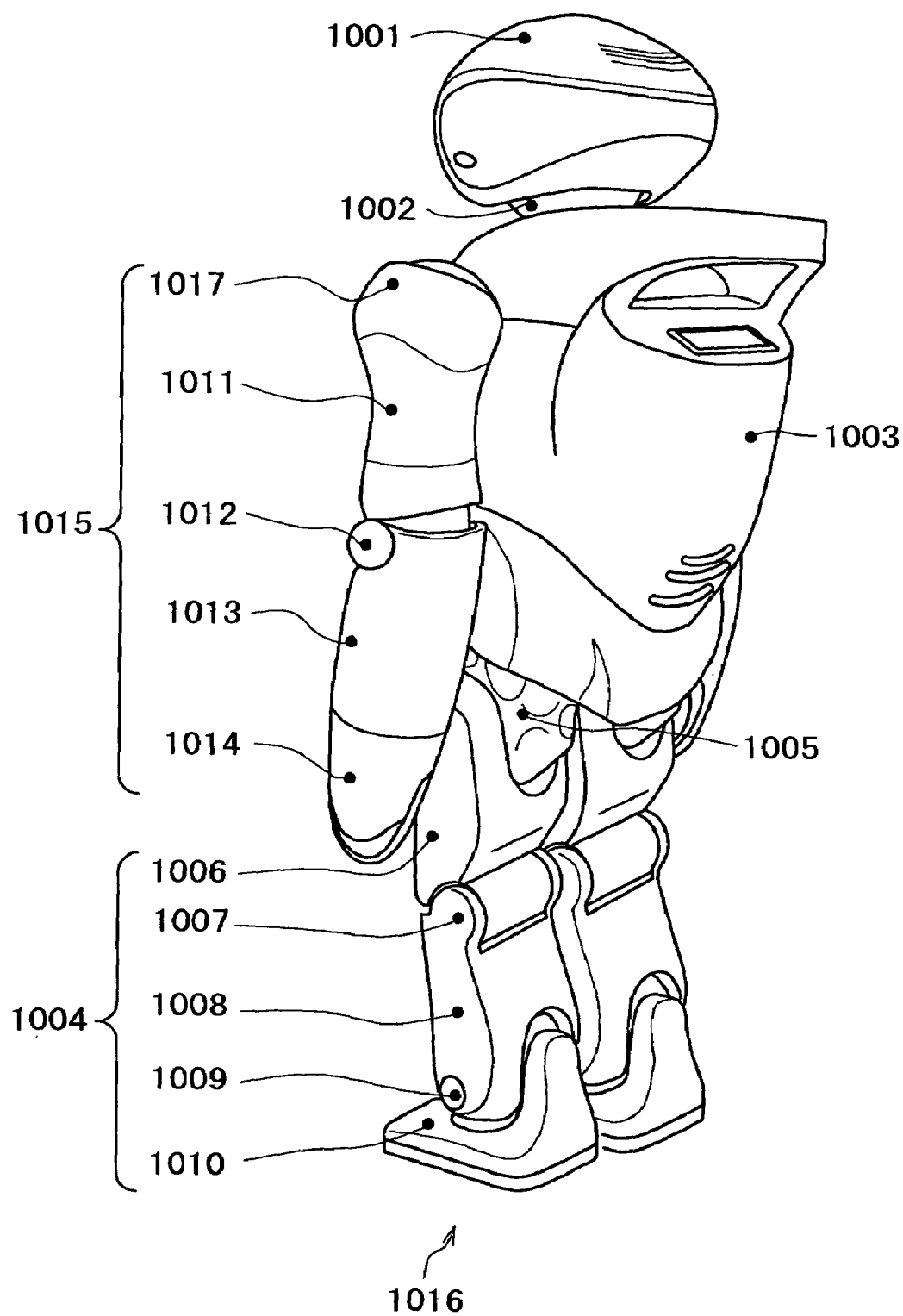
FIG. 2 is a schematic perspective view showing the legged mobile robot as viewed from obliquely backward.

Referring to FIGS. 1 and 2, there is shown a human-like or humanoid legged mobile robot to which the present invention is applied. In FIGS. 1 and 2, the legged mobile robot is shown standing uprightly as viewed from obliquely forward and obliquely rearward, respectively. The legged mobile robot includes a body part, a head part, two left and right upper limb parts, and two left and right lower limb parts used for legged traveling. A control section (not shown) is built, for example, in the body part and performs integrated control for action of the legged mobile robot.

Each of the left and right lower limb parts is composed of a femoral region, a knee joint, a shin part, an ankle and a foot and is connected to a substantially lowermost end of the trunk part by a hip joint. Meanwhile, each of the left and right upper limb parts is composed of an upper arm, an elbow joint and a front arm and is connected to a left or right side edge of an upper portion of the trunk part by a shoulder joint. Further, the head part is connected to a middle portion of a substantially uppermost end of the trunk part by a neck joint.

The control section includes a housing in which a controller (integrated control section) for controlling driving of various joint actuators of the legged mobile robot and processing external inputs from various sensors (hereinafter described) and like parts, a power supply circuit and other peripheral apparatus are accommodated. The control section may additionally include a communication interface or a communication apparatus for remote control.

The legged mobile robot having the configuration described above can achieve bipedal locomotion through whole-body cooperative motion control by the control section. Such bipedal locomotion as just mentioned is usually performed by repetitions of a walking cycle divided into the following motion periods:

(1) A single-leg supporting period within which the legged mobile robot walks using the left leg with the right leg lifted;
(2) A two-leg supporting period within which the right foot is contacted with the ground;
(3) Another single-leg supporting period within which the legged mobile robot walks using the right leg with the left leg lifted; and
(4) Another two-leg supporting period within which the left foot is contacted with the ground.

Walking control of the legged mobile robot is achieved by planning a target locus of each of the lower limbs and correcting the planned locus within each of the periods described above. In particular, within each two-leg supporting period, the correction of the lower limb loci is stopped and the height of the waist is corrected with a fixed value using a total correction amount for the planned loci. On the other hand, within each single-leg supporting period, a corrected locus is produced so that the relative positional relationship between the ankle of a leg with regard to which correction has been performed and the waist may be returned to the planned locus.

For stable control of the posture of the body beginning with locus correction in a walking motion, interpolation calculation in which a five-dimensional polynomial is usually used so that the position, speed and acceleration for minimizing the deviation with respect to a target ZMP (Zero Moment Point) may be continuous. A ZMP is used as a standard for discrimination of the stability in walking. The stability discrimination standard by a ZMP is based on the "d'Alembert's principle" that the gravity and inertial force which act from a walking system to the road surface and the moment of them are balanced with the floor reaction force as a reaction from the road surface to the walking system and the floor reaction force moment. As a consequence of mechanical inference, a ZMP at which the pitch shaft moment and the roll shaft moment are zero is present on or on the inner side of a side of a supporting polygon (that is, a ZMP stable region) formed by the ground contacting points of the soles and the road surface.

Figure 3:
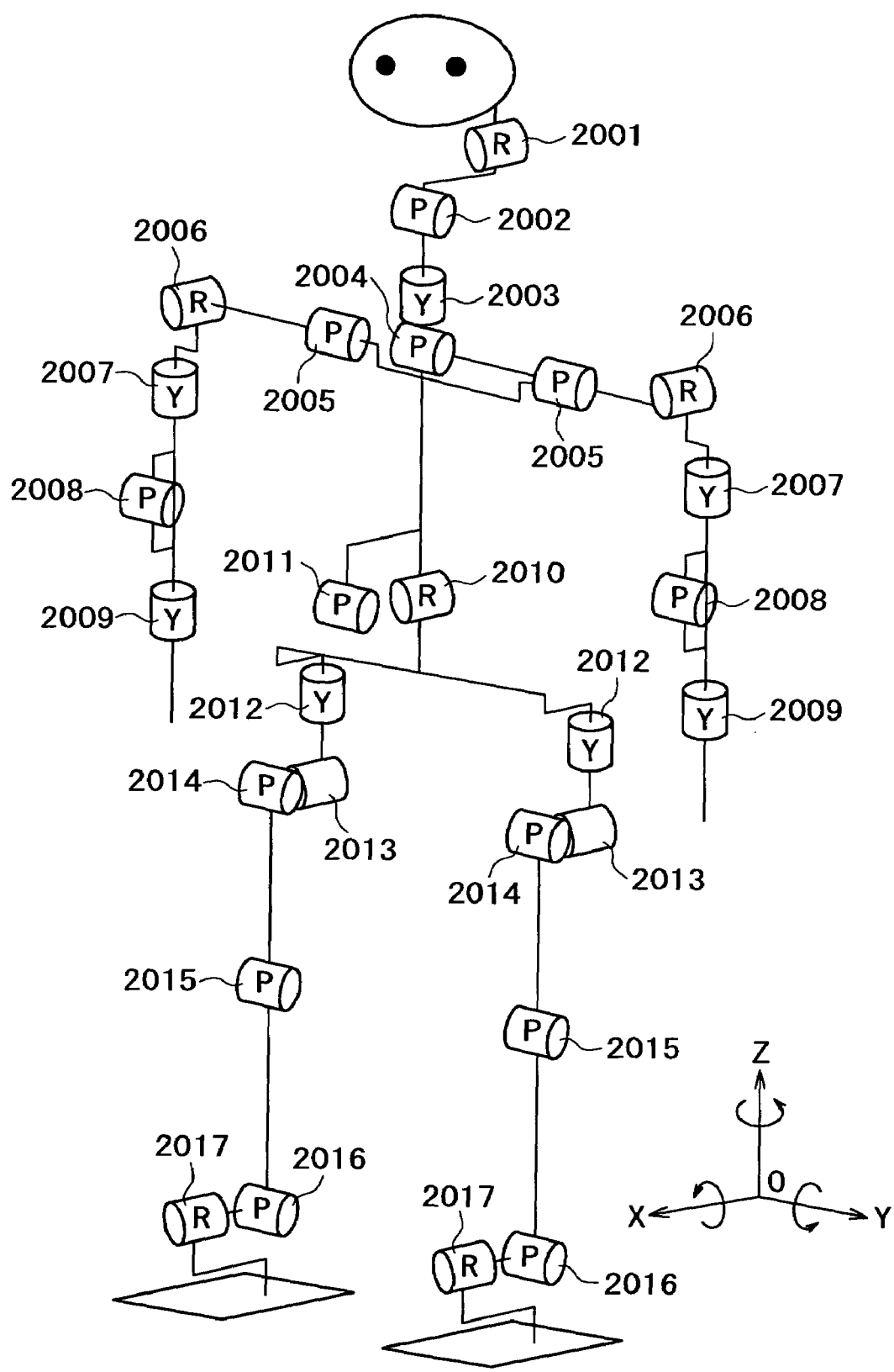
FIG. 3 is a schematic view showing a joint degree-of-freedom configuration of the legged mobile robot.

FIG. 3 schematically shows a joint degree-of-freedom configuration of the legged mobile robot. As seen from FIG. 3, the legged mobile robot is a structure having a plurality of limbs including upper limbs including two arm parts and a neck joint yaw shaft. 2003, lower limbs including two leg parts for achieving traveling motion and a trunk part for interconnecting the upper limbs and the lower limbs.

The neck joint for supporting the head part has a 3 degree-of-freedom including the neck yaw shaft 2003, first and second neck pitch shafts 2002 and 2004, and a neck roll shaft 2001.

Meanwhile, each arm part includes a shoulder joint pitch shaft 2005 of a shoulder, a shoulder joint roll shaft 2006, an upper arm yaw shaft 2007, an elbow joint pitch shaft 2008 of an elbow, a wrist joint yaw shaft 2009 of a wrist, and a hand part as a degree-of-freedom thereof. The hand part actually is a multi-joint, multi-degree-of-freedom structure including a plurality of fingers.

Meanwhile, the trunk part has a 2 degree-of-freedom including a trunk pitch shaft 2011 and a trunk roll shaft 2010.

Each of the leg parts which form the lower limbs includes a hip joint yaw shaft 2012, a hip joint pitch shaft 2014 and a hip joint roll shaft 2013 of the hip, a knee joint pitch shaft 2015 of the knee, an ankle joint pitch shaft 2016 and an ankle joint roll shaft 2017 of the ankle, and a foot part.

It is to be noted that a legged mobile robot directed for entertainment need not necessarily have all of the degrees of freedom described above or not necessarily have only the degrees of freedom described above. Naturally, it is possible to suitably increase or decrease the degree of freedom, that is, the number of joints, in accordance with restrictive conditions or required specifications in design or manufacture.

The degree of freedom of the legged mobile robot having such a configuration as described above is actually achieved using actuators. Preferably, the actuators are small in size and light in weight from such requirements that the legged mobile robot be approximated to a natural shape of a human being by removing surplus swelling in an outer appearance and that posture control be performed for an unstable structure which performs bipedal locomotion.

Figure 4:
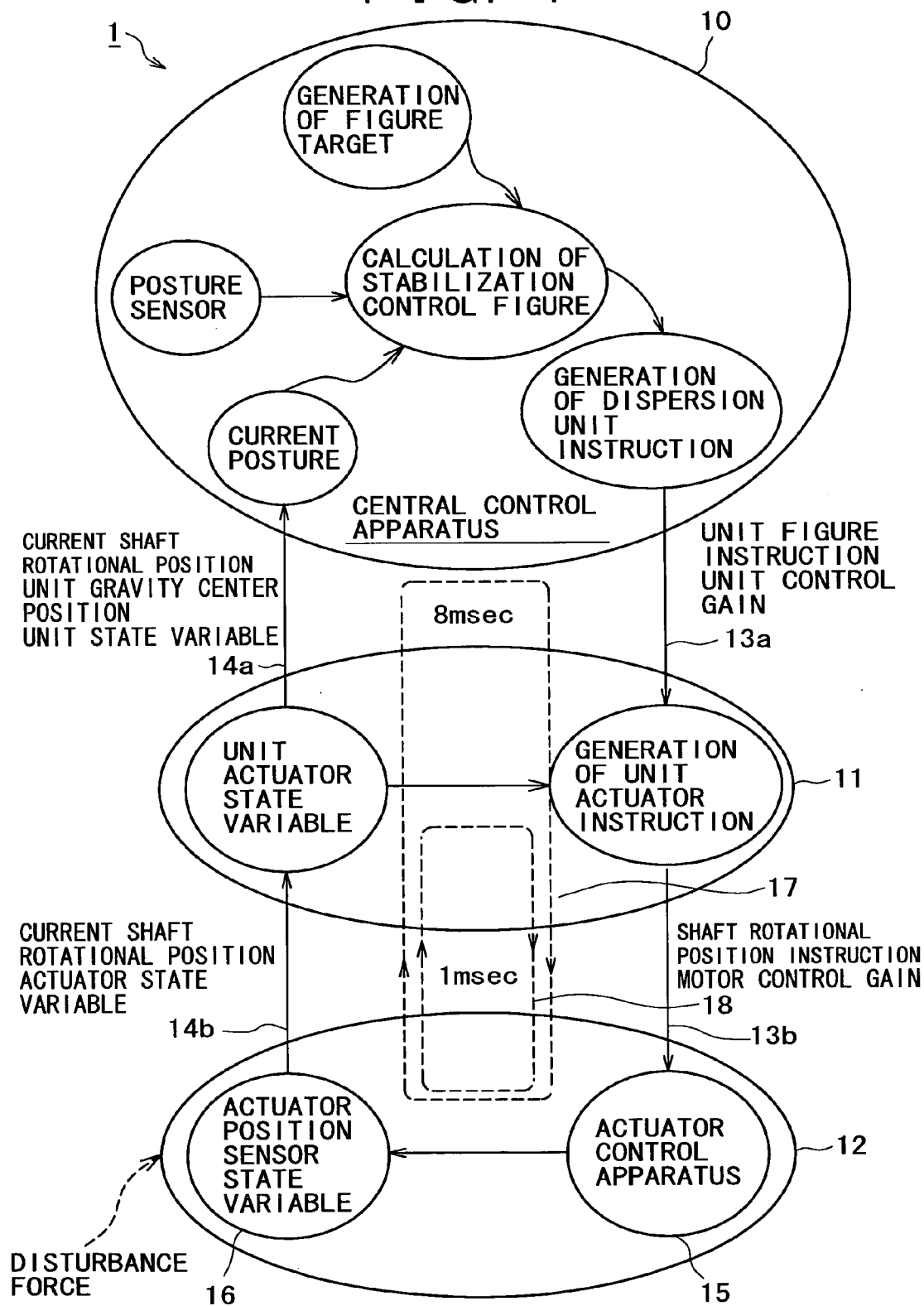
FIG. 4 is a diagrammatic view showing a basic control structure of the robot apparatus according to the present invention.

FIG. 4 shows a basic control structure of the robot apparatus according to the present embodiment. Referring to FIG. 4, the control structure of the robot apparatus includes a central control apparatus 10, a router 11 and a plurality of actuators 12. The central control apparatus 10 functions as a integrated control section for controlling action of the entire robot apparatus. The router 11 functions as a local control section or an intermediate hierarchical control apparatus connected hierarchically to the central control apparatus 10. The actuators 12 serve as driving members for driving the individual joints of the robot apparatus.

The central control apparatus 10 as a integrated control section calculates a principal control instruction to the robot apparatus. The principal control instruction is, for example, a control instruction regarding a motion which is performed by the robot to achieve an arbitrary object such as walking or posture control of the robot apparatus. The central control apparatus 10 performs a calculation of the posture for stable control based on sensor information from posture sensors, a posture target generated from an external command or the like, current posture information sent thereto through the router 11 and other required information. Then, the central control apparatus 10 generates a control instruction for designating a motor rotational angle or torque of each actuator motor or a control gain instruction based on a result of the calculation. A control instruction of the type just described is transmitted to each router in a control cycle of 8 msec. This is because the control instruction does not require quick operation control when compared with a control instruction (hereinafter described) which is calculated by the router 11 serving as a local control section when an appropriate countermeasure is taken in response to an external environment.

The physical amounts necessary for determination of the posture of the robot apparatus include the rotational position, speed of rotation and acceleration of rotation of each motor. Accordingly, not only a conventional rotational position instruction of each motor shaft but also a speed and an acceleration can be handled as posture instructions (communication instructions) from the central control apparatus 10. For example, where the robot apparatus is a humanoid, a control instruction calculated by the central control apparatus 10 is a control instruction regarding a motion of each of the parts which compose the robot such as a leg part, an arm part or the neck part. Thus, the control instruction is transmitted as a unit posture control instruction or a unit control amount (control gain) to each location which forms a unit in motion. Further, for example, where the object of control is a hand part, the posture instruction includes a state like "grasp" or "open" when the state is given as an instruction.

According to a conventional robot control configuration, a shaft rotational position instruction to be supplied from a central control apparatus to an actuator consists only of an instruction representative of a rotational position of the actuator. In contrast, in the present embodiment, a posture instruction to be supplied from the central control apparatus 10 to the router 11 includes three variables of the position, speed and torque for determining a motion. The posture instruction includes vectors of three factors including a shaft rotational position instruction, a shaft rotational speed instruction and a shaft rotational torque instruction, and consequently, a complete motion for the posture can be controlled.

Meanwhile, the router 11 serving as a local control section or an intermediate hierarchical control apparatus is connected as a lower order apparatus to the central control apparatus 10 which serves as a integrated control section. The router 11 is disposed for each of different locations such as the leg parts, arm parts and neck part. The router 11 receives a control instruction 13a transmitted thereto from the central control apparatus 10 and transmits a control instruction 13b to each actuator which functions as a driving section for driving the location at which the router 11 is provided. The control instruction 13b is, for example, a motor shaft rotational position instruction or a motor control amount (control gain) for a motor or a control circuit provided in the actuator.

Further, the router 11 not only receives a principal control instruction 13a calculated by the central control apparatus 10 and transmits a particular control instruction 13b to each actuator 12, but also calculates a required control instruction for driving the actuator 12 connected as a lower order apparatus to the router 11 in accordance with a driving state of the motor of the actuator 12 and transmits the control instruction to the actuator 12. The required control instruction is a control instruction calculated taking a driving state of the motor of the actuator 12 or information regarding displacements of a plurality of joints driven by the actuator 12 into consideration.

The actuator 12 is connected as a lower order apparatus to the router 11 and drives joints which forms the location based on a control instruction 13b transmitted thereto from the central control apparatus 10 through the router 11. Further, the actuator 12 includes an actuator control apparatus 15 which receives a control instruction 13b and controls driving of a motor for driving the joint and a sensor 16 for detecting a driving state of the motor.

Further, information 14b detected by the sensor 16 and representative of a driving state of the actuator 12 is transmitted to the router 11. The information 14b representative of a driving state includes, for example, a state variable representative of various states of the actuator 12, a shaft rotational position of the motor of the actuator 12, a displacement amount of the joint part and so forth.

A motor which composes an actuator is feedback controlled so that it operates in accordance with a posture instruction. The control gain signifies the magnitude of P, I, D of the feedback controller, for example, a PID (proportional plus, integral plus, and derivative) control apparatus. The follow-up performance of the motor responsive to a posture instruction varies in response to the control gain. For example, if the proportional gain P is decreased, then the motor follows up with an increased delay in response to a posture instruction, but if the proportional gain P is increased, then the motor operates at a higher speed. The magnitude of the error between a posture instruction and an actual motion or the response time can be adjusted by varying the control gain in this manner.

The router 11 serving as a local control apparatus or an intermediate hierarchical control apparatus produces an actuator instruction 13b including a shaft rotational position instruction and a motor control gain from a control instruction 13a received from the central control apparatus 10 and a control instruction produced by the router 11 based on a state variable of the actuator of an object of the control. The router 11 supplies the thus produced actuator instruction 13b to the actuator 12 of the lower order. Driving of each of the actuators 12 is controlled in this manner. Further, a result of the driving of the thus driven actuator, that is, the rotational angle of the motor, is detected by a position sensor such as a potentiometer provided for the actuator and is returned as a response signal 14b which includes the state variable of the actuator and the present rotational position to the router 11. Thereupon, also sensor information of a plurality of pressure sensors provided for the individual units for detecting a stimulus (disturbance force) from the outside is returned similarly as a response signal 14b to the router 11.

The actuator state variable signifies a state variable of a motor which forms an actuator. Further, the actuator state variables represent the rotational angle, rotational speed and rotational torque of the motor at present. Although only the rotational angle at present is conventionally handled as information, in the present embodiment, also the rotational speed and the rotational torque necessary for motion control can be handled as communication data in addition to the rotational angle at present. This makes it possible to drive the actuator precisely in accordance with the control instruction 13a.

The robot apparatus according to the present embodiment includes two control systems in such a control structure as shown in FIG. 4. In the integrated control loop 17 from between the two control systems, a principal control instruction 13a mentioned above is received from the central control apparatus 10 by a router 11, and a control instruction 13b is transmitted from the router 11 to each of associated actuators 12 based on the control instruction 13a. Then, information 14b such as a displacement of a joint detected upon driving of each actuator 12 is transmitted to the router 11. Further, information 14a is transmitted from the router 11 to the central control apparatus 10 based on the information 14b. A series of control operations wherein a control instruction 13a is calculated in response to the displacement of the joint by the central control apparatus 10 is performed in this manner.

A control instruction newly calculated by the central control apparatus 10 is transmitted by the integrated control loop 17. The control signal is calculated taking control instructions 13a and 13b for performing walking or posture control of the robot and information 14a and 14b representative of a state such as a displacement of the joint driven by the actuator 12 based on the principal control instructions 13a and 13b into consideration.

Accordingly, when compared with a control instruction communicated through the local control loop 18 hereinafter described, the control instruction communicated through the integrated control loop 17 does not require communication at a comparatively high speed (or it is difficult to communicate the control instruction at a high speed through the integrated control loop 17). In other words, the control information communicated through the integrated control loop 17 is a control instruction for a motion with regard to which, when inadvertent external force such as an impact is applied to a leg part, an arm part or the neck part of the robot, it is not necessary to eliminate the external force by driving the pertaining joints quickly.

On the other hand, another series of control operations is performed in the local control loop 18. In particular, information 14b regarding a driving state of each actuator 12 detected by a sensor 16 disposed for the actuator 12 is fed back to the router 11, and the router 11 calculates a control instruction for driving by the actuator 12 based on the information 14b. Then, the control instruction calculated is transmitted to the actuator 12 again.

Here, the router 11 individually calculates a control instruction based on the information 14b regarding the driving state of the actuator fed back thereto and transmits the calculated control instruction to the actuator 12 without the intervention of the central control apparatus 10. At this time, the information 14b regarding the driving state of the actuator 12 is not transmitted to the central control apparatus 10, but a control signal calculated by the router 11 is transmitted directly to the actuator 12 and the joint is driven by the actuator 12 so that a required state is established.

In the local control loop 18, information 14b regarding the driving state of an actuator 12 detected by a sensor 16 and a control instruction calculated by the router 11 based on the information 14b are communicated between the router 11 and the actuator 12. Accordingly, in the local control loop 18, the central control apparatus 10 does not calculate a control instruction, but the router 11 individually calculates a control instruction based on the information 14b and transmits the control instruction to the actuator 12. This makes it possible to reduce the communication time when the control instruction or the information 14b is communicated since the local loop 18 has short control cycle compared with that of the integrated control loop 17 in which various kinds of information are communicated through the central control apparatus 10.

A response signal 14b from each actuator 12 is returned as a response signal 14a to the central control apparatus 10 in a cycle of 8 msec through the router 11. The central control apparatus 10 can acquire the latest state variables necessary for production of a next control instruction 13a from the response signal 14a.

Meanwhile, the router 11 grasps the driving state of the actuator 12 based on the response signal 14b supplied thereto in a cycle of 1 msec shorter than that of the response signal returned from the actuator 12 to the central control apparatus 10, and produces a control signal for the actuator 12 based on the recognized driving state of the actuator 12. Then, the router 11 adjusts the component ratio between the control amount by the control instruction 13a transmitted from the central control apparatus 10 and the control amount by the control signal produced directly by the router 11 based on the response signal 14b from the actuator 12 to produce an actuator instruction 13b for driving the actuator 12.

In particular, the router 11 serving as a local control section produces an actuator control instruction 13b from a control signal produced by the router 11 based on the information 14b returned in a cycle of 1 msec from the actuator 12 and having a response cycle of 1 msec and a control instruction 13a supplied from the central control apparatus 10 in a cycle of 8 msec. Here, while the control instruction 13a from the central control apparatus 10 is not supplied to the router 11 (or a response cannot be given in time), the router 11 individually controls driving of the actuator 12 based on a response signal. Further, when an instruction is supplied from the central control apparatus 10 to the router 11, the router 11 performs gain control with the control signal produced individually by the router 11 (or control of the component ratio) to control a unit driving apparatus in a cycle of 1 msec.

In the present embodiment, reflexive control to a disturbance is permitted by a high frequency band response, that is, a high speed response, by the local control loop 18. From restrictions to the power consumption of a battery driving apparatus and so forth, there is a limitation to increase of the speed of the control cycle of the central control apparatus 10 of the higher order. External force applied to the body is a high frequency band disturbance input, and a very high speed control system is required in order to cope with such external force. Therefore, the router 11 corresponding to an intermediate hierarchy operates in a high speed cycle making use of the local control loop 18 to respond to the disturbance input at a high speed to absorb a deviation caused by the disturbance. Accordingly, different from a conventional system wherein a reflex model is simulated by a central calculation section, the present embodiment allows construction of a control system which allows high speed adjustment.

While the control system in the present embodiment has a hierarchical structure of the integrated control loop 17 and the local control loop 18 as shown in FIG. 4, by setting the control cycle of the local control loop 18 shorter than the control cycle of the integrated control loop 17, control of an adaptive motion of the apparatus wherein the local control loop 18 responds at a high speed to a high frequency band disturbance can be achieved. This is described with reference to FIG. 5.

A second control cycle within which the router 11 performs communication with the actuator 12 in the local control loop 18 to transmit a control instruction and receive information 14b regarding a driving state is set shorter than a first control cycle within which the router 11 transmits a control instruction and acquires information 14a and 14b representative of a driving state in the integrated control loop 17.

Here, for a period until a next first control cycle comes, the router 11 individually calculates a control instruction based on the information 14b fed back thereto and regarding the driving state of the actuator 12, and transmits the calculated control instruction to the actuator 12. At this time, the information 14b regarding the driving state of the actuator 12 is not transmitted to the central control apparatus 10. Instead, the control instruction calculated by the router 11 is transmitted to the actuator 12, and the associated joint is driven by the actuator 12 so that a required state may be established. Since the router 11 which corresponds to an intermediate hierarchy operates in a high speed cycle making use of the local control loop 18, the robot can respond at a high speed to absorb a deviation caused by a disturbance.

Then, when a next first control cycle comes, the router 11 transmits the information 14b regarding the driving state of the actuator 12 to the central control apparatus 10. In response to the information 14b, the central control apparatus 10 corrects the target value based on the state conveyed thereto to issue a new control instruction.

Since a control signal is received from the central control apparatus 10 for each first control cycle, both of the control amount calculated individually for the actuator 12 by the router 11 and the control amount received from the central control apparatus 10 are present in the router 11. Thus, the router 11 suitably adjusts the component ratio between the control amounts to form a control amount for the actuator 12.

Figure 6:
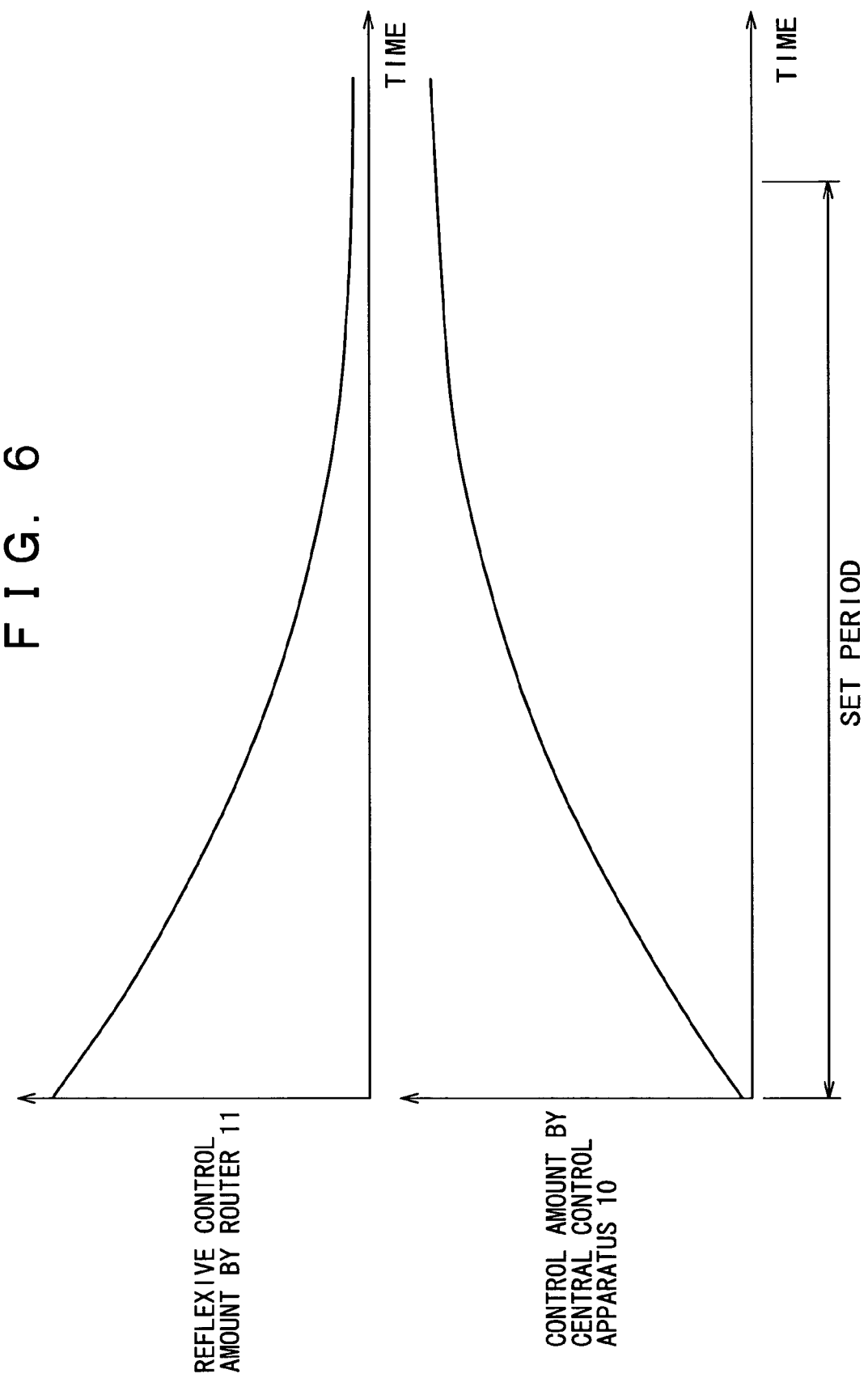
FIG. 6 is a diagram showing a motion chart in adjustment of the component ratio between two control amounts by a router when the robot apparatus is acted upon at an actuator or a joint part thereof by a disturbance of a high frequency band by external force.

FIG. 6 shows a chart of operation for adjusting the component ratio between the two control amounts by the router 11 when a high frequency band disturbance such as external force acting upon the actuator 12 or the joint occurs.

In FIG. 6, the axis of abscissa indicates the time. Meanwhile, the axis of ordinate indicates the control amount actually transmitted from the router 11 or the central control apparatus 10 to the actuator 12. The zero point on the time axis is set to a point of time at which the robot apparatus is acted upon by a high frequency band disturbance.

In an ordinary operation condition, voluntary apparatus driving is executed based on a predetermined behavior plan principally by the central control apparatus 10 serving as a higher order integrated control section.

Here, if the robot apparatus is acted upon by a high frequency band disturbance, then the router 11 operates in a high speed cycle making use of the local control loop 18 to respond at a high speed to the disturbance so that router 11 absorbs a deviation caused by the disturbance. In particular, a reflexive involuntary control instruction from the router 11 serving as a local control section controls the actuator 12 which is connected as a lower hierarchy apparatus to the router 11. As a result, the ratio between the control amounts is adjusted such that, immediately after the robot apparatus is acted upon by a high frequency band disturbance, the control amount transmitted from the router 11 serving as a local control section to the actuator 12 is very great while conversely the control amount transmitted from the central control apparatus 10 serving as a integrated control section to the actuator 12 is very small.

Figure 5:
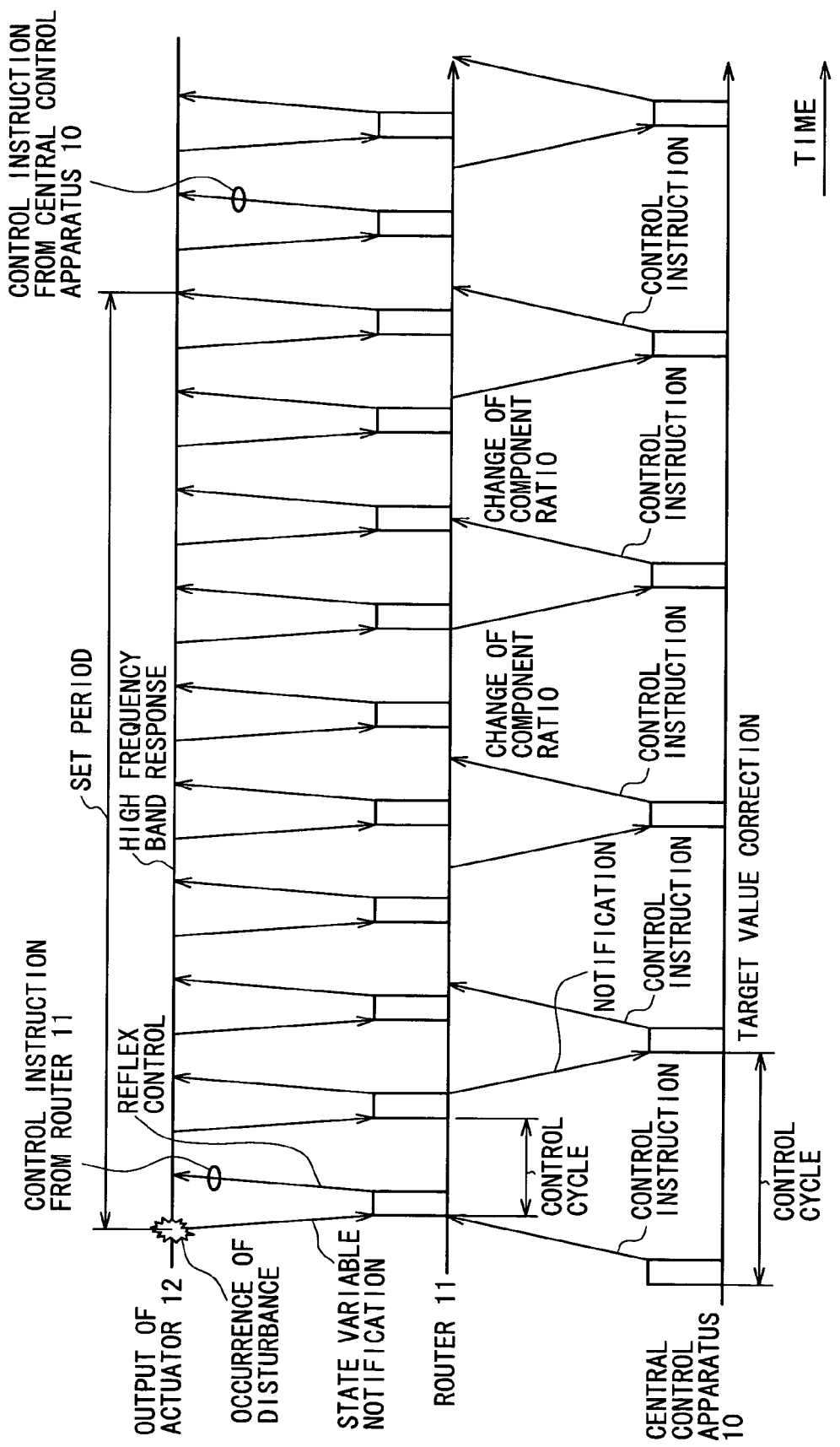
FIG. 5 is a diagram illustrating motions for each control cycle of an integrated control loop and a local control loop shown in FIG. 4.

Thereafter, the router 11 transmits information 14b regarding the driving state of the actuator 12 to the central control apparatus 10 after each control cycle on the central control apparatus 10 side (refer to FIG. 5). In contrast, the central control apparatus 10 successively corrects the target value based on the state of the actuator 12 conveyed thereto through the router 11 to issue a new control instruction. Whereas the actuator 12 performs, upon high speed response to a disturbance, a reflexive motion greatly different from the control instruction from the central control apparatus 10, the motion thereof gradually approaches a voluntary motion which conforms to the control instruction from the central control apparatus 10 in this manner.

Thus, the component ratio between the control instructions is adjusted as time passes such that the control amount to be transmitted from the router 11 serving as a local control section to the actuator 12 is gradually decreased while the control amount to be transmitted from the central control apparatus 10 serving as a integrated control section to the actuator 12 is gradually increased.

Then, when predetermined set time elapses, the control amount to be transmitted from the router 11 serving as a local control section directly to the actuator 12 decreases to almost zero. Consequently, the actuator 12 is placed into a control range of the central control apparatus 10 serving as a integrated control section, and a voluntary motion of the actuator 12 based on the behavior plan is resumed.

Figure 7:
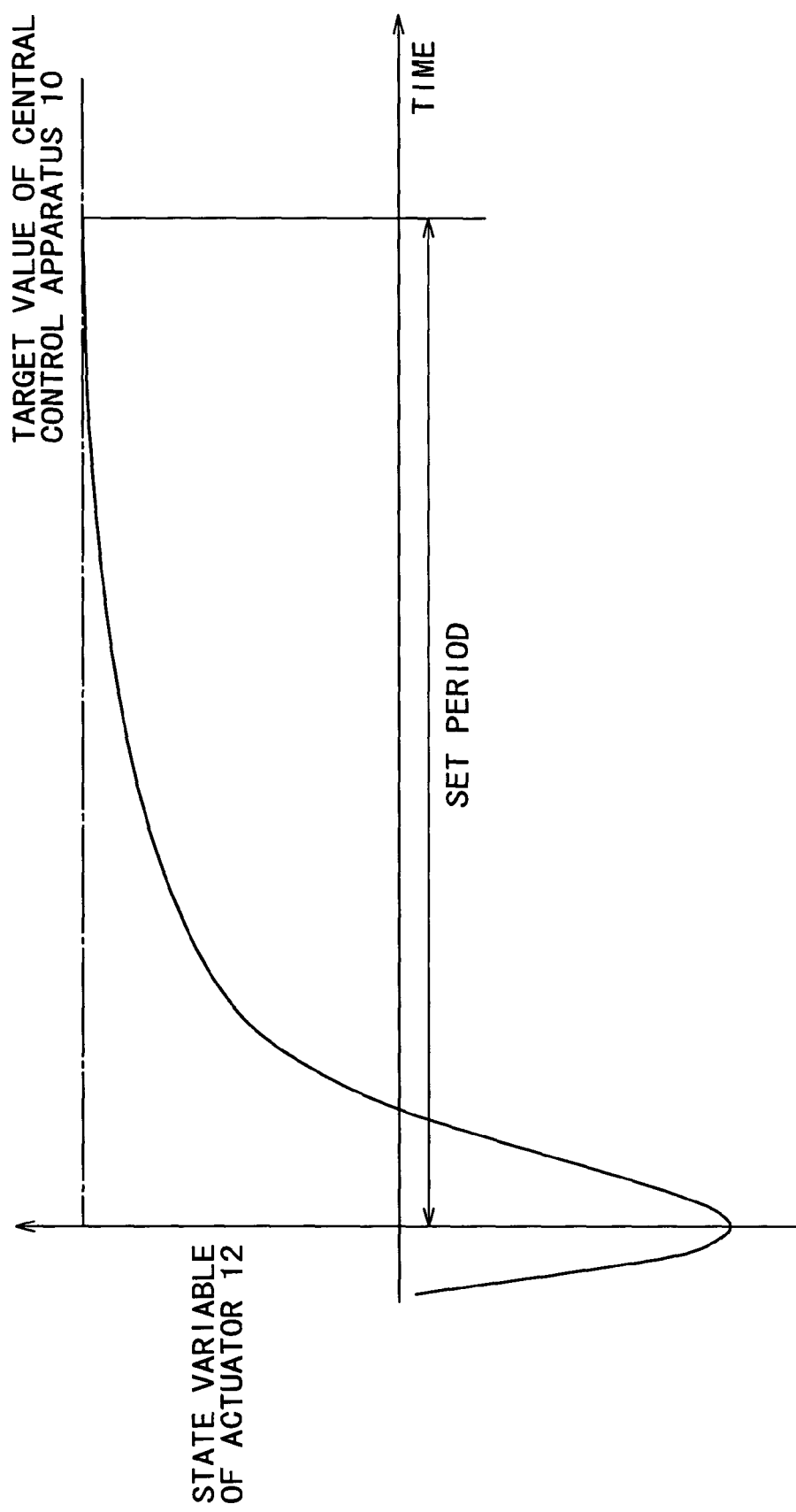
FIG. 7 is a diagram illustrating a variation with respect to time of an output value of the actuator with respect to a target value from a central control apparatus after the robot apparatus is acted upon by the disturbance of a high frequency band.

FIG. 7 illustrates a variation with respect to time of the output value of the actuator 12 responsive to a target value of the central control apparatus 10 after the robot apparatus is acted upon by a high frequency band disturbance.

As seen from FIG. 7, immediately after the actuator 12 responds in a high frequency band to a disturbance, it is in an unstable operation state in which it performs a reflexive motion greatly different from the control instruction from the central control apparatus 10.

Thereafter, the central control apparatus 10 successively corrects the target value based on the state of the actuator 12 conveyed thereto through the router 11 to issue a new control instruction. As a result, the output value of the actuator 12 gradually approaches the target value of the central control apparatus 10. Then, when the predetermined set time elapses, the output value of the actuator 12 restores that in a steady state substantially equal to the target value of the central control apparatus 10.

The time required for recovery of an ordinary state wherein the central control apparatus 10 has the control right of the actuator 12 after the router 11 performs a reflexive response to a high frequency band disturbance is hereinafter referred to as "set time". The set time can be determined in accordance with an object apparatus motion by the central control apparatus 10. Where the robot apparatus is, for example, such a legged mobile robot as shown in FIGS. 1 and 2, the set time depends upon the walking cycle wherein the movable legs are used.

FIG. 8A shows a control flow of the integrated control loop which handles a control instruction from the central control apparatus 10, and FIG. 8B shows a control flow of the local control loop which handles a control instruction from a router 11. Here, various controls executed when an inadvertent impact acts upon a component of the robot in posture control of the robot are described as an example. It is to be noted, however, that a variation of the external environment which makes the posture control of the robot unstable is not limited to an inadvertent impact. In particular, the variation of the external environment may be external force acting upon the robot when a predetermined motion of the robot is disturbed by the road surface or an obstacle on the route upon walking of the robot. Further, the variation of the external environment may be an excessive temperature rise detected by any of temperature sensors disposed at different locations of the whole body.

In the integrated control loop 17, after the robot 1 is activated, the central control apparatus 10 calculates control instructions 13a regarding the posture control of the robot 1 based on an arbitrary object and transmits the control instruction 13a to the routers 11 (step S21).

Each of the routers 11 transmits control instructions 13b suitable for the associated actuators 12 to the associated actuators 12 based on the control instructions 13a (step S22). Each of the actuators 12 is driven based on the pertaining control instruction 13b to drive an associated joint to perform posture control of the robot.

When the actuator 12 is driven, the displacement of the actuator 12 is detected as a state variable representative of the state of the actuator 12 by an associated sensor 16 (step S23). Information 14b regarding the state of the actuator 12 is transmitted to the central control apparatus 10 through the router 11. Consequently, the motion of the robot is feedback controlled (step S24).

Meanwhile, in the local control loop 18, if a sensor 16 detects a displacement of an associated actuator 12 caused by external force acting upon the actuator 12 or an associated joint, then it feeds back the displacement to an associated router 11 (step S31).

The router 11 individually calculates a required control instruction based on the information fed back thereto and transmits the control instruction to the actuator 12 (step S32). Here, the required control instruction includes a control instruction for driving the associated joint so as to attenuate the external force.

The actuator 12 drives the joint based on the required control instruction transmitted thereto from the router 11 to attenuate the impact (step S33).

After operation of the robot apparatus is started, target posture instructions are generated by the central control apparatus 10 first and the control instruction (value) is sent to the individual routers 11 each serving as a local control section or an intermediate hierarchical control apparatus in a control cycle of 8 msec. Then, each of the routers 11 calculates a control signal for controlling an associated actuator 12 based on the posture instruction received. Thus, the actuator 12 is controlled with the control signal from the router 11. Then, an actuator state variable representative of a rotational position of the thus driven actuator 12 is detected and supplied to the router 11. Thus, the router 11 produces an optimum control signal for controlling the actuator 12 in a control cycle of 1 msec based on the actuator state variable included in the response signal from the actuator 12. A motion of the reflex system is performed through repetitions of the processing described above.

Such actuator state variables from the routers 11 as mentioned above and other sensor output values are returned to the central control apparatus 10. Then, also the central control apparatus 10 produces control instructions again based on the sensor information and so forth and supplies the control instructions to the routers 11. As described hereinabove, while the control instruction from the central control apparatus 10 is issued in a cycle of 8 msec, the cycle of the actuator control signal produced directly in response to a response signal from an actuator by the router 11 is 1 msec and shorter than the cycle of the control signal from the central control apparatus 10.

If the impact is not attenuated sufficiently with the required control instruction calculated by the router 11, information 14b regarding the state of the actuator 12 is detected again, and the actuator 12 is driven based on a required control instruction calculated based on the information 14b to drive the associated joint. Then, such control of the actuator 12 through the local control loop 18 is performed continuously until the impact is attenuated.

Further, in the integrated control loop 17, each router 11 does not individually calculate a control instruction regarding driving of an associated actuator 12. However, in the local control loop 18, each router 11 can individually calculate a control instruction based on state variables such as a displacement of an associated actuator 12 to drive the actuator 12 rapidly so that external force such as an impact may be attenuated.

In particular, in the integrated control loop 17 wherein a control instruction is calculated by the central control apparatus 10, each router 11 plays a role of transferring (relaying) a control instruction between the central control apparatus 10 and an associated actuator 12. In the local control loop 18, however, each router 11 can calculate a control instruction for driving an associated actuator 12 based on a state such as a displacement of the actuator 12 or an associated joint by a variation of external environment such as external force so that a plurality of joints may operate rapidly in an interlocking relationship with each other.

In this manner, in the present embodiment, since a plurality of routers 11 which can individually control a small number of actuators are disposed as local control sections or intermediate hierarchical control apparatus in a lower hierarchy of the central control apparatus 10 and have a shorter control cycle, the robot apparatus can achieve such a rapid movement as is equivalent to a reflex movement of a human being. Also when an instantaneous motion is required, for example, against an impact, the impact can be attenuated by driving the joints rapidly. Consequently, damage to the robot can be prevented and the stability in posture control can be secured.

Further, since each router 11 calculates a control instruction, the load to be applied to the central control apparatus 10 can be moderated. Consequently, the processing circuit provided in the central control apparatus can be minimized without degrading the motion controllability of the robot.

Figure 9:
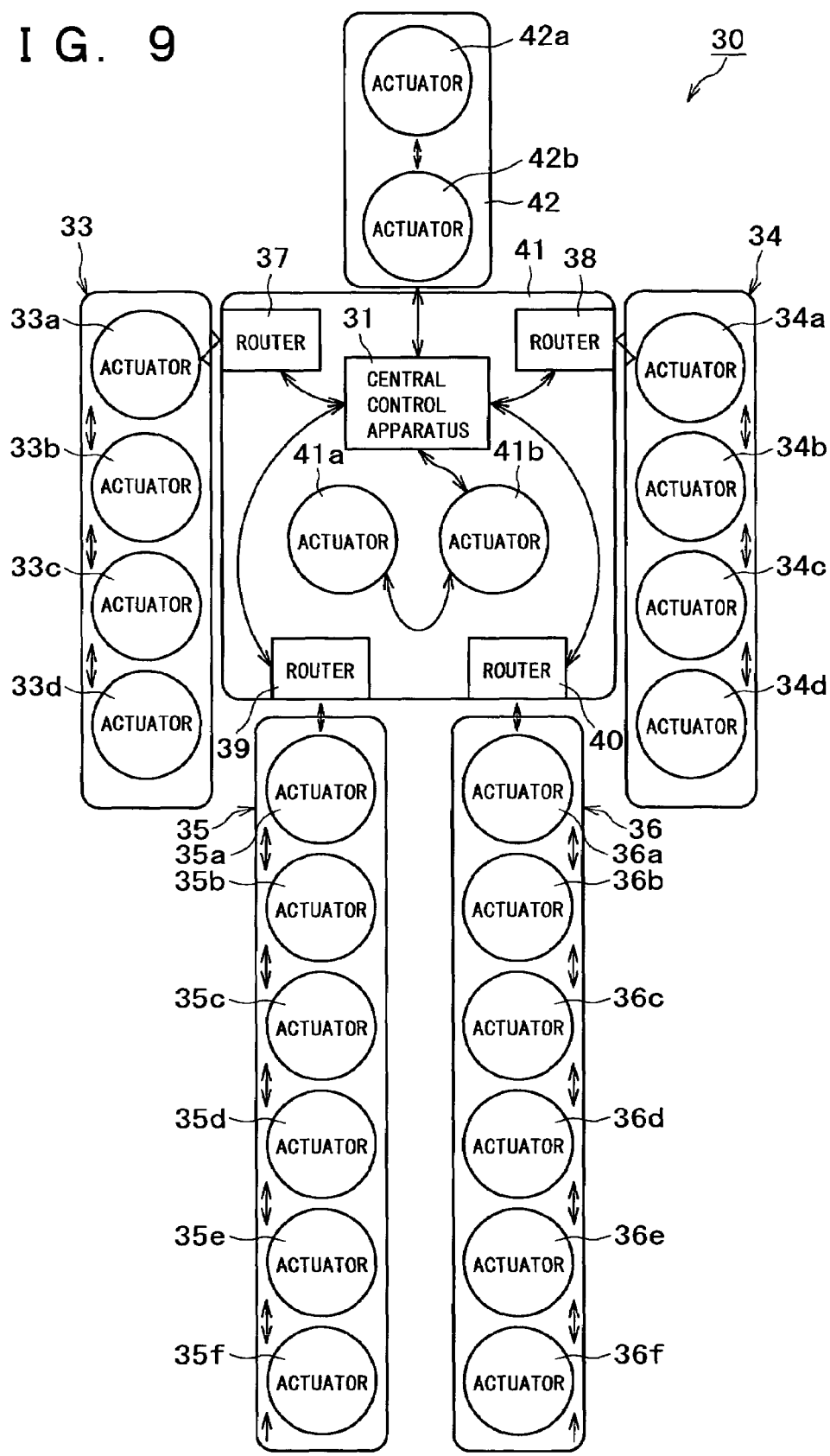
FIG. 9 is a schematic diagrammatic view showing a control configuration of a humanoid.

Subsequently, a structure of the robot apparatus having such two control systems as described above is described. FIG. 9 schematically shows a control configuration of a humanoid (refer to FIGS. 1 and 2) as an example of the robot apparatus according to the present invention.

Referring to FIG. 9, a central control apparatus 31 serving as a integrated control section for performing integrated control for a motion of the humanoid 30 is disposed in the trunk part 41 of the humanoid 30. Further, routers 37, 38, 39 and 40 serving as local control sections for the arm parts 33 and 34 and the leg parts 35 and 36 of the humanoid 30 are disposed in the trunk part 41.

A plurality of actuators are connected in a daisy chain connection to each of the routers 37, 38, 39 and 40 such that they may be within the control range of the latter, and form a single transmission line system for each of the arm parts 33 and 34 and the leg parts 35 and 36. For example, four actuators 33a to 33d are connected in a daisy chain connection for the arm part 33 while four actuators 34a to 34d are connected in a daisy chain connection for the arm part 34 similarly.

In the present embodiment, four actuators are connected in a daisy chain connection to each of the arm parts 33 and 34, and six actuators are connected in a daisy chain connection to each of the leg parts 35 and 36. However, the number of actuators to be connected in a daisy chain connection to each router may be determined based on the number of joints which form an associated one of the arm parts and the leg parts, and may or may not be equal to that of the associated joints shown in FIG. 9.

In the example shown in FIG. 9, the routers 37 to 40 are disposed for the arm parts 33 and 34 and the leg parts 35 and 36, respectively. However, such routers need not necessarily be connected for the arm parts and the leg parts, but a router may be disposed for each of arbitrary component units of the humanoid 30. Accordingly, a router may be disposed for each of the elbow joints, for each of the shoulder joints, for each of the hip joints or for each of the knee joints. Anyway, a router can be disposed for each desired component unit.

Figure 31:
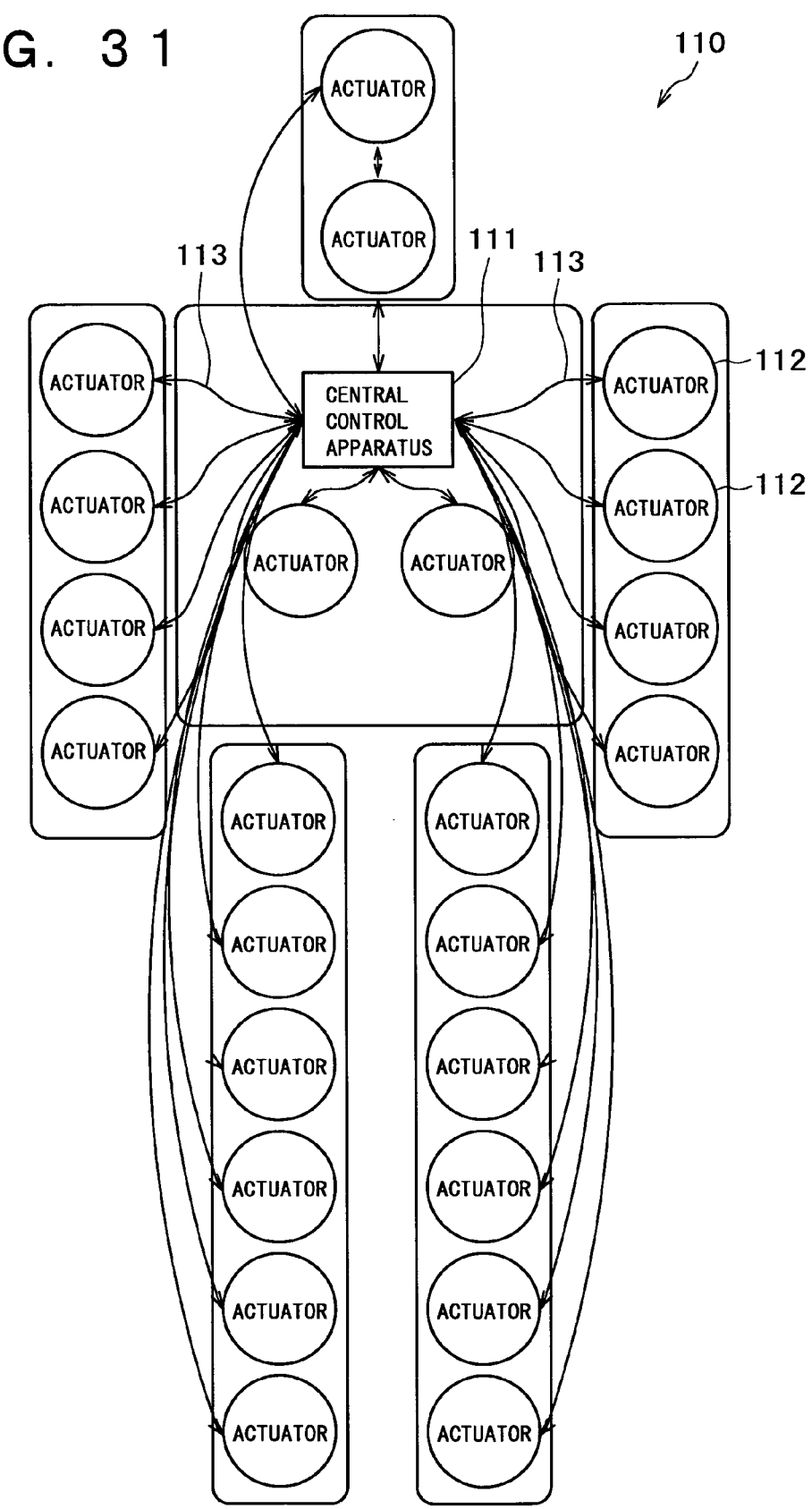
FIG. 31 is a schematic diagrammatic view showing a robot apparatus having a conventional configuration.
Figure 32:
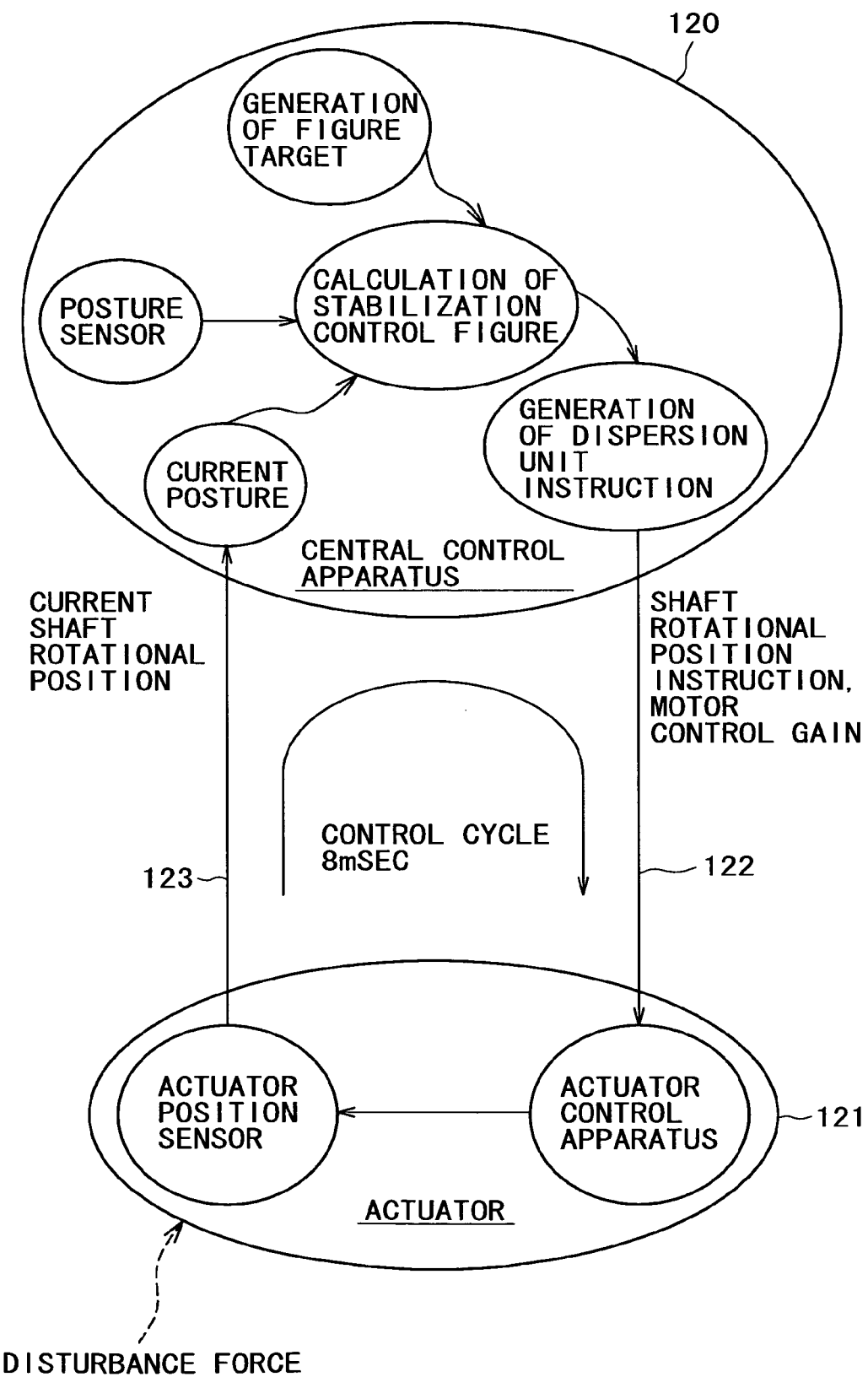
FIG. 32 is a diagrammatic view showing an example of a control structure of the conventional robot apparatus shown in FIG. 31.
Figure 33:
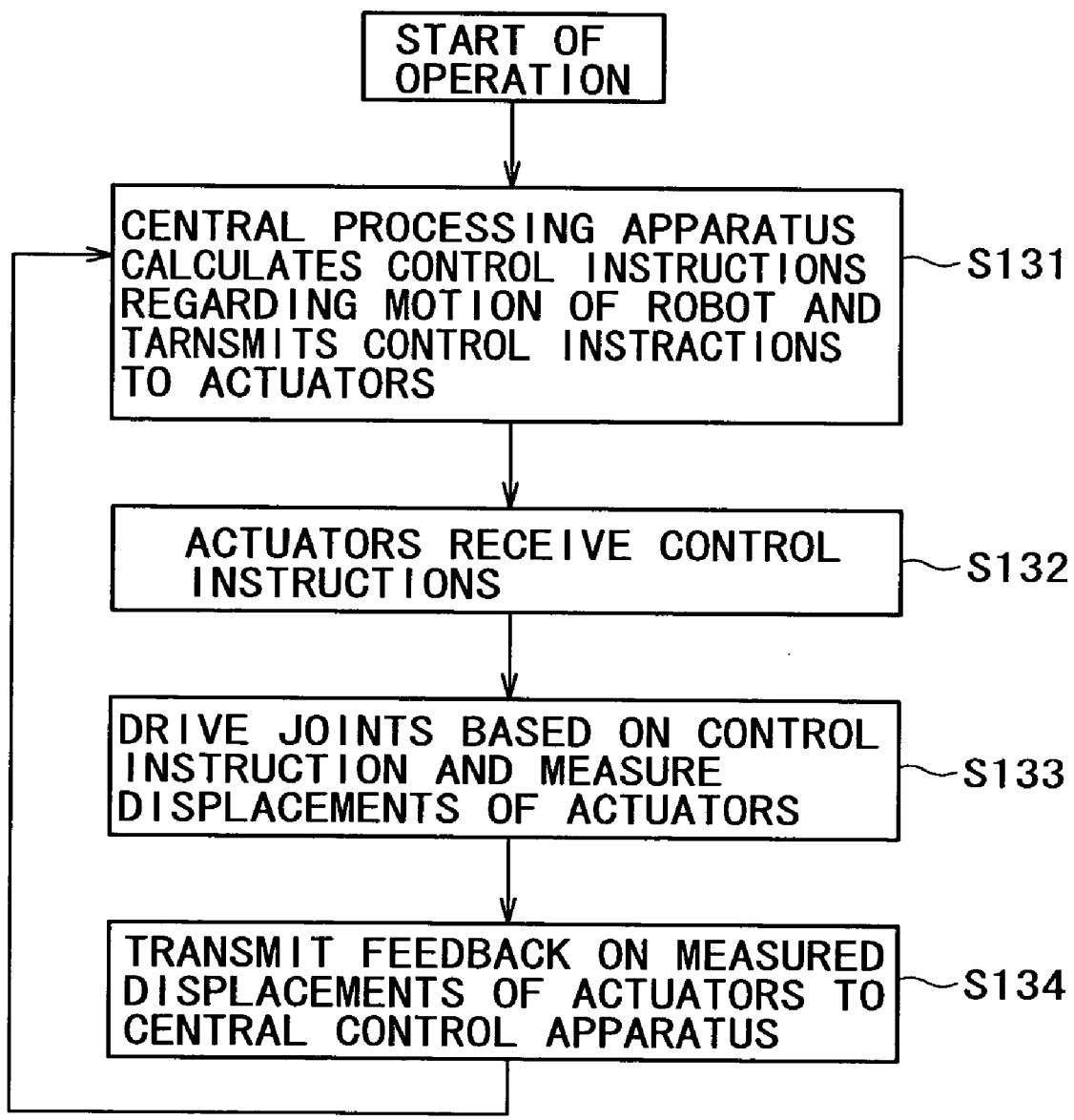
FIG. 33 is a flow chart illustrating a conventional control flow for a robot apparatus.

The routers 37 to 40 are connected individually to the central control apparatus 31 through respective signal transmission cables. Thus, transmission lines from the central control apparatus 31 to the actuators 33d, 34d, 35f and 36f connected at the lowest order to the routers 37 to 40 are formed individually. Accordingly, when compared with the control configuration of the conventional robot apparatus shown in FIG. 31, the number of signal transmission cables for interconnecting the central control apparatus and the actuators can be reduced.

It is to be noted that, in the example shown in FIG. 9, in the trunk part 41 and the neck part 42 each of which has a smaller number of joints than the arm parts 33 and 34 and the leg parts 35 and 36, each of the actuators 41a, 41b, 42a and 42b is connected to the central control apparatus 31 without the intervention of a router. However, each of the actuators 41a, 41b, 42a and 42b may otherwise be connected to the central control apparatus 31 through a router.

In the humanoid 30 according to the present embodiment, sensors (not shown) for detecting a joint ankle and other states are disposed for each of the actuators 33a, 33b, . . . 42b, and the integrated control loop is formed from the central control apparatus 31, the routers 37 to 40, and the actuators 33a, 33b, . . . 42b connected in a daisy chain connection for the individual routers. In other words, a principal control instruction for performing a motion suitable for an arbitrary object regarding the robot apparatus is transmitted to and calculated by the central control apparatus 31.

Further, in the humanoid 30 according to the present embodiment, the local control loops are formed individually from the routers 37 to 40 and the actuators 33a, 33b, . . . , 42b connected in a daisy chain connection to the routers 37 to 40. When a motion regarding the robot apparatus is performed, operation control in normal operation and operation control in an inadvertent situation can be performed without applying a high load to the central control apparatus 31 by means of the integrated control loop for driving the joints in accordance with control instructions calculated by the central control apparatus 31 and the local control loops for controlling driving of the joints comparatively rapidly in order to prevent or moderate an inadvertent impact or an obstacle at an instant. Further, since the total number and length of signal transmission cables for connecting the different components can be reduced, the robot apparatus can be miniaturized.

Figure 10:
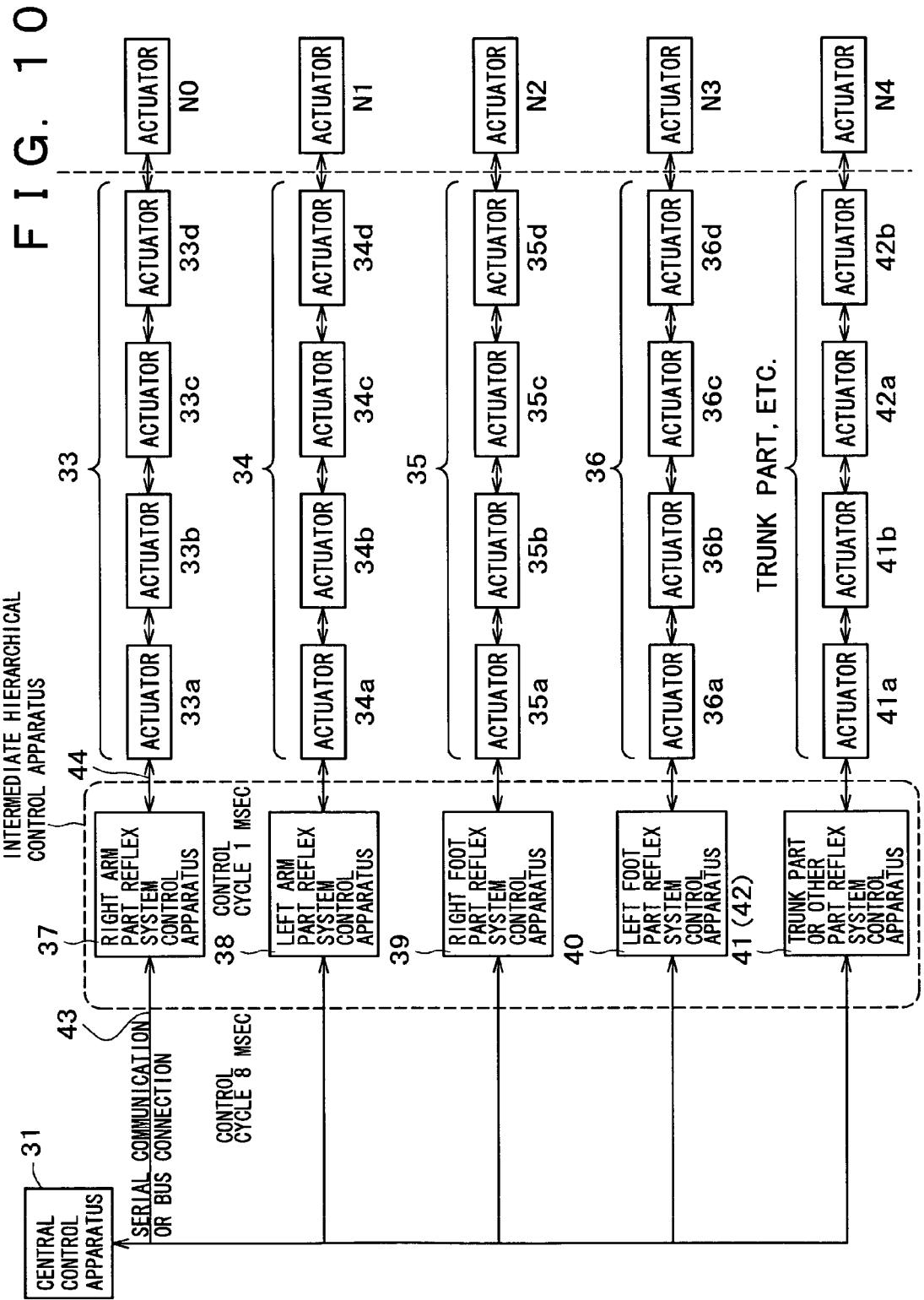
FIG. 10 is a diagrammatic view showing connections between different components of the robot apparatus shown in FIG. 9.

FIG. 10 schematically shows connection states of the components of the robot apparatus shown in FIG. 9.

In the humanoid 30, the central control apparatus 31 is connected to the routers 37 to 40 disposed individually for the arm parts 33 and 34, leg parts 35 and 36 and other locations (trunk part 41 and neck part 42) through a universal bus or serial communication so that data can be communicated between them. Further, each router is connected to several actuators in a daisy chain connection by a signal transmission path such that the actuators are controlled by the router. It is to be noted that the arm parts 33 and 34 and the leg parts 35 and 36 are shown separately for the left and the right in FIG. 10.

An arbitrary number of actuators may be connected in a daisy chain connection, and a connection state of the parts is described below taking the right arm part as an example. In FIG. 10, for the arm part 33, four actuators are shown connected to each of the routers 37. The actuators are hereinafter referred to as first to fourth actuators 33a to 33d. The router 37 and the central control apparatus 31 are connected to each other through a universal bus 43 (or by serial communication). The router 37 acquires a principal control instruction regarding a motion of the humanoid 30 produced by the central control apparatus 31 through the universal bus 43. Further, the router 37 transfers a result of transmission of the principal control instruction to a transmission path 44, information regarding the driving states of the actuators 33a to 33d acquired from the actuators 33a to 33d and other necessary information through the universal bus 43 to the central control apparatus 31.

The robot control configuration in the present embodiment has a hierarchical structure, and the routers 37 to 40 are positioned as intermediate hierarchical control apparatus in a lower hierarchy with respect to the central control apparatus 31. The central control apparatus 31 controls a motion of the entire robot apparatus. In contrast, each of the intermediate hierarchical control apparatus performs motion control of a portion (hereinafter referred to also as "unit") of the robot apparatus which includes a small number of actuators, and principally controls a reflex motion of the robot apparatus. In the case of such a legged mobile robot as shown in FIGS. 1 to 3, a plurality of intermediate hierarchical control apparatus such as a control apparatus for a right foot part reflex system, a control apparatus for a left fool part reflex system, a control apparatus for a right hand part reflex system and a control apparatus for a left hand reflex system are disposed in a decentralized state (refer to FIG. 9).

The control system for the right foot part reflex system processes sensor signals from a plurality of sensors such as pressure sensors provided for the right foot part and each serving as a detection element for detecting a stimulus from the outside and a control signal from the central control apparatus 31 to produce driving control signals. The control system for the right foot part reflex system supplies the driving control signals to the actuators disposed for the right foot part. Similarly, the control system for the left foot part reflex system outputs driving signals for driving the actuators disposed for the left foot part. Further, each of the control system for the right hand part reflex system and the control system for the left hand part reflex system outputs driving signals for driving the actuators disposed for the right hand part or the left hand part.

A motion of the whole body of the robot apparatus is performed in the following manner. First, the central control apparatus 31 sets motions of the foot parts, a ZMP locus, a motion of the trunk, motions of the upper limbs, a height of the waist and so forth. Then, the central control apparatus 31 transfers control signals indicative of motions according to the set contents to the intermediate hierarchical control apparatus provided corresponding to the individual units. Then, the intermediate hierarchical control apparatus output driving signals for driving the actuators of respective objects of control based on the control signals. Here, in the present embodiment, sensor signals from pressure sensors and so forth provided for the individual units are supplied to the individual intermediate hierarchical control apparatus in order to perform a reflex motion in response to a stimulus from the outside. The intermediate hierarchical control apparatus produces control signals for individually controlling the actuators based on the sensor signals supplied thereto. In particular, each of the intermediate hierarchical control apparatus adjusts the component ratio between the control signal transferred from the central control apparatus 31 and the control signal produced by the intermediate hierarchical control apparatus and outputs a control signal after the adjustment as described above (refer to FIG. 6).

In this instance, the central control apparatus 31 is obliged to calculate by a great amount because it produces control signals for all of the actuators of the robot apparatus in order to control operation of the entire robot apparatus. For example, the cycle (control cycle) of the control signals transmitted from the central processing apparatus 31 is 8 msec. In contrast, each of the intermediate hierarchical control apparatus performs a smaller amount of calculation for control signals for performing a partial reflex motion, for example, only of the right foot or only of the left foot. Therefore, the control period of the intermediate hierarchical control apparatus is as short as, for example, 1 msec. Each of the intermediate hierarchical control apparatus produces a control signal for performing a reflex motion in such a short control cycle as just mentioned separately from a control signal from the central control apparatus 31 and thus performs adjustment between the two different control signals. Consequently, the robot apparatus not only can perform an ordinary motion such as walking or stopping but also can perform a reflex motion. Further, sensor signals supplied to each of the intermediate hierarchical control apparatus are supplied also to a higher layer intermediate hierarchical control apparatus or the central control apparatus 31.

Further, though not shown, another hierarchical structure wherein a plurality of different intermediate hierarchical control apparatus are connected as a different lower hierarchy or hierarchies by nesting may be employed. In this instance, each of the intermediate hierarchical control apparatus individually controls some or all of elements of one of the units such as the head part unit, an arm part unit or a leg part unit so that they may perform a reflex motion in response to a stimulus from the outside. In other words, while the central control apparatus 31 performs driving control of all of the actuators, each of the intermediate hierarchical control apparatus controls those actuators which are included in a control range thereof in a control cycle (response cycle) shorter than that of the central control apparatus 31. Here, each of the intermediate hierarchical control apparatus performs driving control for performing a reflex motion responsive to a stimulus from the outside based on, for example, a sensor signal from a position sensor (potentiometer) provided for an actuator of an object of control. Thus, each of the intermediate hierarchical control apparatus includes an adjustment section for performing adjustment of the driving control with the control from the central control apparatus 31 as can be recognized from the foregoing description given with reference to FIG. 6.

Where a robot apparatus having such a multi-axis configuration as shown in FIG. 3 is controlled, it is estimated that a portion of the robot apparatus such as an arm, a foot or the neck which contacts frequently with the external environment suffers from a problem of an impact when a foot part contacts with the road surface upon walking or from external force like an impact upon falling or collision. According to a conventional robot apparatus, it can be avoided to cope with such an instance as just described only by shortening the control cycles of all control objects. However, increase of the number of axes for control gives rise to limitation to the communication process and the time for controlling calculation. In contrast, according to the present invention, an intermediate hierarchical control apparatus for controlling a reflex type motion is provided for each location and controls a comparatively small number of shafts. Consequently, a higher speed response can be achieved.

While each of the intermediate hierarchical control apparatus performs high speed processing for controlling a motion of a reflex system, the central control apparatus 31 performs control processing of the posture of the entire robot apparatus. Consequently, the system can be controlled stably in response to a variation of the external environment. For example, if an intermediate hierarchical control apparatus for exclusively performing reflex motion control of four axes of a foot part, which is part of a leg part unit, responsive to external force is provided as a lower hierarchy apparatus with respect to the central control apparatus 31, then a high speed response can be achieved with a comparatively small number of shafts. Thus, the foot part can cope on the real time basis with an indefinite rough road surface.

Figure 11:
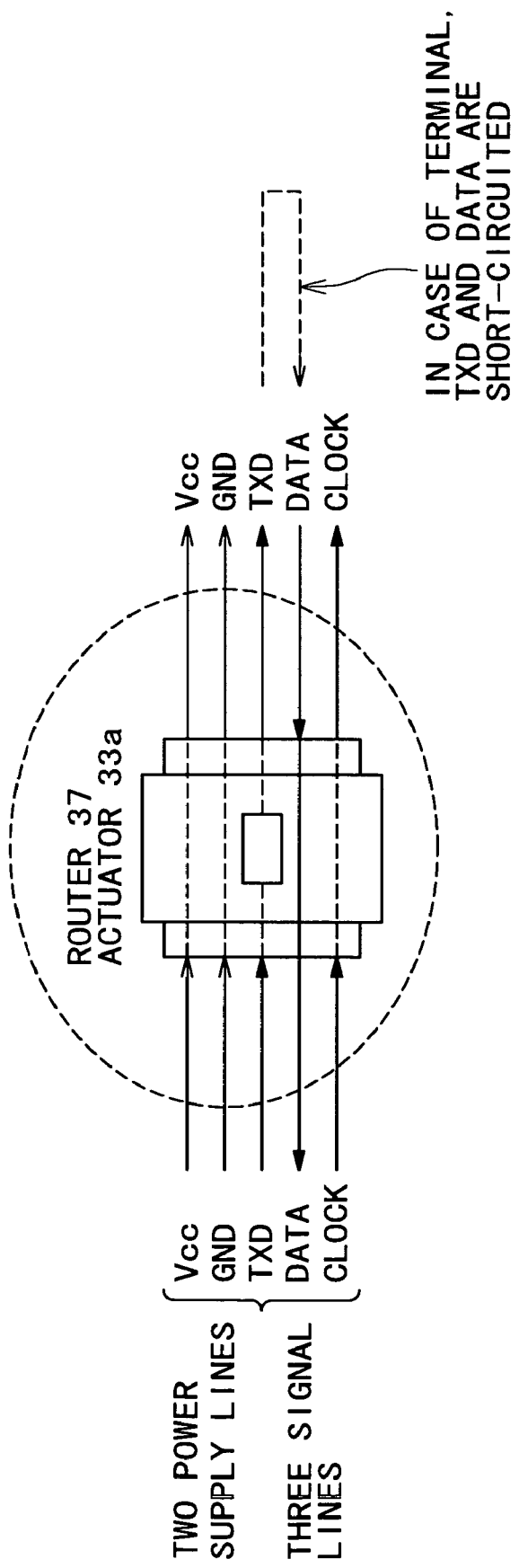
FIG. 11 is a diagrammatic view showing an example of a particular configuration of a transmission cable shown in FIG. 10.

FIG. 11 shows an example of a particular configuration of the transmission cable 44. Referring to FIG. 11, the transmission cable 44 includes a first power supply line Vcc, a second power supply line GND, a first signal line RXD (TXD), a second signal line DATA, and a third signal line CLOCK. The first power supply line Vcc supplies an operating voltage to a router 37 and an actuator 33a therethrough. The second power supply line GND is provided as the ground. The first signal line RXD (TXD) forms a forward path of a control instruction transmitted from the router 37. The second signal line DATA forms a return path for returning information regarding a driving state of each actuator to the router 37. The third signal line CLOCK supplies a clock signal therethrough. In short, the transmission cable 44 includes totaling five lines including two power supply lines and three signal lines.

The transmission cable 44 having such a configuration as described above is disposed between the router 37 and each of the actuators 33a to 33d and connected to connectors provided on the router 37 and each of the actuators 33a to 33d. The router 37 and the actuators 33a to 33d are connected to each other individually by the transmission cables 44. In other words, in the humanoid 30, the transmission cables 44 have a function as transmission lines for interconnecting the router 37 and the actuators 33a to 33d.

It is to be noted that, on the terminal end actuator connected at the lowest order from the router 37, that is, on the fourth actuator 33d, the first signal line TXD and the second signal line DATA are short-circuited. Consequently, data transmitted through the first signal line RXD (TXD) from the router 37 is returned to the router 37 from the actuator 33d positioned at the terminal end through the second signal line DATA. However, where the router 37 need not receive returning data from the actuators 33a to 33d, there is no necessity to short-circuit the first signal line TXD and the second signal line DATA. Also the second signal line DATA is not necessitated.

Figure 12:
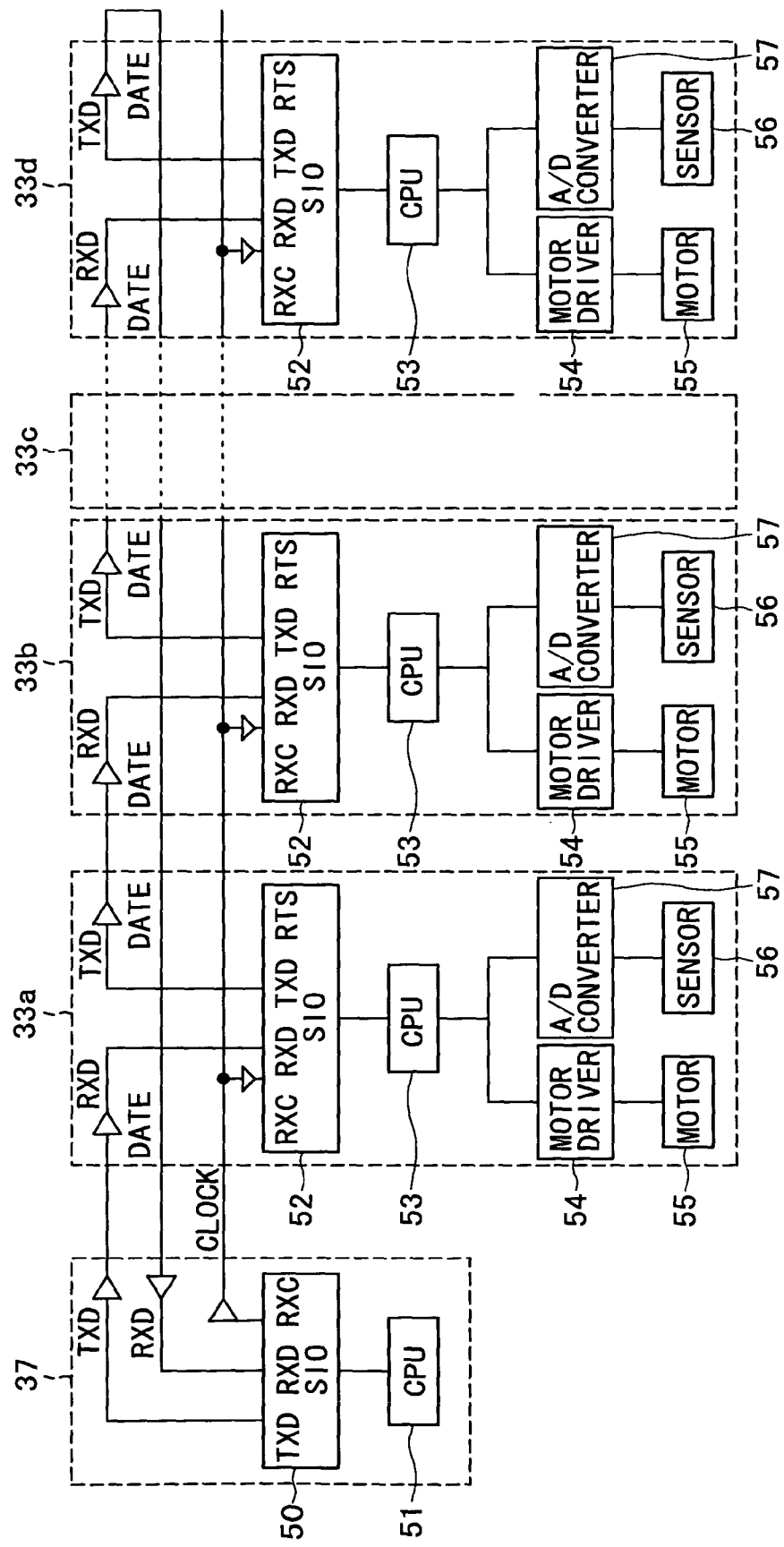
FIG. 12 is a block diagram showing an example of a particular configuration of a router and actuators shown in FIG. 9.

FIG. 12 shows an example of a detailed configuration of the router 37 and the actuators 33a to 33d. Referring to FIG. 12, in the example shown, a motor for driving a joint of the robot apparatus of the present embodiment and a sensor for detecting a state of the joint driven by the motor are provided for each of the actuators 33a to 33d, and data used to control the motor and data obtained from the sensors are transmitted. It is to be noted, however, that only signal lines provided in the transmission cable 44 are shown in FIG. 12 while power supply lines are omitted.

The router 37 includes a serial input/output (SIO) circuit 50 for transmitting and receiving data through the transmission cable 44, and a CPU 51 for controlling operation of the serial input/output circuit 50. Further, the router 37 includes a circuit (not shown) for transmitting and receiving a control instruction or information relating to a driving state of an actuator to and from the central control apparatus 31 through the universal bus 43.

The serial input/output circuit 50 produces a packet of a predetermined data length from data of an object of transmission acquired from the central control apparatus 31. Then, the serial input/output circuit 50 transmits the packet to an actuator (the first actuator 33a) connected as a lower order device through the first signal line TXD of the transmission cable 44. Further, the serial input/output circuit 50 receives data returned through the second signal line DATA from an actuator (the fourth actuator 33d) connected to the terminal end of the transmission cable 44. Furthermore, the serial input/output circuit 50 produces a clock signal representative of a timing at which a packet is to be transmitted from each of the actuators 33a to 33d and supplies the clock signal to the actuator connected as a lower order device through the third signal line CLOCK.

Each of the actuators 33a to 33d includes a serial input/output circuit 52, a CPU 53, a motor 55, a motor driver 54, a sensor 56, and an A/D converter 57. The serial input/output circuit 52 transmits and receives data through the transmission cable 44. The CPU 53 controls operation of the components in the actuator. The motor 55 is provided to drive a joint of the robot. The motor driver 54 controls driving of the motor 55. The sensor 56 detects a state regarding the bending angle or the acceleration of the joint, the rotational angle of the motor 55 or the like. The A/D converter 57 digitally converts an analog output of the sensor 56.

The serial input/output circuit 52 receives a packet having data stored therein from an apparatus connected as a higher order apparatus thereto through the first signal line RXD of the transmission cable 44. The serial input/output circuit 52 transmits the received packet to another apparatus connected as a lower order apparatus thereto through the first signal line TXD at a predetermined transmission timing based on the clock signal supplied thereto through the third signal line CLOCK. Further, the serial input/output circuit 52 has a function of delivering, if the received data is destined for the actuator in which the serial input/output circuit 52 is provided, data included in the packet to the CPU 53. It is to be noted that the serial input/output circuit 52 transmits all of received packets to the lower order apparatus irrespective of whether or not the received packets are destined for the actuator.

The CPU 53 is connected to the serial input/output circuit 52, motor driver 54 and A/D converter 57 and controls operation of them. In each of the actuators 33a to 33d, when data destined for the each actuator is acquired by the serial input/output circuit 52, the data is delivered to the CPU 53 so that the CPU 53 performs a calculation process or a process of controlling the components in accordance with processing contents required by the data.

For example, if the required processing contents are rotational driving of the motor 55 at a predetermined angle, then the CPU 53 issues a predetermined control instruction to the motor driver 54 to drive the motor 55 to rotate. Meanwhile, information detected by the sensor 56 is converted into digital data by the A/D converter 57 and transferred to the serial input/output circuit 52 through the CPU 53. The information is packetized by the serial input/output circuit 52 and then transmitted to a lower order apparatus at a predetermined timing.

It is to be noted that, while FIG. 12 shows an example wherein a sensor 56 and an A/D converter 57 are disposed in each of the actuators 33a to 33d, they need not be disposed in all of the actuators 33a to 33d but may be disposed in some of them. Further, each of the actuators 33a to 33d may be formed only from one of a set of a motor 55 and a motor driver 54 and another set of a sensor 56 and an A/D converter 57. Furthermore, similarly as in the actuators 33a to 33d, a motor 55 and a motor driver 54 and/or a sensor 56 and an A/D converter 57 may be disposed also in the router 37 so that the router 37 may have a function for driving a joint of the robot.

Further, a packet including control instructions transmitted from the central control apparatus 10 and/or the router 11 may be formed as a packet group including control instructions for the individual actuators, and a number of data packets equal to the number of the actuators 33a to 33d connected in a daisy chain connection to the router 37 may be prepared so as to be included in the packet group (1 frame).

In this instance, data of an object of transmission to the actuators 33a to 33d can be acquired at a substantially same point of time by the actuators 33a to 33d. Accordingly, where the example of FIG. 12 is applied, for example, to a transmission system of a robot, operation of the robot can be controlled generally smoothly. Further, since it is necessary to dispose only one transmission cable 44 between the router 37 and the actuators 33a to 33d at any location, a wiring design for each joint of the robot is facilitated.

Figure 13:
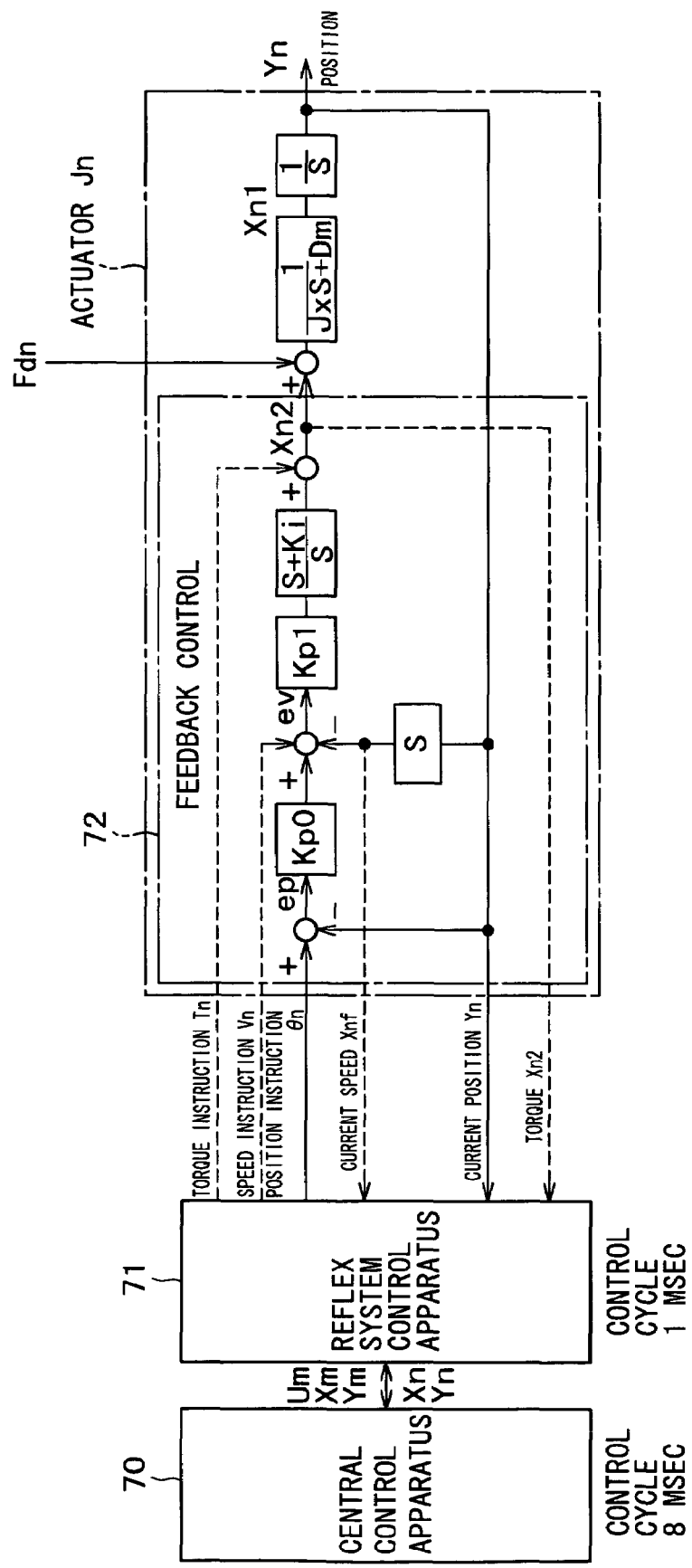
FIG. 13 is a block diagram showing a servo configuration of the actuators shown in FIG. 12.

FIG. 13 shows a servo configuration of an actuator. Referring to FIG. 13, according to the servo configuration shown, a displacement of a joint or a driving state of a motor provided for an actuator is fed back to a router 11 as a higher order apparatus in response to external force applied to the joint. Consequently, the joint can be caused to move rapidly in response to the external force.

In the example shown in FIG. 13, however, it is presumed that a control system is formed from a motor of an actuator for driving a joint of the robot, a sensor for detecting a rotational displacement of the motor, and a control circuit. The control circuit controls driving of the motor in response to a control instruction from a central control apparatus 70 which performs integrated control for a plurality of joints provided for the robot. A principle of contents of control achieved by the control circuit is described below.

The central control apparatus 70 transmits a control instruction Um for driving an actuator Jn to a router 71. The control instruction Um includes, for example, a torque instruction Tn, a speed instruction Vn, an angle instruction ın for the motor provided in the actuator Jn and is transmitted to the actuator Jn through the router 71 serving as a reflex system control apparatus.

A control circuit 72 compares the control instruction Um with a torque value and a speed of the motor obtained when the actuator Jn is driven and information regarding the displacement of the joint and controls the actuator Jn to drive the joint in a feedback state so that the required torque and speed and the required displacement of the joint may be obtained. On the other hand, if external force Fdn acts upon the joint, then the control circuit 72 can control the actuator Jn to drive the joint while information regarding the external force Fdn is fed back to the control circuit 72. Accordingly, when the control circuit 72 controls the actuator Jn to drive the joint rapidly in response to the external force Fdn, driving of the joint can be controlled through communication of a control instruction and information relating to the torque and speed of the motor and the displacement of the joint responsive to the external force Fdn between the router 71 and the actuator Jn.

It is to be noted that the control instruction Um need not necessarily include the torque instruction Tn or the speed instruction Vn, but only it is necessary for the control instruction Um to include an instruction used for driving control of the actuator Jn.

Now, a driving state of a joint of the robot apparatus according to the present embodiment is described in comparison with a driving state of a joint of a conventional robot apparatus.

Figure 14A:
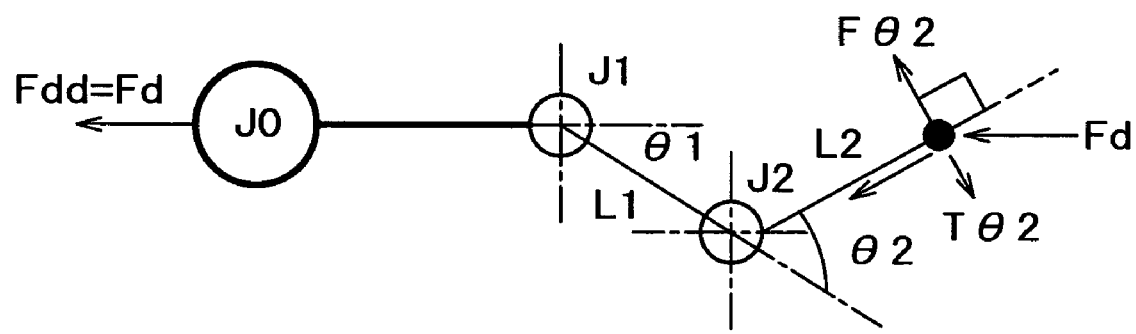
FIGS. 14A and 14B are diagrammatic views illustrating driving states of joint parts of a conventional robot apparatus.
Figure 14B:
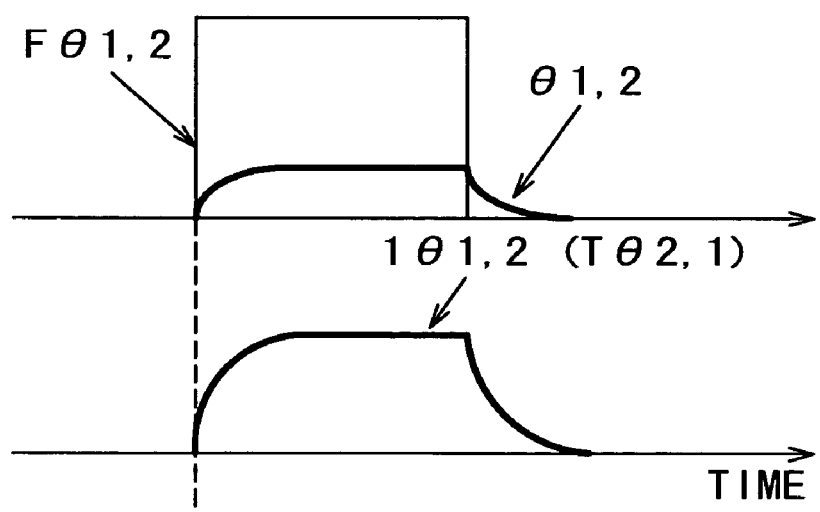

FIGS. 14A and 14B illustrate a driving state of a joint of a conventional robot apparatus. As seen from FIG. 14A, in the conventional robot apparatus, when external force Fd acts upon a tip end of a supporting portion L2 extending from joint portions J1 and J2 connected to a body J0 such as a trunk part of the robot apparatus, a control instruction for moderating the external force Fd is not transmitted rapidly to actuators for driving the joint portions J1 and J2. Consequently, the external force Fd is applied as it is to the body J0. Therefore, it is difficult to rapidly secure posture control of the body of the robot apparatus.

The motors for driving the joint portions J1 and J2 generate motor torques for driving the motors to move by displacement amounts $_n1$ and $_n2$, respectively, based on control instructions produced without taking the external force Fd into consideration. Here it is assumed that, for example, due to the external force Fd, load torques $F_n1$ and $F_n2$ are applied to the joint portions J1 and J2, respectively. At this time, motor currents $I_n1$ and $I_n2$ for driving the joint portions J1 and J2 to move by the displacement amounts $_n1$ and $_n2$ are supplied to the actuators for driving the joint portions J1 and J2, respectively. Thereupon, motor torques $T_n1$ and $T_n2$ are generated as reactions to the external force Fd and act to maintain the positions of the joint portions J1 and J2 thereby to perform posture control. FIG. 14(b) illustrates time variations of the displacement amounts $_n1$ and $_n2$ of the joint portions J1 and J2 and time variations of the motor currents (motor torques) to the motors for driving the joint portions J1 and J2 after the load torques $F_n1$ and $F_n2$ originating from the external force Fd are applied, respectively.

In order to control the joint portions J1 and J2, information based on the following expressions (1) and (2) are referred to:

$$Xn=AXn+BUm+Dn \quad (1)$$

$$Yn=CXn \quad (2)$$

where Um is the instruction signal, Xn is a state variable indicative of a state of the joint or the motor, Dn is the external torque exerted by the external force, Yn is the output in feedback control, and A, B and C are constants.

However, in the conventional robot apparatus, a new control instruction based on information regarding the load torques $F_n1$ and $F_n2$ is not transmitted rapidly to the actuator. Consequently, even when inadvertent external force Fd like an impact acts upon the robot apparatus, the external force Fd is transmitted to the body J0, and therefore, it is difficult to secure the stability in posture control of the entire robot apparatus.

Figure 15A:
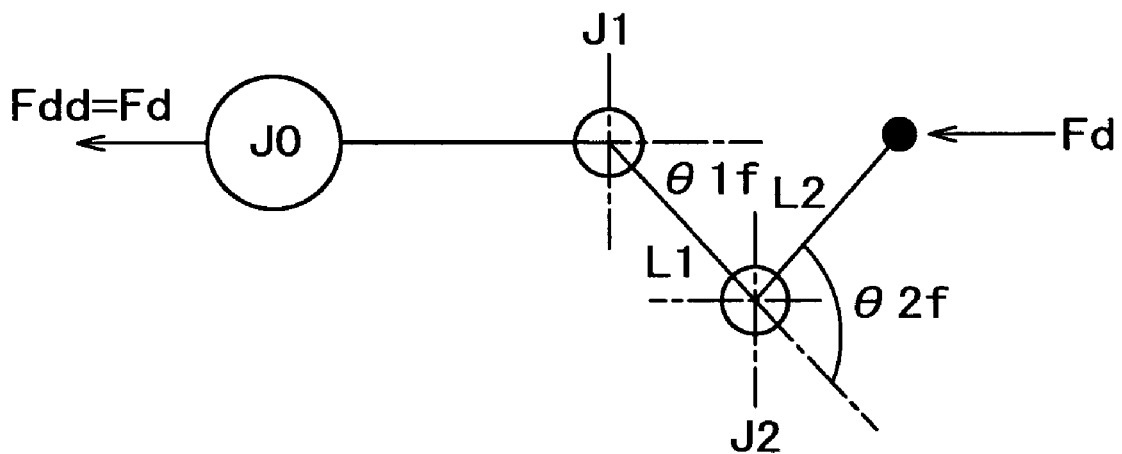
FIGS. 15A and 15B are diagrammatic views illustrating driving states of joint parts of a robot apparatus according to the present invention.
Figure 15B:
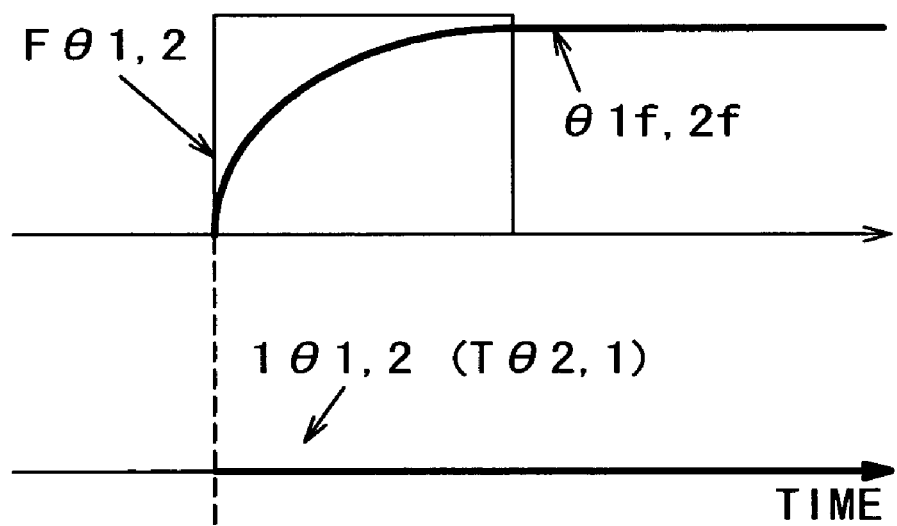

FIGS. 15A and 15B illustrate a driving state of a joint of the robot apparatus according to the present embodiment. As seen from FIGS. 15A and 15B, driving of the joint portions J1 and J2 is controlled so that the external force Fd may be moderated with the displacement amounts $_n1f$ and $_n2f$ of the joint portions J1 and J2.

The compliance control is a controlling method which provides mechanical flexibility when an interaction acts between a robot and an environment. According to the controlling method, a difference between an actual displacement amount and a target displacement amount of a joint part is determined in response to a variation of the external environment such as external force, and an amount of movement of a motor for driving the joint part is determined based on the difference. The motor for driving the joint part is controlled with the driving amount. Accordingly, the external force Fd is not transmitted to the body J0.

Where the compliance control described is applied to the motors for driving the joint portions J1 and J2, then the displacement amounts of the joint portions J1 and J2 change from the displacement amounts $_n1$ and $_n2$ illustrated in FIG. 14A to displacement amounts $_n1f$ and $_n2f$ illustrated in FIG. 15A, respectively.

At this time, a new control instruction Un for reducing the motor currents $I_n1$ and $I_n2$ to be supplied to the motors for driving the joint portions J1 and J2 based on the external force Fd detected by the sensor provided for the actuator to zero is calculated by a router 11 as a directly higher order device, and the motors are controlled with the new control instruction Un. Then, the motors are controlled so that the displacements of the joint portions J1 and J2 may have the displacement amounts $_n1f$ and $_n2f$ in response to the magnitudes of the load torques $F_n1$ and $F_n2$ applied to the joint portions J1 and J2, respectively. In this manner, the reaction to the external force Fd can be attenuated to reduce the acting force Fdd to the body J0 of the robot apparatus to zero.

Further, when the joint portions J1 and J2 are compliance controlled, it is possible to attenuate the force acting on the robot apparatus body from the control instruction Um and the external force Fd based on state equations (3) to (7) given below, which represent driving states of the joints, to secure the stability in posture control of the robot apparatus:

$$Xn=AXn+B(Um+Udn)+Dn \quad (3)$$

$$Yn=CXn \quad (4)$$

$$Xm=AmXm+BmUm \quad (5)$$

$$Ym=CmXm \quad (6)$$

$$Udn=E(Xm-Xn) \quad (7)$$

where Dn represents the external torque by the external force and is represented particularly as $Dn=(F_n1f, F_n2f)$, Udn represents the instruction signal for correcting the external torque Dn, Xm represents a state variable calculated by an internal model in the compliance control, Ym is an output of the internal model, and E is a constant.

Figure 16:
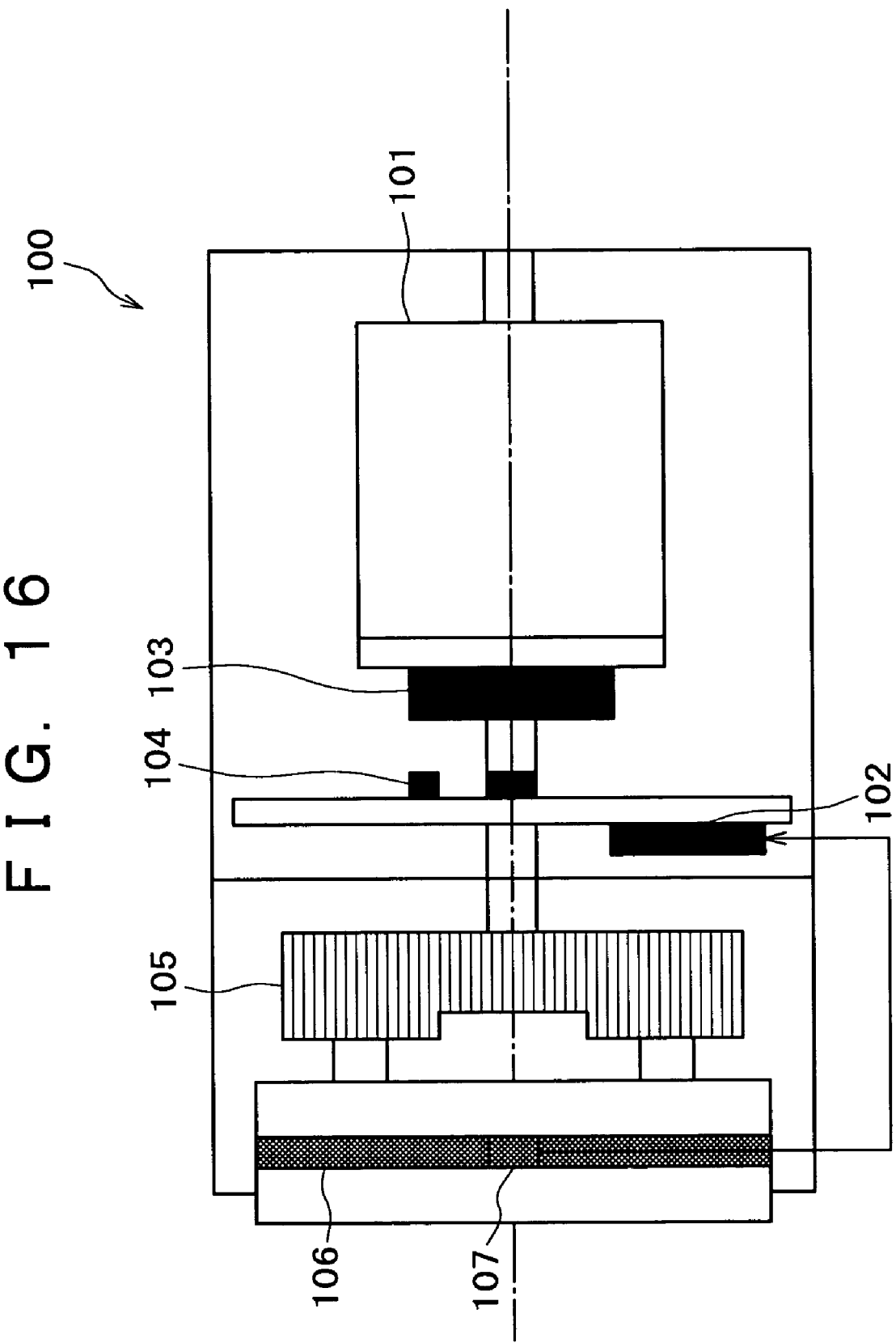
FIG. 16 is a schematic view showing an example of an internal configuration of an actuator which can be suitably applied to the robot apparatus according to the present invention.

FIG. 16 shows an example of an internal configuration of an actuator which is applied suitably to the robot apparatus of the present embodiment.

Referring to FIG. 16, an actuator 100 shown includes a motor 101, an actuator controller 102, a rotor sensor magnet 103, a rotor position sensor 104, a speed reducer 105, a position sensor magnet 106, and a position sensor 107.

A driving state of the motor 101 is detected by the rotor position sensor 104 and the position sensor 107 and fed back to the actuator controller 102 to control driving of the motor 101.

Driving of the motor 101 may be controlled by a router 11 or the central control apparatus 10 connected to the actuator 100 or alternatively by the actuator controller 102. In the latter case, the motor 101 can be controlled rapidly so that, even when inadvertent external force acts upon the motor 101, the external force may not be applied to the body of the robot apparatus.

In this manner, according to the present embodiment, even if inadvertent external force acts upon an arm part or a leg part of the robot apparatus, an actuator for driving each of joints which form the arm part or the leg part can be controlled by a local control section such as a router connected as a lower order device to a integrated control section, which performs integrated control for a motion of the robot apparatus, without the necessity for the integrated control section to control driving of each of the joints which form the arm part or the leg part. As a result, the posture control of the robot apparatus can be prevented from being rendered unstable by external force.

An arrangement wherein a router 11 which acts as a local control section or an intermediate hierarchical control apparatus controls a foot part of the robot apparatus is described below.

Figure 17:
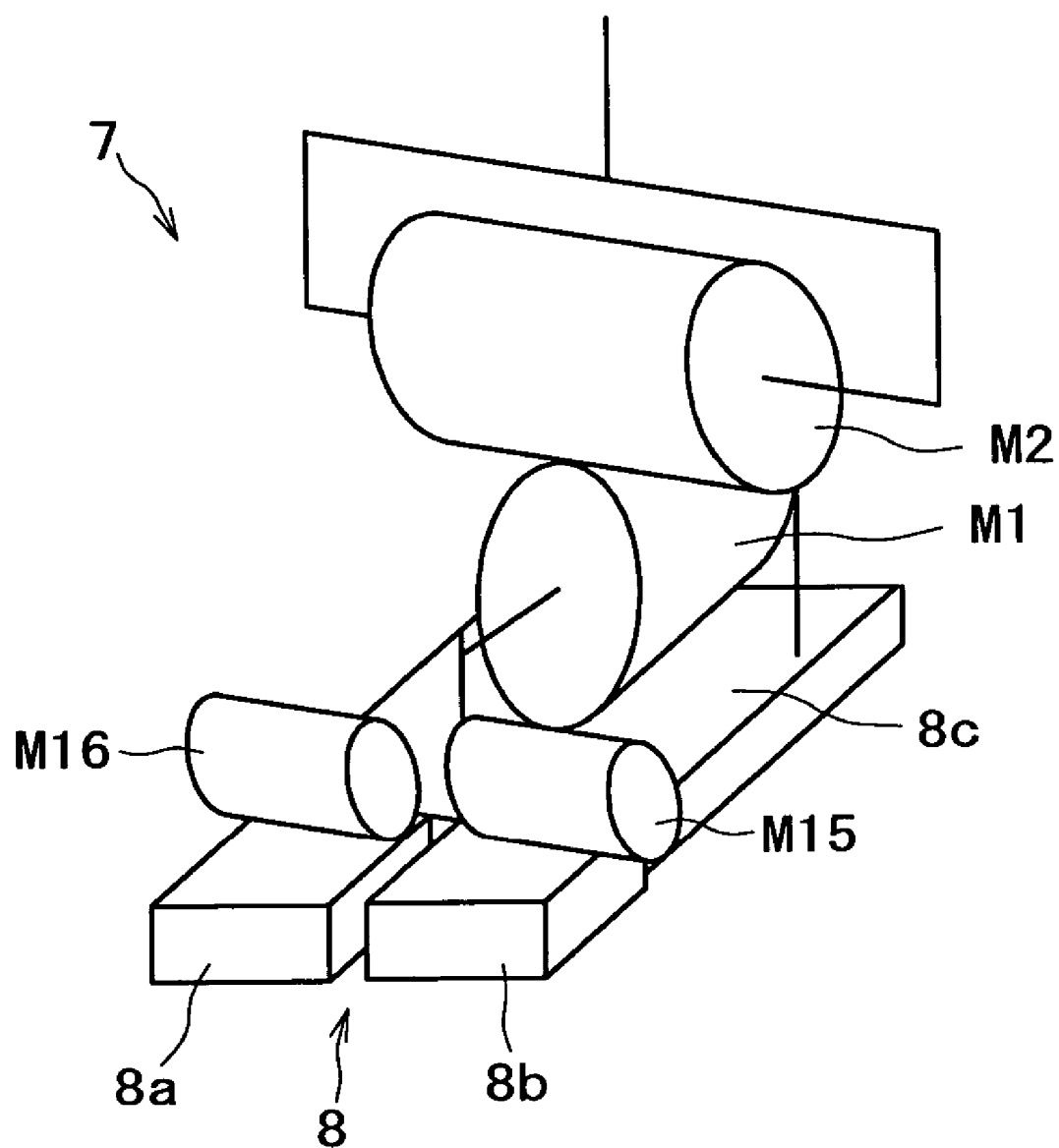
FIG. 17 is a schematic view showing a degree-of-freedom configuration of a foot part of the robot apparatus according to the present invention.
Figure 18A:
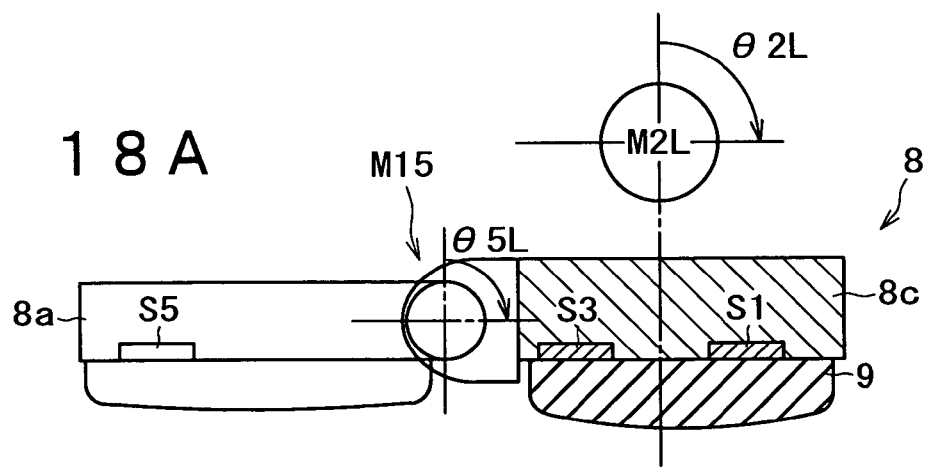
FIGS. 18A, 18B and 18C are schematic views showing the foot part of the robot apparatus.
Figure 18B:
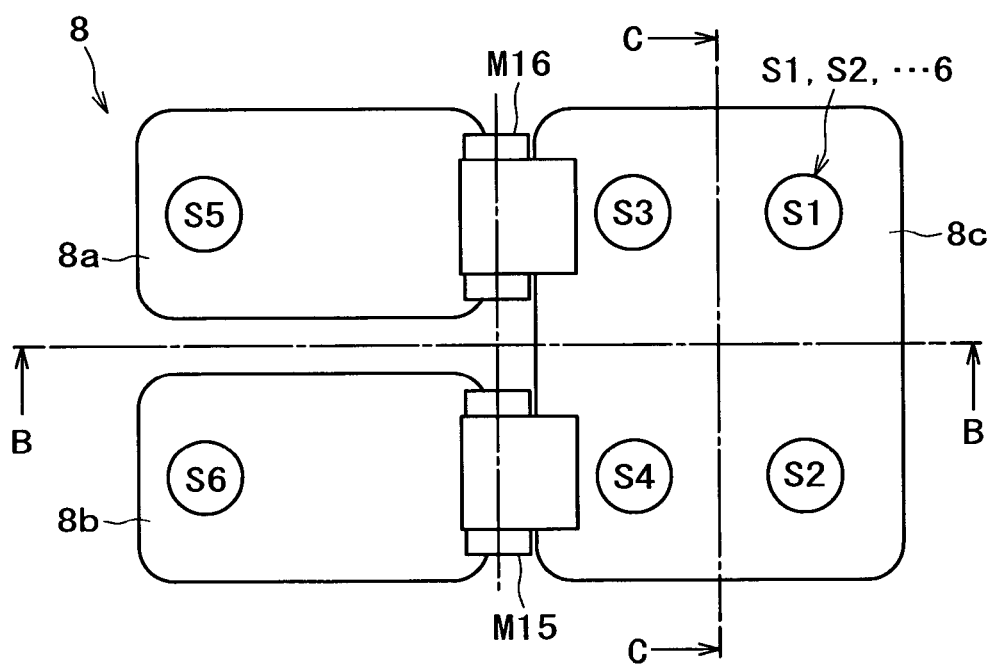
Figure 18C:
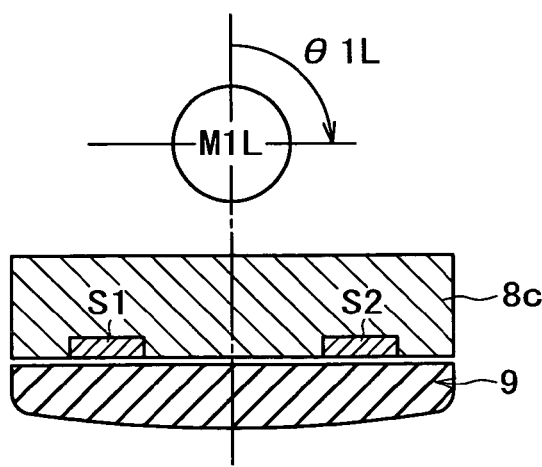

FIG. 17 schematically shows a degree-of-freedom configuration of a foot part of the robot apparatus. Meanwhile, FIGS. 18A, 18B and 18C show a configuration of the sole of the foot part of the robot apparatus. More particularly, FIG. 18B is a plan view of the sole as viewed from the ground side, and FIGS. 18A and 18C are sectional views taken along line B—B and line C—C of FIG. 18B, respectively. Further, FIGS. 19A and 19B illustrate different manners in which the foot part contacts with a rough road surface.

As seen from FIGS. 17 and 18A to 18C, the foot part 7 has a 4 degree-of-freedom including four axes, and the sole 8 has a 2 degree-of-freedom. In particular, the sole 8 includes three parts of a toe part 8a, another toe part 8b and a sole heel part 8c. The toe parts 8a and 8b and the sole heel part 8c are connected for pivotal motion to each other by motors M15 and M16, respectively. The motor M15 serves as a driving element for driving a first finger joint roll shaft, and the motor M16 serves as a driving element for driving a second finger joint roll shaft.

The sole heel part 8c has a substantially rectangular shape in top plan, and pressure sensors S1 to S4 for detecting contacting pressures of the sole heel part 8c with the road surface are disposed at portions in the proximity of the four corners of the sole heel part 8c on a face thereof which contacts with the ground face. Also the toe parts 8a and 8b have pressure sensors S5 and S6 disposed on faces thereof which contact with the ground surface. When the robot apparatus which can perform bipedal locomotion walks on a rough road surface, reactive force from the road surface can be detected by means of the totaling six pressure sensors S1 to S6. Further, a flexible member 9 such as rubber is adhered to part or the entirety of the face of the sole 8 which contacts with the ground surface so that the sole 8 may be stabilized also on a rough ground surface.

Figure 19A:
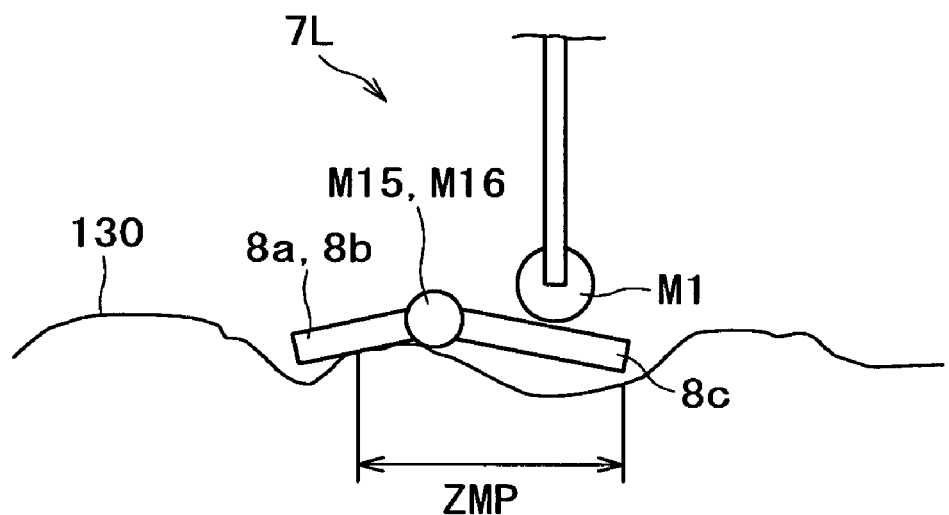
FIGS. 19A and 19B are schematic views illustrating manners in which the foot part of FIG. 17 and a foot part of a conventional robot apparatus are brought into contact with a rough road surface, respectively.
Figure 19B:
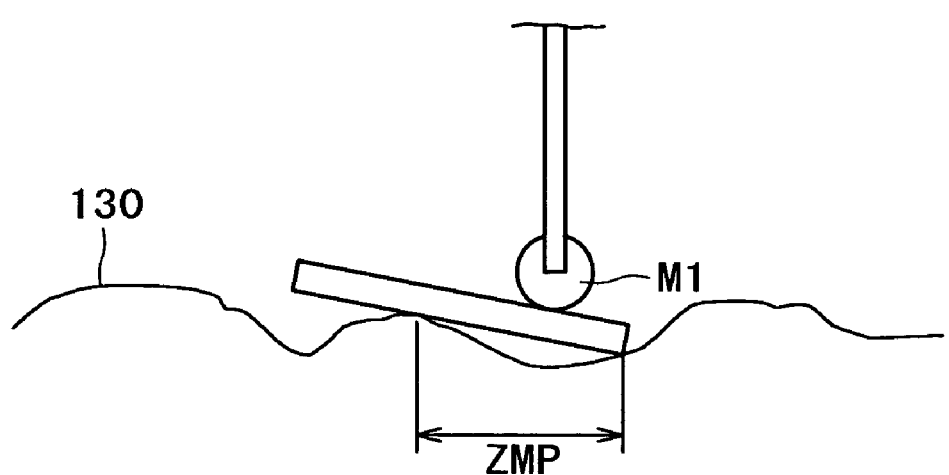

An actuator including motors of a 4 degree-of-freedom of the foot part and position sensors for detecting the rotational angles of the motors is driven by an intermediate hierarchical control apparatus so that, at an instant when the sole 8 of the foot part 7 contacts with a rough road surface 130 as seen in FIG. 19A, the sensor values from the pressure sensors S1 to S6 may be equal to each other, that is, the pressure sensors S1 to S6 may contact uniformly with the road surface through the flexible member 9 provided on the sole 8. Since the intermediate hierarchical control apparatus controls driving of the actuator in a short control cycle so that the sole 8 may change profiling the rough road surface, the sole 8 contacts with the ground surface with suitable friction. Consequently, the ZMP can be increased to allow the robot apparatus to assume a stable posture.

On the other hand, the sole of the conventional robot apparatus does not include the motors M15 and M16 as seen in FIG. 19B. Therefore, the shape of the sole cannot be changed in accordance with the shape of the rough road surface 130. Consequently, when the robot apparatus walks on a rough road surface, the ZMP is small and the posture of the robot apparatus is not stabilized readily.

In a system of a foot part of such a 4 degree-of-freedom configuration as described above, since a router serving as an intermediate hierarchical control apparatus produces driving signals for driving the actuators based on sensor signals from the pressure sensors provided on the sole so that the foot part may perform a reflex movement, the sole is controlled so that it profiles the ground surface. The system is designed such that the response cycle of the reflex movement has a characteristic higher by two or more times than that of the response frequency of a higher order system which is the central control apparatus 10 or a higher order intermediate hierarchical control apparatus.

Figure 20:
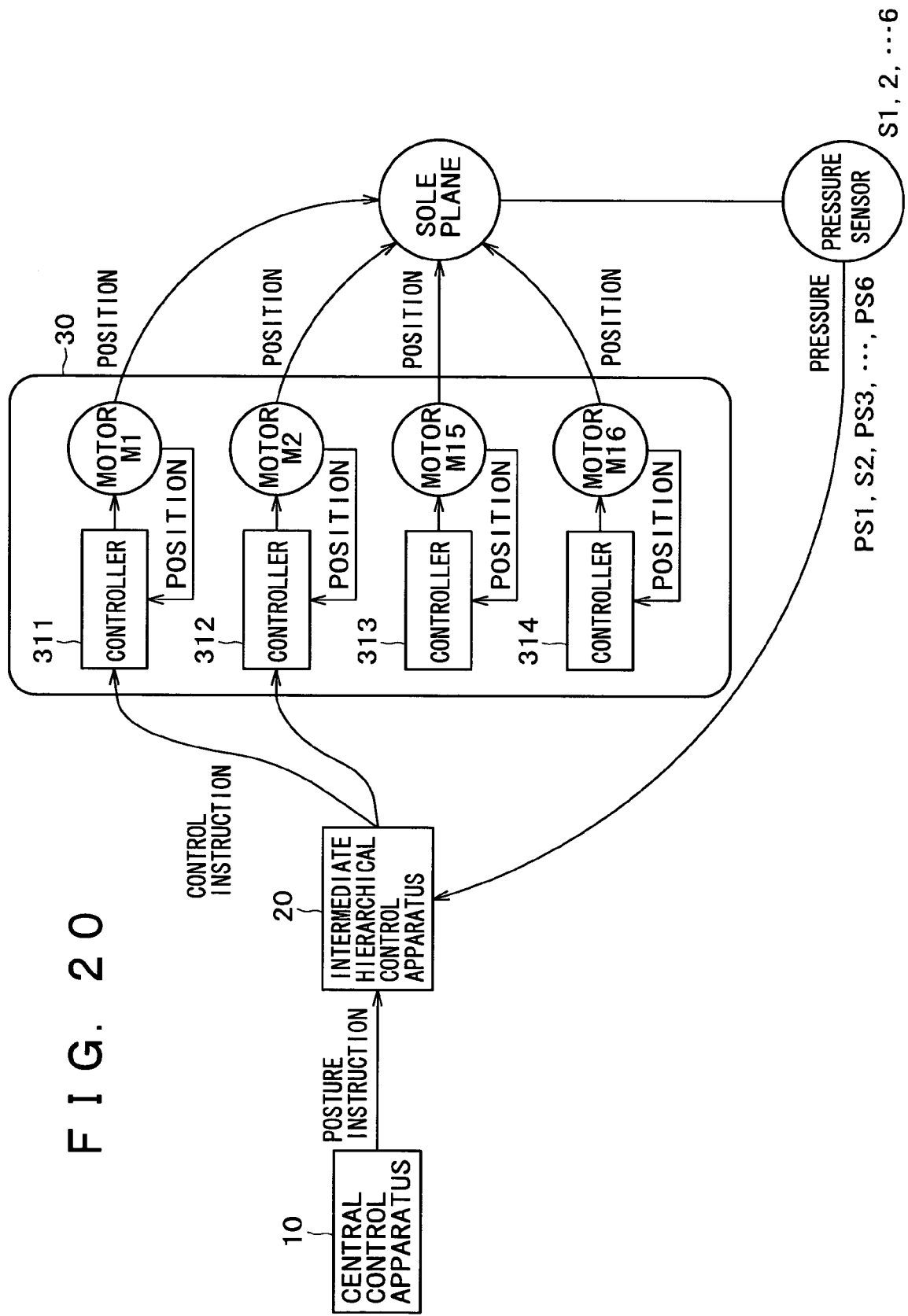
FIG. 20 is a block diagram schematically showing a functional configuration of a reflex movement control system for the foot part shown in FIG. 17.

In the following, the control system for controlling the reflex movement is described. FIG. 20 schematically shows a functional configuration of the reflex movement control system for a foot part shown in FIG. 17.

Referring to FIG. 20, the reflex movement control system for a foot part includes a central control apparatus 10, a intermediate hierarchical control apparatus 20, controllers 311 to 314, motors M1, M2, M15 and M16, a sole heel part and a pair of toe parts, and six pressure sensors S1 to S6. The central control apparatus 10 outputs a posture instruction. The intermediate hierarchical control apparatus 20 is formed from a router which adjusts the posture instruction from the central control apparatus 10 and information from the sensors on the sole and outputs control instructions for controlling motors. The controllers 311 to 314 may each be, for example, a PID (proportional plus integral plus derivative) control apparatus and output driving signals for the motors based on control instructions from the intermediate hierarchical control apparatus 20. The motors M1, M2, M15 and M16 are controlled to be driven by the controllers 311 to 314, respectively. The sole heel part and the toe parts cooperatively form a sole plane whose position is controlled so as to profile the road surface by means of the motors M1, M2, M15 and M16. The pressure sensors S1 to S6 are provided on the sole. Sensor signals PS1 to PS6 from the six pressure sensors S1 to S6 are supplied to the central control apparatus 10 through the intermediate hierarchical control apparatus 20.

The motors M1, M2, M15 and M16 are driven such that the pressure sensors S1 to S6 contact uniformly with the road surface. Consequently, the area of a portion of the sole which contacts with the ground face is enlarged, and this increases the area of the ZMP and stabilizes the walking posture of the robot.

The intermediate hierarchical control apparatus 20 receives a position instruction for the foot part from a higher order intermediate hierarchical control apparatus (in the example shown in FIG. 20, the central control apparatus 10) and receives the sensor signals PS1 to PS6 supplied thereto from the pressure sensors S1 to S6, respectively. At this time, the intermediate hierarchical control apparatus 20 controls the motors M1, M2, M15 and M16 in the following manner in response to the sensor signals PS1 to PS6 from the pressure sensors S1 to S6.

When the intermediate hierarchical control apparatus 20 receives none of sensor signals PS1 to PS6 from the pressure sensors S1 to S6, it transmits position control instructions to the motors M1, M2, M15 and M16 for the individual shafts in accordance with an instruction from a higher order control apparatus such as the central control apparatus 10.

On the other hand, when the intermediate hierarchical control apparatus 20 receives some of the sensor signals PS1 to PS6 from the pressure sensors S1 to S6, it calculates an average value Pave from pressure values of all of the received sensor signals and issues rotational instructions to the motors M1, M2, M15 and M16 so that they may rotate in directions in which the pressure of any sensor element which is acted upon by a pressure higher than the average value Pave decreases. This is repeated to control the motors so that the pressures to all of the sensors may uniformly converge to an average value, and consequently, the sole is gradually brought into a state wherein it contacts uniformly with the rough road surface.

In this manner, where the signals from the pressure sensors are transmitted, a motion different from that of an instruction from a higher order control apparatus is executed by the intermediate hierarchical control apparatus 20. To this end, the intermediate hierarchical control apparatus 20 generates a control signal for rendering an adjustment mechanism operative so that a displacement of the motion of the intermediate hierarchical control apparatus 20 from the instruction from the higher order control apparatus is corrected until a gait of the entire system is satisfied.

The foot part having such a degree-of-freedom adapted for the road surface as described above adopts a structure wherein, for example, a pitch shaft and a roll shaft are provided for the ankle and the sole has a degree of freedom of two planes such that the foot part has a 4 degree-of-freedom and six pressure sensors are provided at different portions of the sole. The structure just described is used for the foot part to perform a reflex movement through such control of the actuator having a 4 degree-of freedom that the sole profiles the road surface actively so that the impact when the sole contacts with the road surface may be minimized. Therefore, the robot apparatus can walk stably through the reflex movement. Since an intermediate hierarchical control apparatus is additionally provided as a control section for a reflex movement of the sole to profile the rough road surface, the robot can walk on the ground face stably with otherwise possible oscillation suppressed.

Figure 21:
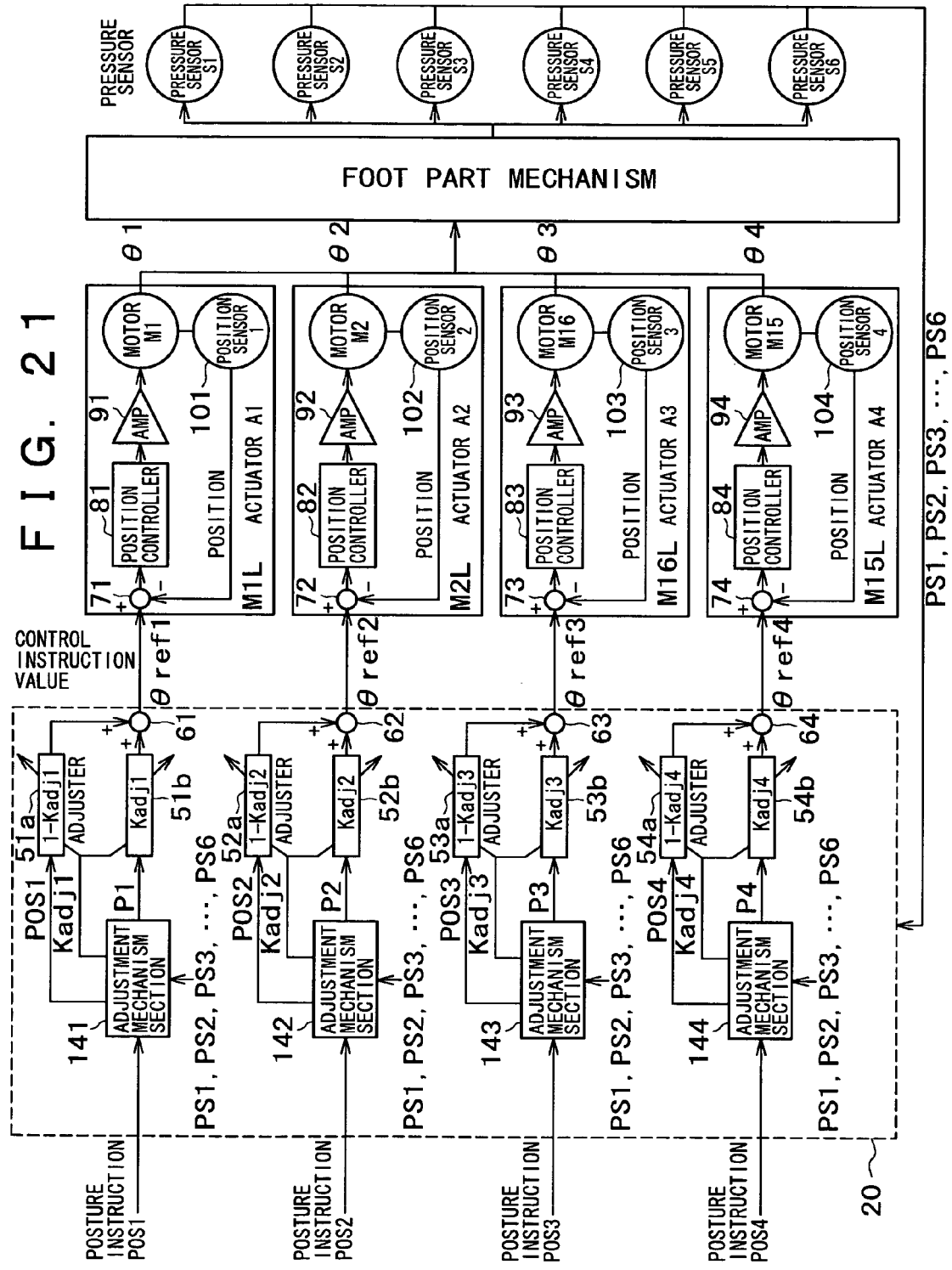
FIG. 21 is a block diagram showing intermediate hierarchical control apparatus and motor controllers corresponding to four motors provided for the foot part shown in FIG. 17.

FIG. 21 shows an intermediate hierarchical control apparatus and motor controllers for four motors provided for a foot part. Referring to FIG. 21, the intermediate hierarchical control apparatus 20 for controlling a reflex movement of a foot part receives posture instruction values POSi (POS1 to POS4) from the higher order intermediate hierarchical control apparatus or central control apparatus 10 and outputs control instruction values $_nref1$ to $_nref4$ in order to individually control the four motors M1, M2, M16 and M15 provided for the foot part shown in FIG. 17, respectively.

In order to individually control the four motors M1, M2, M16 and M15, the central control apparatus 10 includes four adjustment mechanism sections 141 to 144 corresponding to the motors, respectively. The sensor signals PS1 to PS6 from the pressure sensors S1 to S6 of the sole are supplied to each of the adjustment mechanism sections 141 to 144. The adjustment mechanism sections 141 to 144 function as adjustment sections for adjusting the control gains in control based on the posture instruction signals POS1 to POS4 supplied thereto, respectively, and control based on the pressure sensor signals PS1 to PS6.

The intermediate hierarchical control apparatus 20 includes, in addition to the adjustment mechanism sections 141 to 144 provided corresponding to the motors M1, M2, M16 and M15, respectively, adjusters 51a to 54a, adjusters 51b to 54b, and adders 61 to 64. The adjusters 51a to 54a perform gain control of the posture instruction values POSi with gain control signals Kadji (Kadj1 to Kadj4) from the adjustment mechanism sections 141 to 144, respectively. The adjusters 51b to 54b perform gain control of instruction values Pi (P1 to P4) based on the sensor signals PS1 to PS6 with the gain control signals Kadji (Kadj1 to Kadj4). The adders 61 to 64 add outputs of the adjusters 51a to 54a and the adjusters 51b to 54b, respectively.

In the present embodiment, each of the gain control signals Kadji indicates a ratio of a control gain by a corresponding one of the instruction values Pi based on the pressure sensor signals principally for controlling a reflex movement. For example, each of the gain control signals Kadji is formed such that, for example, as the external force (disturbance force) detected by a pressure sensor or the like increases, the control ratio of the intermediate hierarchical control apparatus 20 increases. This makes a further rapid reflex movement to disturbance force. On the other hand, the ratio of the control gain in control with each of the posture instruction values POSi from the central control apparatus 10 or the higher order intermediate hierarchical control apparatus 20 is normalized so as to be (1−Kadji). Thus, the control ratio of the central control apparatus 10 decreases as the control ratio of the intermediate hierarchical control apparatus 20 increases.

The adjustment mechanism sections 141 to 144 receive posture instructions from the higher order control apparatus and a stimulus (pressure or the like) from the external environment, that is, in the present embodiment, the pressure sensor signals PS1 to PS6, and individually adjust the instruction values from the higher order control apparatus and the stimulus of the external environment. Each of the gain control signals Kadji outputted from the adjustment mechanism sections 141 to 144 is used to adjust the ratio in control in response to the instruction from the higher order control apparatus and a change of the external environment. Thus, each of the gain control signals Kadji is a time constant $_n0$ adjusted so as to vary in response to the magnitude of the external stimulus and the time. The time constant $_n0$ is variable and can be set arbitrarily.

As described hereinabove, the adjustment mechanism sections 141 to 144 receive the posture instruction signals POS1 to POS4, respectively, supplied from the higher order intermediate hierarchy control apparatus or central control apparatus 10 and receive the sensor signals PS1 to PS6 supplied from the six pressure sensors S1 to S6 provided on the sole. Each of the posture instruction values POSi includes, for example, a shaft rotational position instruction representative of a rotational angle of a motor of an object of control, a shaft rotational speed instruction representative of a rotational speed of the motor, a shaft rotational torque instruction representative of a rotational torque of the motor. The adjustment mechanism sections 141 to 144 calculate second instruction values Pi for the motors of an object of control based on the values of the pressure sensor signals PS1 to PS6. More particularly, the adjustment mechanism sections 141 to 144 can calculate the second instruction values Pi so that, for example, the motors may be controlled to rotate in directions in which the values of the pressure sensor signals PS1 to PS6 become equal to one another. Further, the adjustment mechanism sections 141 to 144 output gain control signals Kadji for adjusting the control ratios between the posture instruction values POSi from the higher order intermediate hierarchical control apparatus and the instruction values Pi determined based on the pressure sensor signals. The gain control signals Kadji may be calculated by the adjustment mechanism section 141 to 144 using a method hereinafter described or may be inputted together with the instruction values from the higher order intermediate hierarchical control apparatus 20 or the central control apparatus 10.

Each of the gain control signals Kadji is given as a time constant $\alpha 0$ ranging from 0 to 1. The adjusters 51$b$ to 54$b$ multiply the gain control signals Kadj1 to Kadj4 and the second instruction values P1 to P4 determined by the sensor signals, respectively, to control the gains thereof. Meanwhile, the adjusters 51$a$ to 54$a$ multiply (1−gain control signal Kadj1) to (1−gain control signal Kadj4) and the posture instruction signals POS1 to POS4 supplied thereto from the higher order control apparatus, respectively, to control the gains thereof. The adders 61 to 64 add outputs of the adjusters 51$a$ to 54$a$ and outputs of the adjusters 51$b$ to 54$b$ to form control instruction values $\alpha$ref1 to $\alpha$ref4, respectively, and supply the control instruction values $\alpha$ref1 to $\alpha$ref4 to predetermined actuators A1 to A4, respectively.

The actuators A1 to A4 include subtractors 71 to 74, position controllers 81 to 84, amplifiers 91 to 94, motors M1, M2, M16 and M15, and position sensors 101 to 104, respectively. The subtractors 71 to 74 subtract sensor signals from the position sensors (rotational angle detectors) 101 to 104 attached to the motors M1, M2, M16 and M15 from the control instruction values $\alpha$ref1 to $\alpha$ref4 supplied from the intermediate hierarchical control apparatus 20, respectively. The position controllers 81 to 84 produce control signals for controlling the positions of the motors from outputs of the subtractors 71 to 74, respectively. The amplifiers 91 to 94 amplify the control signals from the position controllers 81 to 84, respectively. The motors M1, M2, M16 and M15 are driven to rotate with the control signals amplified by the amplifiers 91 to 94, respectively. The position sensors 101 to 104 detect the rotational angles of the motors M1, M2, M16 and M15, respectively.

The position sensors 101 to 104 detect the rotational angles of the motors M1, M2, M16 and M15, respectively, and the rotational angles are subtracted from the actual control instruction values $\alpha$ref1 to $\alpha$ref4, respectively. For example, if the rotational angles are smaller than the control instruction values $\alpha$ref1 to $\alpha$ref4, then the position controllers 81 to 84 output control signals so that the motors M1, M2, M16 and M15 may rotate by amounts corresponding to the respective shortages in response to the signals from the position sensors by which the rotational angles are detected.

Consequently, the foot part moves by amounts corresponding to the rotational angles $\alpha 1$ to $\alpha 4$ of the motors multiplied by positive constants Bi which depend upon the mechanisms of the motors, and moves by an amount $\alpha$i as a whole. Thus, the motion of the foot part is controlled in a direction in which the foot part contacts uniformly with the road surface. After the series of motions comes to an end, the sensor signals PS1 to PS6 detected by the pressure sensors S1 to S6 provided on the sole are supplied to the adjustment mechanism section 141 to 144 of the intermediate hierarchical control apparatus 20. The cycle of the motions in this instance is 1 msec.

Figures 22A, 22B:
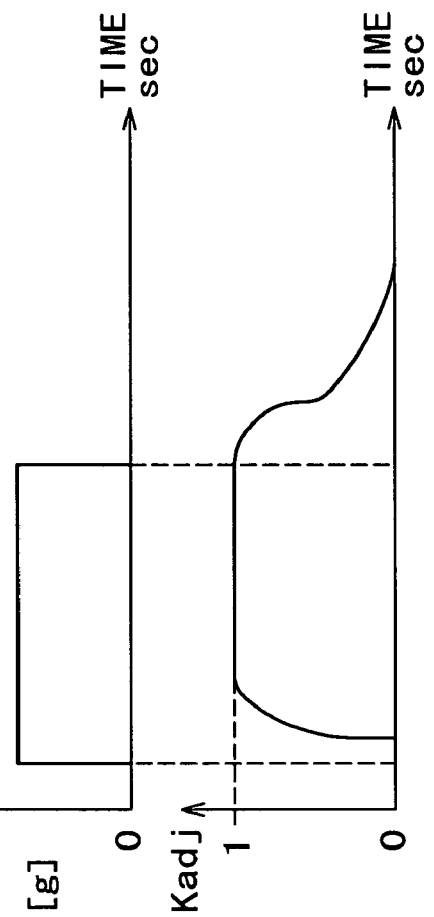
FIGS. 22A and 22B are graphs illustrating variations with respect to time of a gain control signal Kadji outputted from an adjustment mechanism shown in FIG. 21 when impulse external force is applied and when stepped external force is applied, respectively.
Figures 23A, 23B, 23C, 23D:
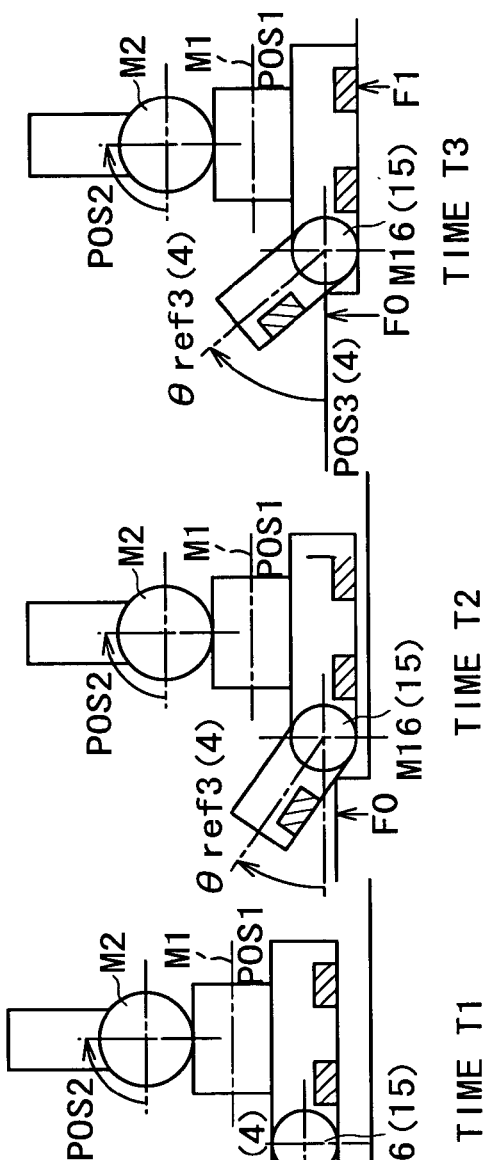
FIGS. 23A to 23D are schematic views illustrating a motion of the foot part of FIG. 17 when it is brought into contact with a ground surface with respect to lapse of time.

FIGS. 22A and 22B illustrate time variations of the gain control signals Kadji outputted from the adjustment mechanism sections 141 to 144 when impulse external force is applied and when stepped external force is applied, respectively. Here, when the gain control signals Kadji are 1, the posture instruction values POSi of the higher order control apparatus are ignored, but the control signals produced by the intermediate hierarchical control apparatus, that is, the instruction values Pi calculated from the pressure sensor signals, make the control instruction values $\alpha$refi for controlling rotation of the motors. On the contrary, when the gain control signals Kadji are 0, the motors are driven to rotate only with the posture instruction values POSi of the higher order control apparatus.

If keen external force is applied within a short period as seen in FIG. 22A, then the period within which the time constant $\alpha 0$ representative of the gain control signals Kadji exhibits 1 is short. On the other hand, if such stepped external force that the external force continues for a predetermined period is applied as seen in FIG. 22B, then the gain control signals Kadji wherein the period within which the time constant $\alpha 0$ indicates 1 continues for a period substantially equal to that of the external force are produced. Further, as hereinafter described, if external force which varies with respect to time is applied, then the gain control signals Kadji which vary, for example, with respect to time is produced suitably.

The intermediate hierarchical control apparatus 20 may use, as the instruction values Pi, a control signal produced based on the difference between a maximum value and an average value of sensor signals from a plurality of sensors used for each motor.

Subsequently, motions of a foot part when the foot part contacts with (stands on) the road surface profiling an external object and when the foot is spaced away (is free) from the road surface are described in connection with a particular example. First, a motion of a foot part when the robot apparatus places a foot part into contact with a rough road surface such as a staircase is described.

Figure 24:
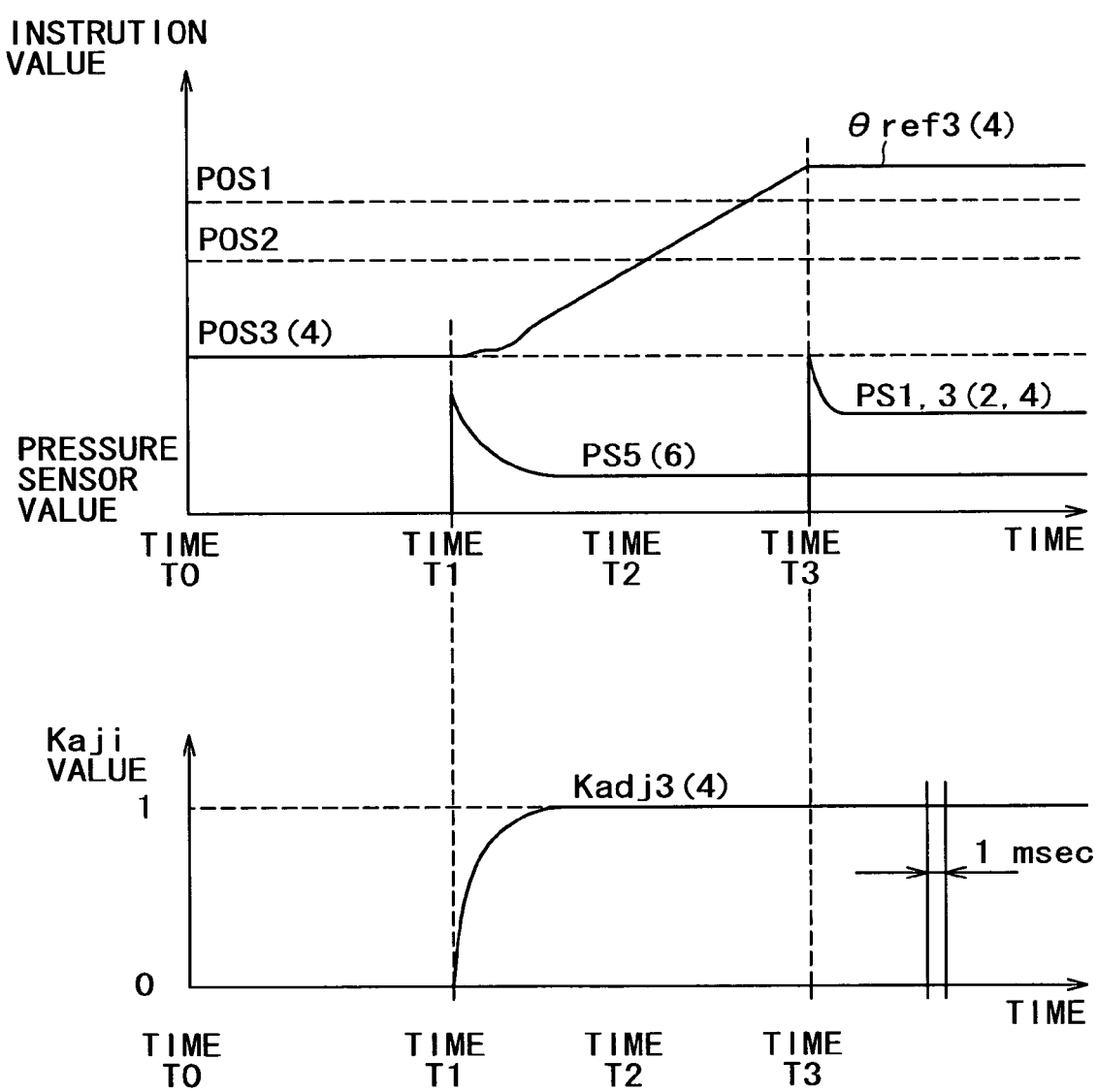
FIG. 24 is a graph illustrating the magnitudes of an instruction value POSi from a central control apparatus shown in FIG. 20, another instruction value Pi produced by an intermediate hierarchical control apparatus shown in FIG. 21 and control instruction values Qrefi and Kadji for controlling rotation of an actuator.
Figure 25:
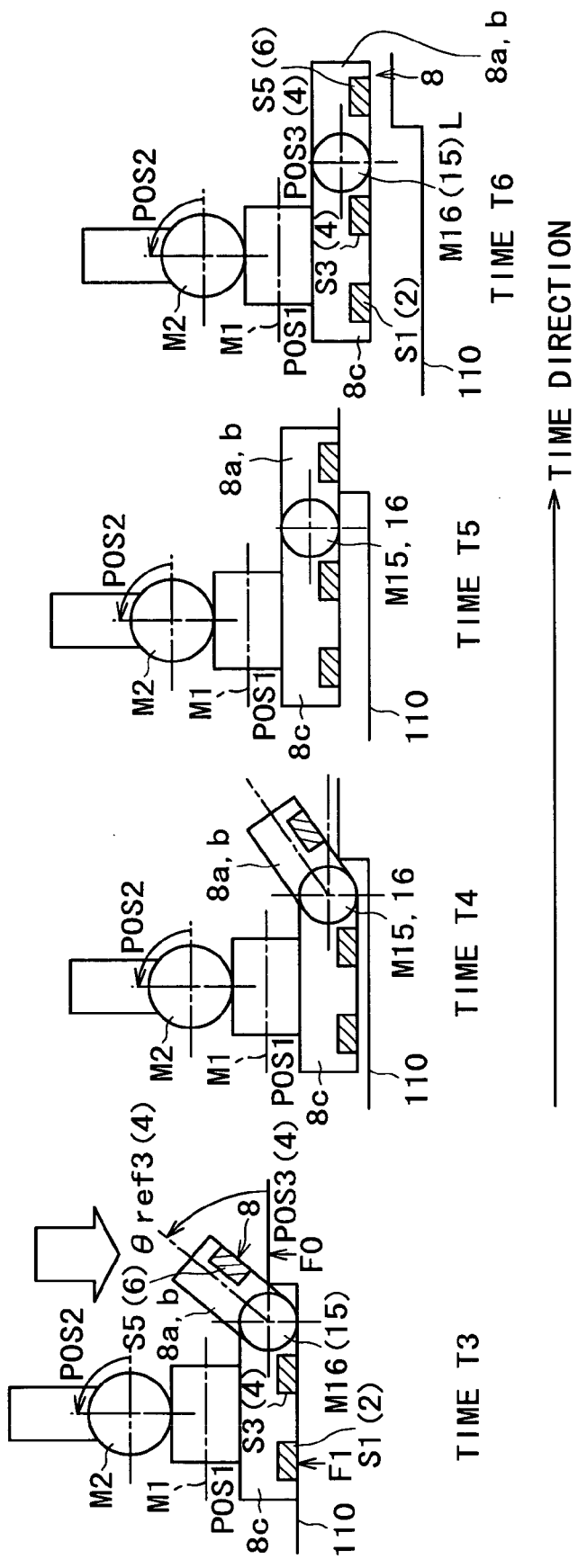
FIGS. 25A to 25D are schematic views illustrating a manner in which the foot part having been brought into contact with the ground surface by the motion of FIGS. 23A to 23D and 24 separates from the ground surface with respect to lapse of time.

FIGS. 23A to 23D illustrate a motion of a foot part when it is brought into contact with a ground surface 110 having a step with respect to lapse of time. More particularly, a foot part as viewed from a side at times T0 to T3 is shown. Meanwhile, FIG. 24 illustrates the magnitudes of the posture instruction values POSi from the intermediate hierarchical control apparatus 20, the instruction values Pi produced by the intermediate hierarchical control apparatus, and the control instruction values $\alpha$refi and gain control signals Kadji for controlling rotation of the actuator at times T0 to T3. It is to be noted that, in the example shown in FIG. 24, the pressure sensor signals POS1 to POS4 from the higher order control apparatus have fixed values.

As seen from FIGS. 23A to 23D and 24, at time T0, the foot part 7 is not in contact with the ground surface 110, and the outputs from the pressure sensors provided on the sole are 0.

Then at time T1, the toe parts 8$a$ and 8$b$ of the foot part 7 contact with a convex portion 111 of the ground surface 110, and reaction force F0 is applied to the pressure sensors S5 and S6 provided on the toe parts 8a and 8b through the contact therebetween. Then at time T2, the toe parts 8a and 8b of the foot part 7 are bent. Further at time T3, the sole heel part 8c of the foot part 7 contacts with the ground surface 110, and reaction force F1 is applied to the pressure sensors S1 to S4 of the sole heel part 8c through the contact.

For example, if the sensor signals PS5 and PS6 from the pressure sensors S5 and S6 provided for the toe parts 8a and 8b, respectively, are supplied to the intermediate hierarchical control apparatus 20 which controls the reflex motion of the foot part 7, then, for example, control signals (control instruction values ₙref3 and ₙref4) with which the actuators 3 and 4 (motors M16 and M15) operate are outputted from the intermediate hierarchical control apparatus 20. It is to be noted that some other actuators may operate instead. FIGS. 23A to 23D and 24 illustrate a motion of the foot part 7 when the control instruction values ₙref3 and ₙref4 given by the following expressions (8) and (9) are supplied:

$$\theta ref_3 = Kadj_3 \times P3 + (1 - Kadj_3) \times POS_3 \qquad (8)$$

$$\theta ref_4 = Kadj_4 \times P4 + (1 - Kadj_4) \times POS_4 \qquad (9)$$

In this instance, the gain control signals Kadj3 and Kadj4 vary as given by the following expressions (10) to (12):

$$Kadj_3 = |Y3(k)/PS5(k)| \qquad (10)$$

$$Y3(k) = K3 \times PS5(k) + (1-K3) \times Y3(k-1) \qquad (11)$$

$$Kadj_4 = |Y4(k)/PS6(k)| \qquad (12)$$

$$Y4(k) = K4 \times PS6(k) + (1-K4) \times Y4(k-1) \qquad (12)$$

where k is an integer indicating a sampling number, Y3 and Y4 are state variables, and K3 and K4 are constants (0<K3, K4<1).

In the present embodiment, the constants K3 and K4 are set to 0.1. Meanwhile, the instruction values P3 and P4 vary as given by the following expressions (13) and (14) so that the pressure sensor signals PS5 and PS6 may become equal to fixed pressure target values PREF3 and PREF4 determined by the intermediate hierarchical control apparatus, respectively:

$$P3 = (PREF3 - PS5) \times N3 \qquad (13)$$

$$P4 = (PREF4 - PS6) \times N4 \qquad (14)$$

where N3 and N4 are positive constants. As the value N3 or N4 increases, the response speed of the motor to the pressure sensor signal increases and the speed of the motion of the foot part increases.

The instruction values P3 and P4 mentioned above may have a value obtained, for example, by dividing the total weight of the robot apparatus by the number of pressure sensors (6 in the present embodiment) provided on the sole 8.

As described hereinabove, the control instruction values ₙrefi (reflex instruction values) are produced from the sensor signals from the pressure sensors provided on the sole and the posture instruction values POSi (host instruction values) and gain control signals Kadji (in this instance, Kadj3 and Kadj4) from the higher order control apparatus. Thus, the foot part 7 is brought into contact with the stepped ground surface as rotation of the motors M16 and M15 provided at the connecting portions between the sole heel part 8c and the toe parts 8a and 8b is controlled with the control instruction values ₙrefi.

Figure 26:
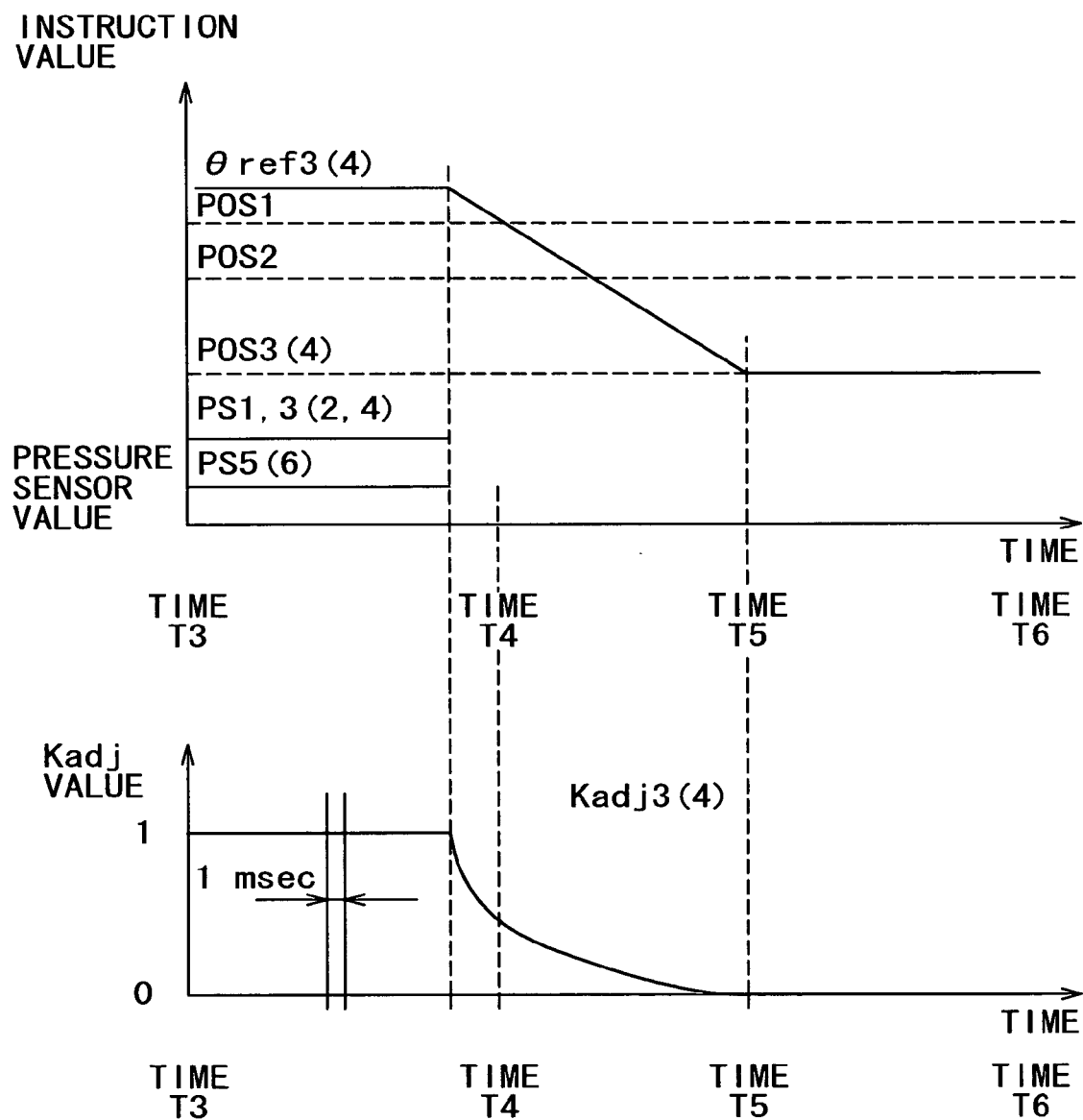
FIG. 26 is a graph illustrating the magnitudes of a pressure sensor value and Kadji when the foot part having been brought into contact with the ground surface by the motion of FIGS. 23A to 23D and 24 separate from the ground surface.
Figure 27:
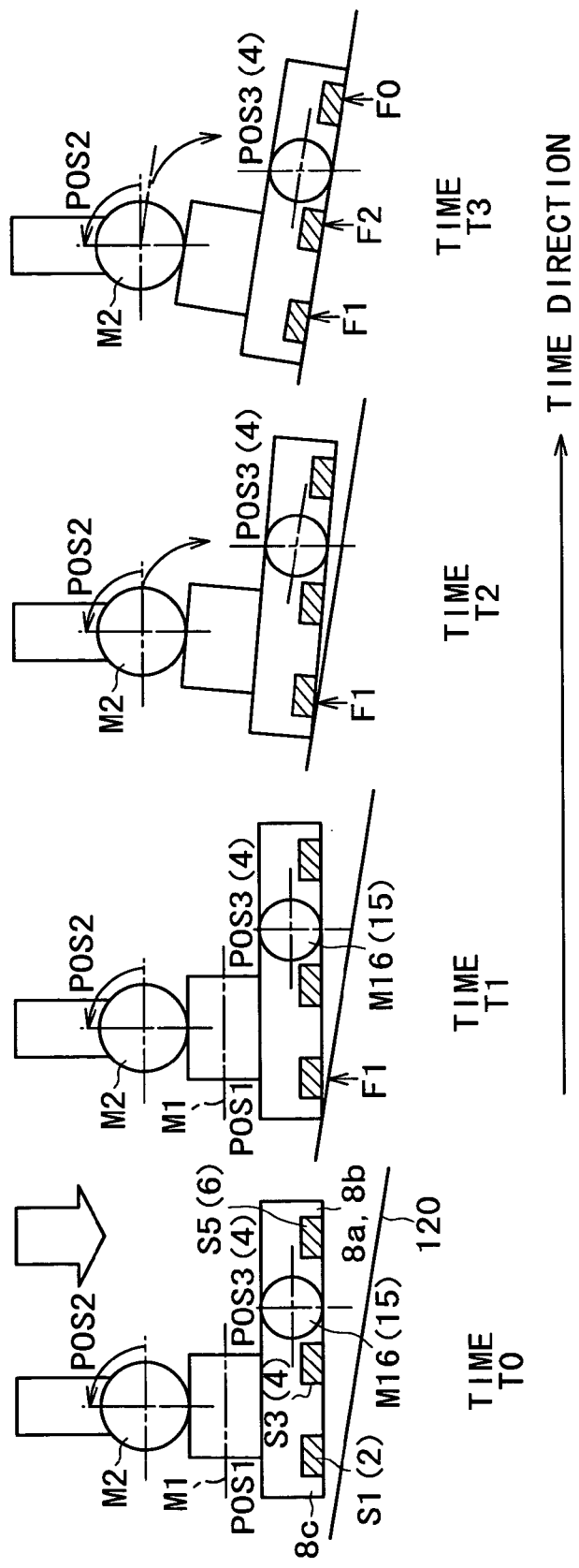
FIGS. 27A to 27D are schematic views illustrating a motion of the foot part of FIG. 17 when it is brought into contact with a ground surface having an descending slope with respect to lapse of time.

Now, a motion of a foot part 8 when it is brought out of contact with a ground surface having a step conversely to the motion in the example described above with reference to FIGS. 23A to 23D and 24 is described. FIGS. 25A to 25D and 26 illustrate a motion of the sole 8 when the sole 8 having been brought into contact with the ground surface through the motion described hereinabove with reference to FIGS. 23A to 23D and 24 is brought out of contact with the ground surface as time passes. More particularly, FIGS. 25A to 25D schematically show the sole 8 at times T3 to T6, respectively, and FIG. 26 illustrate the magnitudes of the pressure sensor values and the gain control signals Kadji. Also in this instance, fixed pressure sensor signals POS1 to POS4 are supplied from the higher order control apparatus.

When values obtained using the expressions (8) and (9) given hereinabove are supplied, rotation of the actuators 3 and 4 (motors M16 and M15) is controlled such that the sole 8 acts profiling a stepped ground surface as seen in FIGS. 25A to 25D and 26. When the foot part 7 is brought out of contact with the ground surface 110, the sole heel part 8c remaining in contact with the ground surface 110 at time T3 is spaced upward at time T4. At this time, the pressure signals from the pressure sensors S1 to S4 provided on the sole heel part 8c change to 0. Then, at time T5, the toe parts 8a and 8b are brought into contact with the ground surface 110, and then at time T6, the sole 8 is spaced upwardly away from the ground surface 110 again.

The gain control signals Kadj3 and Kadj4 given by the expressions (8) and (9) given hereinabove change as given by the following expressions (15) and (16), respectively;

$$Kadj_3(k) = (1-K3) \times Kadj3(k-1) \qquad (15)$$

$$Kadj_4(k) = (1-K4) \times Kadj4(k-1) \qquad (16)$$

where k is an integer indicating a sampling number, and K3 and K4 are constants (0<K3, K4<1).

Here, the constants K3 and K4 are set to 0.1 similarly as described hereinabove. The instruction values P3 and P4 vary as given by the expressions (15) and (16) as mentioned above so that the pressure sensor signals PS5 and PS6 may become equal to fixed pressure target values PREF3 and PREF4 determined by the control apparatus, respectively. As described hereinabove, the pressure target valued PREF3 and PREF4 may have a value obtained by dividing the total weight of the robot apparatus by the number of pressure sensors (6 in the present embodiment) provided on the sole 8.

Also in this instance, the control instruction values ₙrefi (reflex instruction values) are produced from the sensor signals from the pressure sensors provided on the sole and the posture instruction values POSi (host instruction values) and gain control signals Kadji (in this instance, Kadj3 and Kadj4) from the higher order control apparatus. Thus, a reflex motion when the foot part 7 is brought out of contact with the stepped ground surface is controlled as rotation of the motors M16 and M15 provided at the connecting portions between the sole heel part 8c and the toe parts 8a and 8b is controlled with the control instruction values ₙrefi.

Now, a motion of a foot part when the robot apparatus brings the foot part into contact with a ground surface having a descending slope is described.

Figure 28:
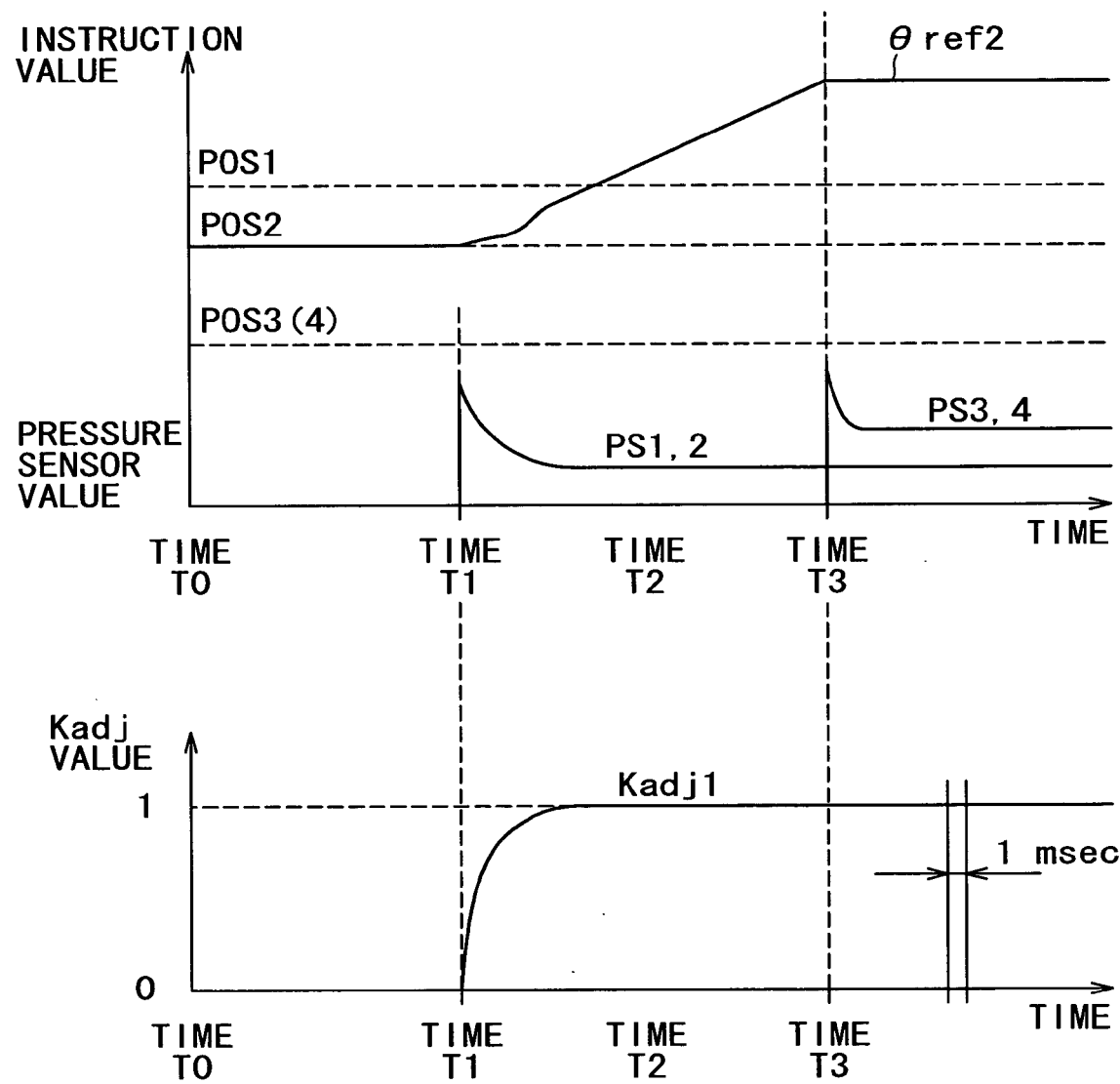
FIG. 28 is a graph illustrating variations of the instruction values and Kadji at different timings T0 to T3 in the motion of the foot part illustrated in FIGS. 27A to 27D.
Figure 29:
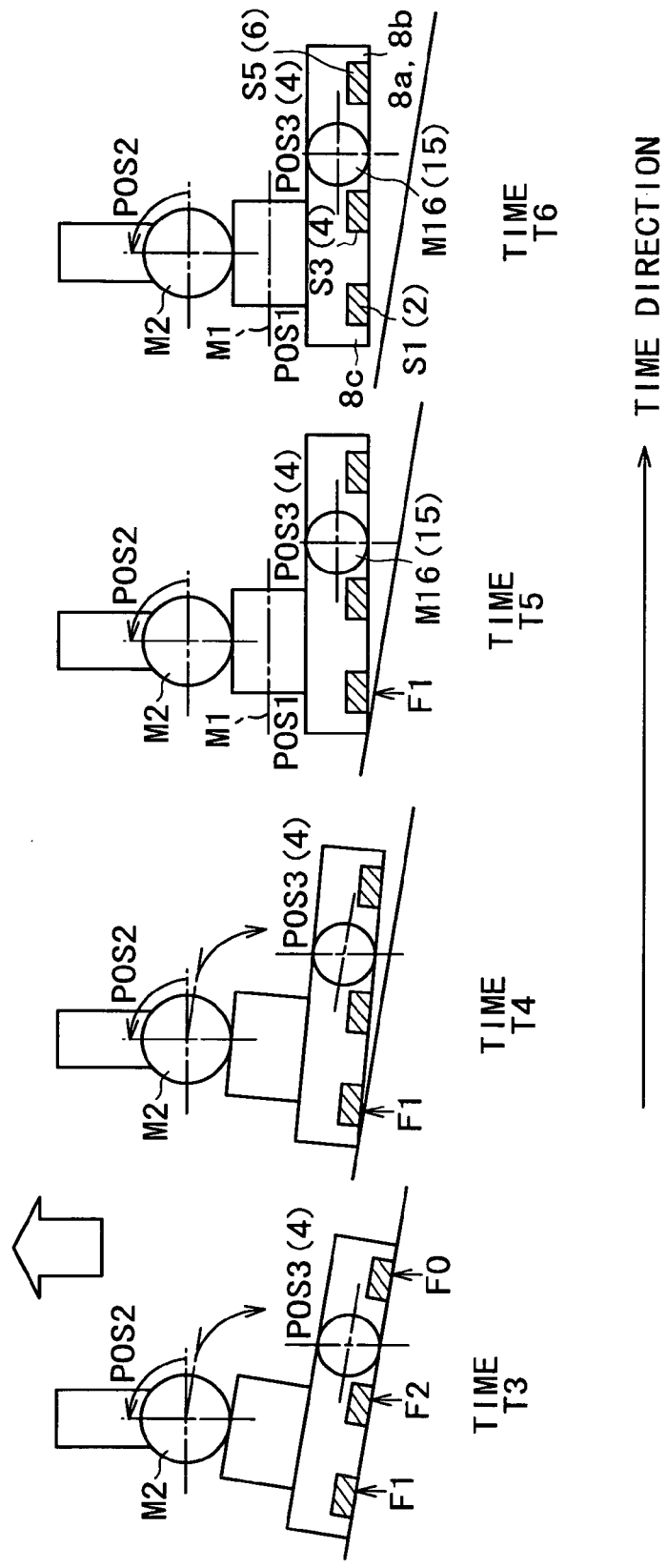
FIGS. 29A to 29D are schematic views illustrating a motion of the foot part of FIG. 17 when the foot part having been brought into contact with a ground surface separates from the ground surface having a descending slope with respect to lapse of time.

FIGS. 27A to 27D illustrate a motion of a foot part when it is brought into contact with a ground surface 120 having a slope as time passes. More particularly, FIGS. 27A to 27D show a foot part 7 as viewed from sideward at times T0 to T3. Further, FIG. 28 illustrates the magnitudes of the instruction values and the gain control signals Kadji at times T0 to T3. It is to be noted that six pressure sensors are disposed on the sole of the foot part as shown in FIG. 18B. Here, the pressure sensor signals POS1 to POS4 from a higher order control apparatus to the motors have fixed values.

The ground surface 120 having a slope is a down-grade hill. Therefore, at time T1, the foot part is brought into contact at the sole heel part 8c thereof with the ground surface 120, and reaction force F1 is applied to the sole heel part 8c through the contact. At time T2, the motor M2 of the ankle joint roll shaft rotates, and at time T3, the sole 8 is brought into contact over the entire area thereof with the ground surface 120. Thereupon, reaction force F2 is additionally applied to the sole heel part 8c while reaction force F0 is applied to the toe pars 8a and 8b. It is to be noted that, in the example shown in FIG. 28, a state wherein no pressure is applied to the pressure sensors S5 and S6 at an instant when the toe pars 8a and 8b are brought into contact with the ground surface 120 is illustrated.

In this instance, when the intermediate hierarchical control apparatus 20 for controlling the reflex motion of the foot part 7 receives the pressure signals PS1 to PS4 supplied from the pressure sensors S1 to S4 provided for the sole heel part 8c, it produces a control signal (control instruction value ₙref2), for example, for controlling the motion of the actuator A2 (motor M2). Naturally, the motion of some other actuator may be controlled instead. FIGS. 27A to 27D and 28 illustrate an example of a motion of the foot part 7 when a control instruction value ₙref2 given by the following expression (17) and a control instruction value ₙref2 hereinafter described are received:

$$\theta ref_2 = Kadj_2 \times P2 + (1 - Kadj_2) \times POS_2 \quad (17)$$

Here, the gain control signal Kadj2 varies as given by the following expression (18):

$$Kadj2 = Y2(k)/|(PS1(k)+PS2(k))-(PS3(k)+PS4(k))| \quad (18)$$

$$Y2(k) = K2 \times |(PS1(k)+PS2(k)-(PS3(k)+PS4(k))|+(1-K2) \times Y2(k-1)$$

where k is an integer indicating a sampling number, Y2 is a state variable, and K2 is a constant (0<K2<1).

In the present embodiment, the constant K2 is set to 0.1. Meanwhile, the instruction value P2 varies as given by the following expression (19) so that the pressure signals PS1 to PS4 may become equal to the fixed pressure target value RREF2 determined by the intermediate hierarchical control apparatus 20:

$$P2 = (PREF3 - (PS1+PS2) - (PS3+PS4)) \times N2 \quad (19)$$

where N2 is a positive constant. The pressure target value PREF2 may similarly be a value obtained, for example, by dividing the total weight of the robot apparatus by the number of pressure sensors (6 in the present embodiment) provided on the sole 8 as described hereinabove.

Similarly, the motion of the actuator A1 (motor M1) is controlled with the pressure signals PS1 to PS4. It is to be noted that the motion of some other actuator may be controlled instead.

$$\theta ref_1 = Kadj_1 \times P1 + (1 - Kadj_1) \times POS_1 \quad (20)$$

In this instance, the gain control value Kadj1 varies as given by the following expression (21):

$$Kadj1 = Y1(k)/|(PS1(k)+PS3(k))-(PS2(k)+PS4(k))| \quad (21)$$

$$Y1(k) = K1 \times |(PS1(k)+PS3(k)-(PS2(k)+PS4(k))|+(1-K1) \times Y1(k-1) \quad (21)$$

where k is an integer indicating a sampling number, Y1 is a state variable, and K1 is a constant (0<K1<1).

In the present embodiment, the constant K1 is set to 0.1. Meanwhile, the instruction value P1 varies as given by the following expression (22) so that the pressure sensor signals PS1 to PS4 may have a fixed pressure target value PREF1 determined by the control apparatus:

$$P1 = (PREF1 - (PS1+PS3) - (PS2+PS4)) \times N1 \quad (22)$$

where N1 is a positive constant. The pressure target value P1 mentioned above may be a value obtained by dividing the total weight of the robot apparatus by the number of pressure sensors (6 in the present embodiment) provided on the sole 8 as described hereinabove.

In this manner, the control instruction values ₙref1 and ₙref2 (reflex instruction values) are produced based on the sensor signals from the pressure sensors provided on the sole, and the posture instruction values POSi (host instruction values) and the gain control signals Kadj1 and Kadj2 from the higher order control apparatus. Then, rotation of the motors M1 and M2 for driving the ankle joint pitch shaft and the ankle joint roll shaft provided between the sole and the ankle is controlled in accordance with the control instruction values to control the reflex motion when the foot part 7 is brought out of contact with the ground surface having a step.

Figure 30:
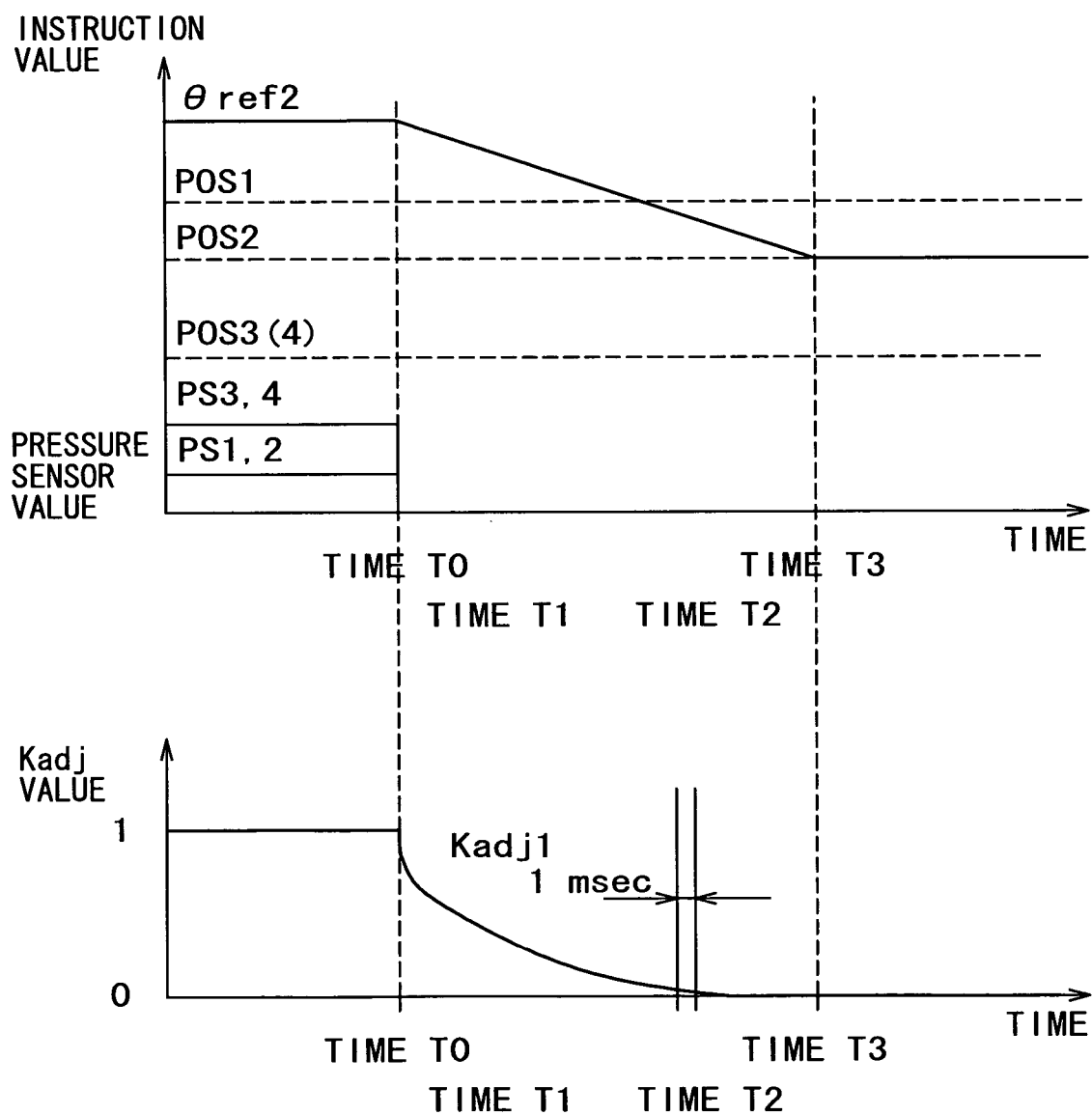
FIG. 30 is a graph illustrating variations of the pressure sensor values and Kadji at different timings T3 to T6 in the motion of the foot part illustrated in FIGS. 29A to 29D.

Subsequently, description is given of a motion of a foot part when it is brought out of contact with a ground surface 120 having a descending slope conversely to that in the example described hereinabove with reference to FIGS. 27A to 27D and 28. FIGS. 29A to 29D and 30 illustrate a motion of a foot part when it is brought out of contact with the ground surface having been brought into contact with the ground surface through the motion described hereinabove with reference to FIGS. 27A to 27D and 28. More particularly, FIGS. 29A to 29D schematically show a foot part at times T3 to T6, and FIG. 30 illustrates the magnitudes of the pressure sensor values and the gain control signals Kadji. Also in this instance, the pressure sensor signals POS1 to POS4 from the higher order control apparatus to the motors have a fixed value.

Also in the example illustrated in FIGS. 29A to 29D and 30, when values obtained using the expressions (17) and (20) given hereinabove are supplied, rotation of the actuators A1 and A2 (motors M1 and M2) is controlled such that the sole 8 acts profiling a ground surface 120 having a slope. When the pressure signals PS1 to PS4 from the pressure sensors S1 to S4 provided on the sole heel part 8c are supplied, a control signal (reflex instruction value ₙref2), for example, for controlling the motion of the actuator A2 (motor M2) is produced in accordance with the expression (17) given hereinabove. Here, the gain control signal Kadj2 varies as given by the following expression (23):

$$Kadj2(k) = (1-K2) \times Kadj2(k-1) \quad (23)$$

where k is an integer indicating a sampling number, and K2 is a constant (0<K2<1).

Also in this instance, the constant K2 is set to 0.1, and the instruction value P2 varies as given by the expression (19) given hereinabove so that the pressure signals PS1 to PS4 may have a fixed pressure target value PREF2 determined by the intermediate hierarchical control apparatus.

Similarly, rotation of the actuator A1 is controlled with an instruction given by the expression (20) given hereinabove based on the pressure signals PS1 to PS4 from the pressure sensors S1 to S4. In this instance, the gain control signal Kadj1 varies as given by the following expression (24):

$$Kadj1(k)=(1-K1) \times Kadj1(k-1) \qquad (24)$$

where k is an integer indicating a sampling number, and K1 is a constant (0<K1<1).

Also in this instance, the constant K1 is set to 0.1, and the instruction value P1 varies as given by the expression (22) given hereinabove so that the pressure signals PS1 to PS4 may have a fixed pressure target value PREF1 determined by the intermediate hierarchical control apparatus. In this manner, the motion of the sole 8 is controlled such that the toe parts 8a and 8b are first spaced away from the ground surface 120 and then the sole heel part 8c is spaced away from the ground surface 120.

In the present embodiment, the central control apparatus calculates an instruction of posture control of a whole-body movement at a comparatively low response speed whereas a movement of a comparatively high response speed such as a reflex movement of a tip end is controlled by each of a plurality of intermediate hierarchical control apparatus provided in a decentralized state in a lower hierarchy. This can reduce the calculation capacity of the central control apparatus and reduce the calculation burden on the central control apparatus.

Further, since each of the intermediate hierarchical control apparatus provided in a decentralized state takes charge of a comparatively small number of control shafts, it may be formed such that it can perform only simple calculation and the total number of control shafts can be increased readily. Furthermore, walking, a high speed response to a collision with an external environment and a high speed reflex movement of a terminal end of the robot apparatus can be anticipated.

Further, such profiling control which decreases a disturbance like an impact such as, for example, harmonic vibration upon contacting with a rough road surface which cannot be represented by a numerical formula can be achieved, and impact force upon the system can be reduced by control by a lower order intermediate hierarchical control apparatus and the posture of the entire robot apparatus can be maintained stably. In other words, an action of an active damper effect can be obtained, and the mechanical structure can be simplified.

Furthermore, where an intermediate hierarchical control apparatus is applied to a foot part as in the particular example described hereinabove, the sole contacts over a greater area thereof with a rough road surface, and consequently, posture stabilization by a ZMP is facilitated.

While a preferred embodiment of the present invention has been described using specific terms, such description is for illustrative purposes only, and it is to be understood that changes and variations may be made readily by those skilled in the art without departing from the spirit or scope of the following claims.

For example, while, in the embodiment described above, the foot parts have a 4 degree-of-freedom, the degree of freedom of the foot parts is not limited to the 4 degree-of-freedom, but motors may otherwise be provided so as to correspond to the five fingers as in the case of a human being. Further, the present invention can be applied to the hand parts of the arm part units or the neck part of the head part unit similarly to the foot parts so that the hand parts or the neck part may perform a reflex movement.

Further, while, in the specification, the present invention is described in connection with a hardware configuration, the subject matter of the present invention is not limited to this. For example, the present invention can be implemented by causing a CPU to execute a computer program which describes arbitrary processing. In this instance, the computer program may be provided in a form recorded in or on a recording medium or may be provided through transmission through the Internet or some other transmission medium.

Further, the subject matter of the present invention is not necessarily limited to a product called "robot". In particular, the present invention can be applied similarly to any mechanical apparatus or general moving body apparatus which performs movements similar to motions of a human being using an electric or magnetic action even if the apparatus is a product belonging to some other industrial field such as, for example, a toy.

What is claimed is:

1. A robot apparatus including a body and a plurality of movable parts connected to said body, comprising:
   a plurality of movable part driving means for driving said movable parts;
   a local control loop for controlling one of said movable parts;
   local control means for controlling said local control loop;
   an integrated control loop serving as a higher order control loop than said local control loop for controlling said local control loop;
   integrated control means for controlling said integrated control loop; and
   priority determination means for determining priority between control amounts calculated by said local control means and said integrated control means to be used to control said movable parts based on a predetermined condition,
   wherein said local control means issues a notification of states of the movable part driving means of said local control loop to said integrated control means, and said integrated control means issues control instructions including target values successively corrected based on the states of the movable part driving means included in the notifications.

2. A robot apparatus including a body and a plurality of movable parts connected to said body, comprising:
   a plurality of movable part driving means for driving said movable parts;
   a local control loop for controlling one of said movable parts;
   local control means for controlling said local control loop;
   an integrated control loop serving as a higher order control loop than said local control loop for controlling said local control loop;
   integrated control means for controlling said integrated control loop;
   priority determination means for determining priority between control amounts calculated by said local control means and said integrated control means to be used to control said movable parts based on a predetermined condition; and
      component ratio adjustment means for adjusting component ratios between the control amounts for said movable part driving means from said integrated control means and the control amounts for said movable part driving means from said local control means.

3. A robot apparatus according to claim 2, wherein said component ratio adjustment means adjusts the component ratios in response to the strength of force acting upon said robot apparatus or some other state of said robot apparatus.

4. A robot apparatus according to claim 2, wherein said component ratio adjustment means transiently adjusts the component ratios for the changeover from control by said local control means to control by said integrated control means in a predetermined set period of time.

5. A robot apparatus according to claim 4, wherein the set time is determined in response to an object apparatus motion by said integrated control means.

6. A robot apparatus according to claim 4, wherein said robot apparatus is a legged mobile robot including a plurality of movable legs, and the set time is determined depending upon a walking cycle using said movable legs.

7. A motion controlling method for a robot apparatus including a body and a plurality of movable parts connected to said body, comprising:

a local control step of controlling a motion of said robot apparatus by means of a local control loop which control some of said movable parts;

an integrated control step of controlling a motion of said robot apparatus by means of a integrated control loop which serves as a higher order control loop than said local control loop and controls said local control loop; and a priority determination step of determining priority between control amounts calculated by the local control step and the integrated control step to be used to control said movable parts based on a predetermined condition, wherein the local control step issues a notification of operation states of the movable part driving means at the local control step to the integrated control step, and the integrated control step issues control instructions including target values successively corrected based on the states of the movable part driving means included in the notifications.

8. A motion controlling method for a robot apparatus including a body and a plurality of movable parts connected to said body, comprising:

a local control step of controlling a motion of said robot apparatus by means of a local control loop which control some of said movable parts;

an integrated control step of controlling a motion of said robot apparatus by means of a integrated control loop which serves as a higher order control loop than said local control loop and controls said local control loop;

a priority determination step of determining priority between control amounts calculated by the local control step and the integrated control step to be used to control said movable parts based on a predetermined condition; and a component ratio adjustment step for adjusting component ratios between the control amounts by the integrated control step and the control amounts by the local control step.

9. A motion controlling method for a robot apparatus according to claim 8, wherein the component ratio adjustment step adjusts the component ratios in response to the strength of force acting upon said robot apparatus or some other state of said robot apparatus.

10. A motion controlling method for a robot apparatus according to claim 8, wherein the component ratio adjustment step transiently adjusts the component ratios for the changeover from control by the local control step to control by the integrated control step in a predetermined set period of time.

11. A motion controlling method for a robot apparatus according to claim 10, wherein the set time is determined in response to an object apparatus motion at the integrated control step.

12. A motion controlling method for a robot apparatus according to claim 10, wherein said robot apparatus is a legged mobile robot including a plurality of movable legs, and the set time is determined depending upon a walking cycle using said movable legs.

* * * * *